US008137647B2

(12) United States Patent  
Corbin et al.

(10) Patent No.: US 8,137,647 B2
(45) Date of Patent: Mar. 20, 2012

(54) PROCESSES FOR PRODUCING TITANIUM DIOXIDE

(75) Inventors: David Richard Corbin, West Chester, PA (US); Thomas Paul Griffin, Kennett Township, PA (US); Keith W. Hutchenson, Lincoln University, PA (US); Sheng Li, Elmhurst, NY (US); Mark Brandon Shiflett, Wilmington, DE (US); Carmine Torardi, Wilmington, DE (US); Joseph J. Zaher, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 771 days.

(21) Appl. No.: 11/617,258

(22) Filed: Dec. 28, 2006

(65) Prior Publication Data

US 2008/0159933 A1  Jul. 3, 2008

(51) Int. Cl.
*C01G 23/00* (2006.01)
(52) U.S. Cl. ............ 423/81; 423/85; 423/140; 423/143; 423/610; 23/300; 75/743
(58) Field of Classification Search .................... 423/81, 423/143, 85, 610, 266, 140; 23/300; 75/743
See application file for complete search history.

(56) References Cited

U.S. PATENT DOCUMENTS 3,067,010 A    12/1962  Long et al.
5,411,574 A *   5/1995  Turney et al. ................... 75/743
7,179,441 B2 *  2/2007  Jung et al. .................. 423/593.1
2005/0233146 A1* 10/2005  Nonninger ..................... 428/402
2007/0191605 A1*  8/2007  Raab ............................ 544/107

FOREIGN PATENT DOCUMENTS

GB    1 425 779         2/1976
WO    WO 93/04206 A1    3/1993
WO    WO 98/27010 A1    6/1998

OTHER PUBLICATIONS

G.E. Haddeland et al., Titanium Dioxide Pigment, Process Economics Program Report No. 117, , pp. 1-290, 1978.
T. P. Battle et. al., The Processing of Titanium Ores, The Paul E. Queneau International Symposium on Extractive Metallurgy of Copper, Nickel and Cobalt, vol. 1: Fundamental Aspects, 1993, pp. 925-943.
Dumon et al., Action D'Acides Organiques Divers Sur Un Mineral Titane—Comparaison De Leur Pouvoir D'Extraction Du Titane Avee Celui D'Acides Mineraux, Bull. Inst. Geol. Bassin Aquitaine, 1975, p. 95-100 (English Abstract).
Dumon et. al., Demonstration of a Certain Mobility of Titanium in Podzols and in the Laboratory Under the Influence of Organic Agents, Phy. Chem. Earth, 1977, vol. 11:331-337.
J. Barksdale, Titanium: Its Occurrence, Chemistry and Technology, 2nd Edition, 1966. Ronald Press (Book Not Included).
U. Schwertmann et al., Iron Oxides in the Laboratory, 2003, 2nd Edition, Wiley VCH (Book Not Included).
International Search Report Dated Jul. 11, 2007, International Application No. PCT/US2006/049556, International Filing Date: Dec. 28, 2006.

* cited by examiner

*Primary Examiner* — Jerry Lorengo
*Assistant Examiner* — Pritesh Darji

(57) ABSTRACT

Provided are processes for the production of titanium dioxide from ilmenite. In these processes, ilmenite is digested with aqueous ammonium hydrogen oxalate. Iron from the ilmenite precipitates as a hydrated iron oxalate and is removed by filtering, leaving a titanium-rich solution. The titanium-rich solution can be further processed to form titanium dioxide.

31 Claims, 2 Drawing Sheets

Simplified Process Flow Diagram

Figure 1. Simplified Process Flow Diagram

PROCESSES FOR PRODUCING TITANIUM DIOXIDE

FIELD OF THE INVENTION

The present invention relates to processes for the production of titanium dioxide from ilmenite.

BACKGROUND

Titanium dioxide is used as a white pigment in paints, plastics, paper and specialty applications. Ilmenite is a naturally occurring mineral containing both titanium and iron with the chemical formula $FeTiO_3$.

Two major processes are currently used to produce $TiO_2$ pigment—the sulfate process as described in "Haddeland, G. E. and Morikawa, S., "Titanium Dioxide Pigment", SRI international Report #117" and the chloride process as described in "Battle, T. P., Nguygen, D., and Reeves, J. W., The Paul E. Queneau International Symposium on Extractive Metallurgy of Copper, Nickel and Cobalt, Volume I: Fundamental Aspects, Reddy, R. G. and Weizenbach, R. N. eds., The Minerals, Metals and Materials Society, 1993, pp. 925-943". Dumon et al (Dumon, J. C., Bull. Inst. Geol. Bassin Aquitaine, 1975, 17, 95-100 and Dumon, J. C., and Vigneaux, M., Phys. Chem. Earth 1977, 11, 331-337) describe the extraction of ilmenite with organic and mineral acids.

The present invention provides new processes for $TiO_2$ production with the ability to use low grade ores that are less energy intensive, that require reduced capital investment and that have a smaller environmental footprint than conventional current production processes.

SUMMARY OF THE INVENTION

One aspect of the present invention is a process comprising:
a) digesting ilmenite ore with aqueous ammonium hydrogen oxalate to form a leachate and an iron-rich precipitate
b) separating said leachate from said iron-rich precipitate
c) hydrolyzing said leachate with ammonia to form titanyl hydroxide and an oxalate-rich solution
d) separating said titanyl hydroxide from said oxalate-rich solution
e) washing said titanyl hydroxide with a material selected from the group consisting of water, aqueous ammonium oxalate and ammonium hydroxide to form low oxalate titanyl hydroxide; and
f) crystallizing titanium dioxide from said low oxalate titanyl hydroxide.

Another aspect of the present invention is a process comprising:
a) digesting ilmenite ore with aqueous ammonium hydrogen oxalate to form a first leachate and an iron-rich precipitate;
b) separating said first leachate from said iron-rich precipitate;
c) optionally, adding a reducing agent to said first leachate to form a second iron-rich precipitate and a second leachate and separating said second iron-rich precipitate from said second leachate;
d) hydrothermally crystallizing said first or second leachate in an autoclave for between 1 h and 24 h to form titanium dioxide and a hydrothermally treated solution; and
e) separating said titanium dioxide from said hydrothermally treated solution.

A further aspect of the present invention is a process comprising:
a) digesting ilmenite ore with aqueous ammonium hydrogen oxalate to form a leachate and an iron-rich precipitate
b) separating said leachate from said iron-rich precipitate
c) adding a reducing agent to said leachate to form a iron-rich precipitate and a reduced leachate
d) separating said second iron-rich precipitate from said reduced leachate
e) hydrolyzing said reduced leachate with ammonium hydroxide to form titanyl hydroxide; and
f) hydrothermally crystallizing said titanyl hydroxide to form titanium dioxide and a diammonium oxalate solution.

DETAILED DESCRIPTION

Figure 1:
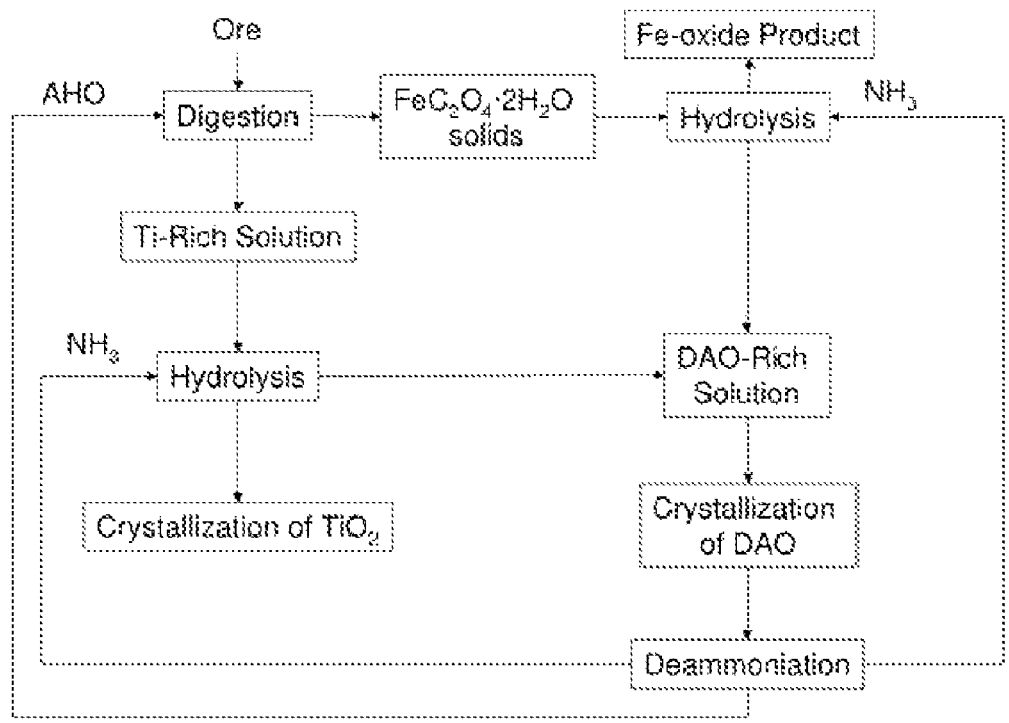
FIG. 1 is a process flow diagram of a process according to the present invention for making titanium dioxide.

In the processes disclosed herein, ilmenite is digested by exposure to aqueous ammonium hydrogen oxalate. The processes include digesting ilmenite with ammonium hydrogen oxalate. This forms an iron-rich precipitate and a titanium-rich solution, which can be separated. A variety of further processing steps can lead to the production of titanium dioxide. In some embodiments, oxalate in process streams can be recycled into ammonium hydrogen oxalate for further digestion. A schematic of one embodiment of the present invention is shown as FIG. 1.

Ore is digested in the first step of the process. Digestion yields an iron-rich solid and a titanium-rich solution. The titanium-rich solution is hydrolyzed and the resulting solution is crystallized into titanium dioxide. The iron-rich solid can be hydrolyzed to form an iron oxide. Diammonium oxalate can be collected from several process steps. The diammonium oxalate can be crystallized and deammoniated to form ammonium hydrogen oxalate and ammonia which can be recycled to earlier process steps.

As used herein with regard to embodiments of the present invention, the term "ilmenite ore" refers to iron titanate with a titanium dioxide content ranging from 35 to 75% by weight. The chemical composition of natural ilmenite ore can vary. It is generally regarded as ferrous titanate with the formula $FeTiO_3$. The iron proportions can be higher than the theoretical composition due to admixed hematite or magnetite. An excess of titanium may be due to the presence of rutile. The process of the present invention can be used for ilmenites with titanium dioxide content on the lower end of the ilmenite range. A content of 35 to 60% by weight is preferred and a content of 45 to 55% by weight is most preferred.

The particle size of the ilmenite is preferably in the range of less than 1 to 300 microns for rapid dissolution, with 95% or more of the particles below ~100 microns. Smaller sized ore particles (<~140 mesh) can be used in this process and would be an advantage over the incumbent sulfate and chloride processes. These smaller particles are not preferred for use in the sulfate or chloride processes. The concentration of the ammonium hydrogen oxalate is necessarily 5 to 10 molal.

The digestion reaction may be conducted in one of three different chemical environments—non-oxidative, oxidative, or reductive. All digestions reaction environments contain aqueous ammonium hydrogen oxalate. The ratio of ammonium to hydrogen in the aqueous ammonium hydrogen oxalate may vary. The digestions may be conducted in aqueous ammonium hydrogen oxalate where the ammonium to hydrogen ratio is up to and including 1.5 to 1.

For non-oxidative digestion, the ilmenite is contacted with aqueous ammonium hydrogen oxalate while under an atmosphere of an inert gas such as nitrogen. Other suitable inert gasses include helium and argon. Digestion under inert gas inhibits the oxidation of iron ions in solution. The molar ratio of ammonium hydrogen oxalate to ilmenite ore is 4:1 to 8:1 (on the basis of hydrogen in the ammonium hydrogen oxalate to ilmenite ratio) for digestion performed in an inert atmosphere. A mixture is formed of the ilmenite and aqueous ammonium hydrogen oxalate. This mixture is held under reflux conditions at a temperature of about 100° C. to 140° C. Under these conditions, dissolution of the ilmenite in the aqueous ammonium hydrogen oxalate occurs at a rate such that generally about 70 to 90 percent of the titanium in the ore is dissolved within 8 h. The iron(II) in solution precipitates as $FeC_2O_4.2H_2O$ leaving a titanium-rich solution. A titanium-rich solution is one in which the molar ratio of Ti/(Fe+Ti) in the solution is greater than that present in the ilmenite ore used. An iron-rich precipitate is one in which the molar ratio of Ti/(Fe+Ti) in the solution is less than that present in the ilmenite ore used. The precipitate contains $FeC_2O_4.2H_2O$. The solids from this digestion step can also contain unreacted ilmenite ore and its accompanying impurities (e.g., quartz, zircon, rutile, anatase, other iron titanates, monazite, etc). In addition, other very insoluble metal oxalates can be present (e.g., magnesium oxalate, calcium oxalate, etc.).

Non-oxidative digestion can be carried out in the presence of a reducing agent in addition to the ammonium hydrogen oxalate. The reducing agent can be, for example, Fe(O), Zn(O), Ti(III), or Al(O). Iron metal is preferred. Treating with a reducing agent converts any Fe(III) present, which is highly soluble in the aqueous ammonium hydrogen oxalate, to Fe(II) which precipitates as $FeC_2O_4.2H_2O$, further increasing the Ti/(Ti+Fe) ratio of the solution. The solution can then be diluted to about 1 wt % Ti as determined by ICP (inductively coupled plasma spectrometry) or equivalent chemical analysis technique. The metal reducing agent can be added as powder, chips, wire or other known forms. Other metal oxalates from impurities in the ilmenite ore such as $MnC_2O_4.2H_2O$ can co-precipitate with the iron oxalate.

In oxidative digestion, the digestion is carried out in an oxidative atmosphere such as air. The ammonium hydrogen oxalate to ore molar ratio is 5:1 to 10:1 (on the basis of hydrogen in the ammonium hydrogen oxalate to ilmenite ratio) for dissolution performed in air or other oxidative atmosphere. In this type of digestion, Fe(II) species are oxidized to Fe(III). The ferric ions produced upon digestion in air are more soluble in the solution than the ferrous ions and require additional steps to reduce and separate in order to form a titanium-rich solution for further processing. Oxidative digestion involves contacting ilmenite ore with aqueous ammonium hydrogen oxalate in an oxidative atmosphere to form a solution-rich in iron and titanium and a solid containing non-dissolvable material. Air can be added as over-pressure in an autoclave, for example, using a sparger. Insoluble components of the ore can include rutile, zircon, and/or quartz. After separating material that is not dissolved in the presence of air, the resulting solution is exposed to a reducing agent such as zinc metal under inert atmosphere to reduce the ferric ions to ferrous ions and to form an iron-rich precipitate.

In reductive digestion, the digestion is carried out in the presence of reducing agents such as iron, zinc, magnesium or aluminum metal particles added at the start of the digestion. In reductive digestion, mainly substantially all ferrous ions are formed, leading to formation of an iron-rich precipitate which can be separated from the titanium-rich solution.

The product of the digestion, whether digestion is carried out in a single step or multiple steps, and regardless of whether the digestion is oxidative, non-oxidative, or reductive, is a titanium-rich solution and an iron-rich precipitate. The titanium-rich solution is separated from the iron-rich precipitate by conventional methods such as filtration and centrifugation. Sufficient ammonium hydrogen oxalate can be added to give a saturated solution at hydrolysis temperatures (between 25° C. and 90° C.; preferably 75-90° C.).

After digestion, two pathways are available. The first pathway is to hydrothermally treat the titanium-rich solution in an autoclave at a temperature of 200° C. to 374° C. and at autogenous pressure for a time period of 1 h to 24 h. This treatment forms the desired titanium dioxide and a residual solution from which it can be separated by conventional methods such as filtration or centrifugation.

The hydrothermal treatment of the titanium-rich solution can result in the decomposition of the oxalate anion. If recycle of the oxalate, which can reduce the cost of the process, is desired, an alternative pathway may be used. In the alternative pathway, the titanium-rich solution is hydrolyzed with a base, preferably ammonium hydroxide. The base, in the form of gas or aqueous solution, is added to the titanium-rich solution at a temperature of about 25° C. to about 90° C., preferably 75° C. to 90° C., in sufficient quantities to maximize the precipitation of the titanium component and minimize the precipitation of the iron component of the titanium-rich solution. This is generally monitored by pH. For example, if the hydrolysis is performed at room temperature (about 25° C.), the pH is preferably no higher than about 7.5. Higher pH can lead to the undesired precipitation of iron species, which can require extensive washing and bleaching with acid to remove. The product of the hydrolysis is a mixture containing a high oxalate content "titanyl hydroxide" solid and an oxalate-rich residual solution. The exact chemical identity of "titanyl hydroxide" is not precisely determined. The "titanyl hydroxide" (titanic acid) is believed to exist as $TiO(OH)_2$, $TiO(OH)_2.H_2O$ or $TiO(OH)_2.nH_2O$ (where n>1) or mixtures thereof [see J. Barksdale, "Titanium: Its Occurrence, Chemistry and Technology", $2^{nd}$ Edition, Ronald Press; New York (1966)]. The mixture is allowed to stir for 1 or more h and is then separated, preferably by hot filtering through a filter media with pore size of approximately 4 µm-5.5 µm. Filtration rates of greater than about 12 mL/min are preferred. The titanyl hydroxide solids are then washed with a solution containing water, aqueous ammonium oxalate and/or ammonium hydroxide to displace any imbibed leachate and to reduce the concentration of undesired metals such as Fe.

At this point in the process, there are again two potential pathways. In a first pathway, the titanyl hydroxide solid mixed with the residual solution is hydrothermally treated to form nano-titanium dioxide and a diammonium oxalate solution. The hydrothermal treatment is carried out at a temperature of 250° C. or lower, for 1 h-24 h. The diammonium oxalate solution may be retained for recycle into ammonium hydrogen oxalate to be used in further ore digestion at the front end of the process. Any of the digestion modes disclosed herein above may be used with this route to $TiO_2$. In a second, alternative pathway, the high oxalate containing titanyl hydroxide solids are repulped with water to form a slurry containing sufficient NH$_4$OH to raise the pH to about 9. The slurry is then heated and additional NH$_4$OH is added to keep the pH at about 9. In this step, any oxalate still associated with the titanium species is stripped away forming low oxalate titanyl hydroxide in the slurry. The slurry is then filtered and the low oxalate containing titanyl hydroxide solids washed with water to remove any remaining oxalate.

Titanium dioxide is known to exist in at least three crystalline mineral forms: anatase, rutile and brookite. Rutile crystallizes in the tetragonal crystal system (P42/mnm with a=4.582 Å, c=2.953 Å); anatase crystallizes in the tetragonal crystal system (I41/amd with a=3.7852 Å, c=9.5139 Å; brookite crystallizes in the orthorhombic crystal system (Pcab with a=5.4558 Å, b=9.1819 Å, c=5.1429 Å). Crystallization of titanium dioxide from the low oxalate-containing titanyl hydroxide solids can be accomplished by one of four crystallization processes: low temperature hydrothermal (150° C.-250° C.), high temperature hydrothermal (250° C.-374° C.), normal calcination (700° C.-1100° C.) or flux calcination. Crystallization can optionally involve addition of crystallization aids such as, for example, rutile seed, mineralizers, and rutile directors (e.g., Sn compounds). The higher temperature routes—both hydrothermal and calcination—can give rutile of the proper particle size to give the product the desired opacity for most applications. Titanium dioxide product in the particle size range 100 to 600 nanometers is desired for use as pigment. Titanium dioxide with a particle size less than 100 nanometers is referred to as nano-sized.

For normal calcination, the low oxalate containing titanyl hydroxide solids are heated to a temperature of about 800° C. to 1000° C. for a period of at least one h. The solids can be heated in air or in an inert atmosphere. Conversion of low oxalate containing titanyl hydroxide solids into crystalline anatase form and rutile form can be influenced by process factors including, for example, temperature, time at temperature, temperature-time profile, amount of impurities, and additives that promote formation or stabilization of anatase, rutile or brookite. The same or other factors also affect the primary and secondary titania particle morphologies, e.g., size, shape, aggregation, and agglomeration, of the titania product.

If a commercial-grade, synthetic ammonium titanyl oxalate (ATO) source is used, the low oxalate containing titanyl hydroxide solids are more readily converted to rutile at a lower calcining temperature than are solids obtained from process leachate. Solids obtained from process leachate contain impurities such as Fe, V, Mn, Si, and Nb which are commonly present in the natural ilmenite ore. For example, heating the commercial grade ATO-derived low oxalate containing titanyl hydroxide solids at 800° C. for about 1 h consistently yields an all rutile product, whereas leachate-derived low oxalate containing titanyl hydroxide solids under the same calcination conditions yields all or predominantly anatase. Leachate-derived low oxalate containing titanyl hydroxide solids can be transformed into rutile by heating at a higher temperature, e.g., 1000° C., for 1 h.

The morphology of rutile made from ATO-derived low oxalate containing titanyl hydroxide solids can be changed by use of an additive such as a fluxing agent. Sodium chloride is an example of a fluxing agent. Addition of NaCl can modify the shape and size of the primary and secondary rutile particles. This is referred to as "flux calcination". In flux calcination, the titanium precipitate is heated to about 800° C. to 1000° C. for a period of at least 1 h in the presence of at least 1 wt % of a fluxing agent such as NaCl. Examples of other fluxing agents are KCl and LiCl.

Figure 2:
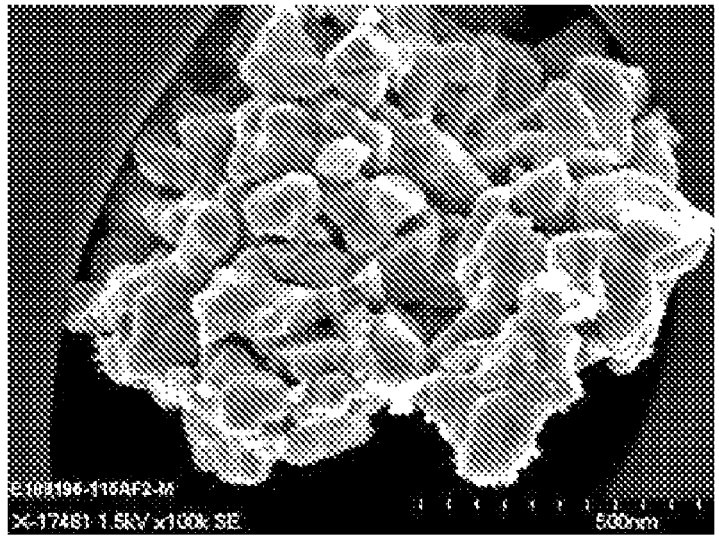
FIG. 2 is a scanning electron micrograph of irregularly-shaped $TiO_2$ aggregates in the size range of 20-100 nm.
Figure 3:
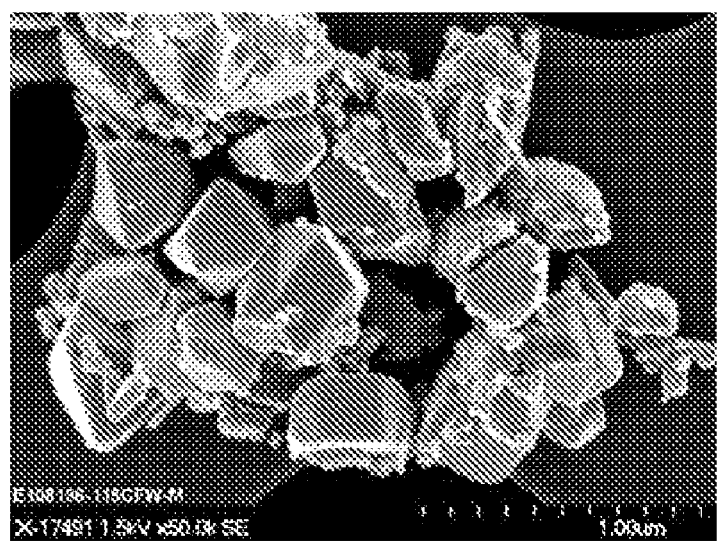
FIG. 3 is a scanning electron micrograph of well-shaped primary $TiO_2$ particles primarily in the size range of 100-500 nm.

FIGS. 2 and 3 compare rutile crystals produced without and with the addition of NaCl fluxing agent, respectively. In FIG. 2 after media-milling the product to break up agglomerates, scanning electron microscope (SEM) imaging shows mainly 20-100 nm irregularly-shaped aggregates. FIG. 3 shows a SEM image of commercial grade ATO-derived titanium precipitate that is calcined with 33 wt % NaCl. The TiO$_2$ obtained from the precipitate consists of about 95% rutile and 5% anatase, in weight percent, based on the total weight of the TiO$_2$. After media-milling, SEM imaging shows a predominance of well-shaped primary particles in the range of about 100-500 nm and some small (less than 100 nm) irregularly-shaped particles. Addition of NaCl during calcination can provide a product containing larger primary particles having a more clearly defined shape.

In addition to being a particle size and shape control agent, NaCl can also serve as a structure-directing agent (rutile promoter). For example, in the absence of NaCl, leachate-derived titanium precipitate produces irregularly-shaped particles of anatase, both with and without additional particle-morphology modifiers (such as K and P), at 800° C. However, modifying the process conditions by addition of as little as about 1-5 wt % NaCl (the percent based on the weight of TiO$_2$ that can be obtained from the precipitate) produces a well-defined rutile particle product at 800° C. that is also easily deagglomerated similar to that shown in FIG. 3. Sodium chloride, therefore, can be used with oxalate-derived titanium precipitate as a rutile promoter, a particle morphology control agent, and particle agglomeration control agent at 800° C. Other agents such as KCl and LiCl can also be used with oxalate-derived titanium precipitate as a rutile promoter, a particle morphology control agent, and particle agglomeration control agent at 800° C.

Low temperature hydrothermal crystallization (LTHC) involves conversion of the amorphous "titanyl hydroxide" intermediate to TiO$_2$ in the presence of water at relatively mild temperature conditions (from 150° C. to 250° C.) compared to the calcination temperatures (ca. 1000+° C.) typically utilized in current commercial TiO$_2$ production. Reaction temperatures in the LTHC process range from as low as 150° C. up to 250° C. with reaction pressures on the order of the corresponding vapor pressure of water and with reaction times of less than 24 h. Variation within this range of conditions, control of the acid concentration in the reaction mixture, and the addition of phase-directing mineralizers can be utilized to selectively control the resulting TiO$_2$ particle size, crystallography, and morphology. For example, rutile TiO$_2$ of pigmentary size (100 nm-300 nm) can be formed at 220° C.-250° C. with the addition of a rutile-directing mineralizer (e.g., ZnCl$_2$, ZnO, MgCl$_2$, or NaCl). Nano-sized rutile TiO$_2$ can be produced under similar conditions, but at temperatures as low as 150° C. Operation at temperatures as low as 150° C. with anatase-directing mineralizers (e.g., KH$_2$PO$_4$, Al$_2$(SO$_4$)$_3$, ZnSO$_4$, and Na$_2$SO$_4$) produces anatase TiO$_2$. Brookite TiO$_2$ can be prepared at temperatures above 150° C., optionally with the addition of a brookite phase-directing mineralizer (e.g., AlCl$_3$.6H$_2$O, α-Al$_2$O$_3$, and Al(OH)$_3$).

When high temperature hydrothermal crystallization is carried out in the temperature range of 250° C. to 374° C., the crystallization of TiO$_2$ particles is carried out hydrothermally in the presence of strong acids and various metal chloride mineralizers. Amorphous hydrous titanium oxide precipitate (sometimes represented as TiO(OH)$_2$.nH$_2$O with n~32) is added to water to produce a slurry typically in the 33-50 wt % range. The slurry can be acidified with strong mineral acids to give pH values typically in the 1-2 range. Alternatively, metal chloride salts can be added at levels ranging from 0.5 to 20% of the weight of the amorphous $TiO(OH)_2.nH_2O$. For example, rutile $TiO_2$ of pigmentary size (100 nm-300 nm) can be formed at 250° C.-374° C. with the addition of a rutile-directing mineralizer (e.g., $ZnCl_2$, ZnO, $MgCl_2$, or NaCl). The slurry is placed into gold reaction tubes, which are then crimped closed, rather than fully sealed, to allow for pressure equilibration. The gold tube with its contents is then placed into an autoclave. The temperature can range from 250° C. to 374° C. and the pressure is autogenous, typically ranging from 40 to 170 atm, respectively. The duration of the high temperature hydrothermal treatment is generally from 1 to 72 h.

Iron oxide can be produced from the iron-rich precipitates produced in the above described processes. The iron-rich precipitates are reacted with a base, preferably ammonium hydroxide, in the presence of oxygen, to form an iron oxide/hydroxide and an ammonium oxalate solution derived from the iron-rich precipitates. The iron oxides are then separated from the solution. Iron oxide may be used as a pigment or in the production of metallic iron. Alternatively, the iron(II)-rich precipitates can be oxidized by treatment in an oxalate solution to soluble iron(III) species that are subsequently hydrolyzed with $NH_4OH$ to give an iron oxide/hydroxide precipitate and an ammonium oxalate solution. Alternatively, the iron-rich precipitates can be calcined or hydrothermally treated to form various iron oxide phases. These routes are described in "Iron Oxides in the Laboratory" by U. Schwertmann and R. M. Cornell, Wiley VCH, $2^{nd}$ Edition, Weinheim, 2003.

Ammonium hydrogen oxalate can be recovered and recycled from ammonium oxalate produced in various steps and embodiments of the processes. The recovered ammonium hydrogen oxalate can be used for further ilmenite ore digestion. Hydrated ammonium oxalate is derived from processing of both iron-rich solutions and titanium-rich solutions. The hydrated ammonium oxalates can be combined or processed independently. The ammonium oxalate solutions are crystallized into $(NH_4)_2C_2O_4.H_2O$ and then heated in a furnace at 140° C. to 200° C. in the presence of steam to form ammonium hydrogen oxalate. The ability to recycle the oxalate-containing reagents and ammonia reduces the operating cost of the process.

EXAMPLES

Example 1

In a 500 ml PFA bottle were charged 5.69 g $FeTiO_3$ (Aldrich, −100 mesh, Catalog Number 40,087-4, CAS Number [12022-71-8]), 14.18 g $H_2C_2O_4.2H_2O$ (Aldrich reagent grade oxalic acid dihydrate, Catalog Number 24,753-7, CAS Number [6153-56-7]), 15.99 g $(NH_4)_2C_2O_4.H_2O$ (Aldrich reagent grade ammonium oxalate monohydrate, Catalog Number 22,171-6, CAS Number [6009-70-7]) and 47.97 g DI water. The oxalate to Ti ratio of this mixture was 6.0 and the concentration of oxalate in aqueous solution was 4.2 m. The bottle was sealed (a gross mass of 368.90 g was recorded) and then placed inside a pressure vessel where it was heated over 2 h to 140° C. and held at that temperature for 8 h before allowing to cool. The pressure in the vessel was observed to drift up to a maximum of 52 psig during the course of this experiment. Under these conditions, oxalic acid and ammonium oxalate monohydrate react to form ammonium hydrogen oxalate. The bottle was removed from the vessel and its gross mass was measured to be 368.30 g indicating a loss of 0.60 g. This loss could be attributed to the decomposition of 0.0083 moles or 3.7% of the available oxalate. The slurry contents were passed through a 0.2 µm nylon filter membrane and DI wash water was also passed through the solids to produce a total combined filtrate mass of 197.68 g. This liquid was analyzed three times by ICP and found on average to contain 5227 ppm elemental Fe and 8590 ppm elemental Ti for a molar Fe/Ti ratio of 0.5219. This Ti content amounts to the dissolution of at least 94% of the Ti available in the starting material.

Example 2

In a 250 ml glass Buchi autoclave were charged 13.66 g $FeTiO_3$ (Aldrich, −100 mesh, Catalog Number 40,087-4, CAS Number [12022-71-8]), 45.38 g $H_2C_2O_4.2H_2O$ (Aldrich reagent grade oxalic acid dihydrate, Catalog Number 24,753-7, CAS Number [6153-56-7]), 51.16 g $(NH_4)_2C_2O_4.H_2O$ (Aldrich reagent grade ammonium oxalate monohydrate, Catalog Number 22,171-6, CAS Number [6009-70-7]) and 110.25 g DI water. The oxalate to Ti ratio of this mixture is 8.0 and the concentration of oxalate in aqueous solution is 5.5 m. The reactor vessel was sealed and agitation was started at 125 rpm. Nitrogen was bubbled through the slurry for 5 min and allowed to vent through a port in the reactor lid to displace trapped air. The vent was then closed and the reactor chamber was filled with nitrogen to bring the starting pressure to 40 psig. Agitation was increased to 500 rpm and heat was supplied by circulating temperature-controlled oil through a glass jacket to bring the temperature up to 140° C. The pressure was regulated at 65 psig by periodically venting while the temperature is maintained at 140° C. for 4 h before cooling the system. Under these conditions, oxalic acid and ammonium oxalate monohydrate react to form ammonium hydrogen oxalate. The reactor contents were filtered at 60° C. through a 0.2 µm nylon membrane and DI wash water is passed through the solids before they were dried to a net mass of 17.37 g. The filtrate was further cooled to room temperature and crystals formed. This slurry was filtered again through a 0.2 µm nylon filter membrane and sufficient DI wash water was passed through the crystals to bring the total combined filtrate volume up to 400 ml with a measured mass of 424 g. This liquid was analyzed six times by ICP and found on average to contain 927 ppm elemental Fe and 9075 ppm elemental Ti for a molar Fe/Ti ratio of 0.0876. This Ti content amounts to the dissolution of at least 89% of the Ti available in the starting material.

Example 3a 12.3 g $(NH_4)_2TiO(C_2O_4)$—$H_2O$ (ATO) (Aldrich, ammonium titanyl oxalate monohydrate, 99.998%, Catalog Number 22,998-9, CAS Number 10580-03-7) were dissolved in 98 mL DI water and the resulting mixture was filtered to remove undissolved solids. The filtered solution was transferred to a Pyrex® beaker and heated to about 80° C. on a hot plate and stirred with a Teflon®-coated magnetic stirring bar. A solution consisting of 1 part concentrated $NH_4OH$ and 1 part DI water by volume was added dropwise to the ATO solution until a pH of 7.5 was attained. The white slurry was filtered immediately and the filter cake was washed with water heated to about 80° C. The washed cake was dried in air at room temperature. An X-ray powder diffraction (XRPD) pattern of the dried product showed it to be poorly crystalline.

Example 3b

A portion of the dried product from Example 3a was heated in air from room temperature to 800° C. over a time period of 3 h, and held at 800° C. for 1 h. A weight loss of 15.9% was recorded. XRPD of the fired product showed it to be entirely rutile.

Example 3c

A portion of the dried product from Example 3a was heated in air from room temperature to 1000° C. over a time period of 3 h, and held at 1000° C. for 1 h. A weight loss of 15.7% was recorded. XRPD of the fired product showed it to be entirely rutile.

Example 4a 12.3 g $(NH_4)_2TiO(C_2O_4) \cdot H_2O$ (ATO) (Aldrich, ammonium titanyl oxalate monohydrate, 99.998%, Catalog Number 22,998-9, CAS Number 10580-03-7) were dissolved in 98 mL DI water and the resulting mixture was filtered to remove undissolved solids. The filtered solution was transferred to a Pyrex® beaker and heated to about 80° C. on a hot plate and stirred with a Teflon®-coated magnetic stirring bar. A solution consisting of 1 part concentrated $NH_4OH$ and 1 part DI water by volume was added dropwise to the ATO solution until a pH of 7.5 was attained. The white slurry was stirred at 80° C. for 4 h after which time it was filtered and the filter cake was washed with water heated to about 80° C. The washed cake was dried in air at room temperature. XRPD of the dried product showed it to be poorly crystalline.

Example 4b

A portion of the dried product from Example 4a was heated in air from room temperature to 800° C. over a time period of 3 h, and held at 800° C. for 1 hour. A weight loss of 15.8% was recorded. XRPD of the fired product showed it to be entirely rutile.

Example 4c

A portion of the dried product from Example 4a was heated in air from room temperature to 1000° C. over a time period of 3 h, and held at 1000° C. for 1 h. A weight loss of 15.4% was recorded. XRPD of the fired product showed it to be entirely rutile.

Example 5a 12.3 g $(NH_4)_2TiO(C_2O_4) \cdot H_2O$ (ATO) (Aldrich, ammonium titanyl oxalate monohydrate, 99.998%, Catalog Number 22,998-9, CAS Number 10580-03-7) were dissolved in 98 mL DI water and the resulting mixture was filtered to remove undissolved solids. The filtered solution was transferred to a Pyrex® beaker and heated to about 80° C. on a hot plate and stirred with a Teflon®-coated magnetic stirring bar. A solution consisting of 1 part concentrated $NH_4OH$ and 1 part DI water by volume was rapidly poured into the ATO solution to achieve a pH of about 7.5. The white slurry was filtered immediately and the filter cake was washed with water heated to about 80° C. The washed cake was dried in air at room temperature. XRPD of the dried product showed it to be poorly crystalline.

Example 5b

A portion of the dried product from Example 5a was heated in air from room temperature to 800° C. over a time period of 3 h, and held at 800° C. for 1 h. A weight loss of 14.1% was recorded. XRPD of the fired product showed it to be entirely rutile.

Example 5c

A portion of the dried product from Example 5a was heated in air from room temperature to 1000° C. over a time period of 3 h, and held at 1000° C. for 1 h. A weight loss of 15.7% was recorded. XRPD of the fired product showed it to be entirely rutile.

Example 6a 12.3 g $(NH_4)_2TiO(C_2O_4) \cdot H_2O$ (ATO) (Aldrich, ammonium titanyl oxalate monohydrate, 99.998%, Catalog Number 22,998-9, CAS Number 10580-03-7) was dissolved in 98 mL DI water and the resulting mixture was filtered to remove undissolved solids. The filtered solution was transferred to a Pyrex® beaker and heated to about 80° C. on a hot plate and stirred with a Teflon®-coated magnetic stirring bar. A solution consisting of 1 part concentrated $NH_4OH$ and 1 part DI water by volume was rapidly poured into the ATO solution to achieve a pH of about 7.5. The white slurry was stirred at 80° C. for 4 h after which time it was filtered and the filter cake was washed with water heated to about 80° C. The washed cake was dried in air at room temperature. XRPD of the dried product showed it to be poorly crystalline.

Example 6b

A portion of the dried product from Example 6a was heated in air from room temperature to 800° C. over a time period of 3 h, and held at 800° C. for 1 h. A weight loss of 14.6% was recorded. XRPD of the fired product showed it to be entirely rutile.

Example 6c

A portion of the dried product from Example 6a was heated in air from room temperature to 1000° C. over a time period of 3 h, and held at 1000° C. for 1 h. A weight loss of 14.8% was recorded. XRPD of the fired product showed it to be entirely rutile.

Example 7a 29.4 g $(NH_4)_2TiO(C_2O_4) \cdot H_2O$ (ATO) (Aldrich, ammonium titanyl oxalate monohydrate, 99.998%, Catalog Number 22,998-9, CAS Number 10580-03-7) was dissolved in 100 mL DI water and the resulting mixture was centrifuged to remove undissolved solids. One-half of the clarified solution was stirred in a Pyrex® beaker with a Teflon®-coated magnetic stirring bar. 3.15 g $H_2C_2O_4 \cdot 2H_2O$ (Sigma Aldrich, 99% Reagent Grade, CAS 6153-56-6) and 10.65 g $(NH_4)_2C_2O_4 \cdot H_2O$ (Sigma Aldrich, 99+% Reagent Grade, CAS 609-70-7) were added. The sample was heated on a hot plate to produce clear solution at about 80° C. A solution consisting of 1 part concentrated $NH_4OH$ and 1 part DI water by volume was added dropwise to the ATO solution to achieve a pH of about 7.5. The thick slurry was thinned with 10 mL DI water and transferred to a filter funnel and washed three times with 100 mL portions of room temperature DI water. The filter cake was dried in air at room temperature. XRPD of the dried product exhibited a complex pattern indicating a low level of crystallinity, and consisted of a hydrous titanium oxalate ("complex" pattern), "anatase-like" peaks, and some ammonium oxalate.

Example 7b

A portion of powder from Example 7a was heated in air from room temperature to 800° C. over a time period of 3 h, and held at 800° C. for 1 hour. A weight loss of 48.9% was recorded. XRPD of the fired product showed it to be entirely rutile.

Example 7c

A portion of powder from Example 7a was heated in air from room temperature to 1000° C. over a time period of 3 h, and held at 1000° C. for 1 h. A weight loss of 48.9% was recorded. XRPD of the fired product showed it to be entirely rutile.

Example 7d

A portion of Example 7a was heated in air from room temperature to 600° C. over a time period of 2 h, and held at 600° C. for 1 h. The sample had a weight loss of 51.2%. XRPD of the fired product showed it to be entirely anatase.

Example 7e 29.4 g $(NH_4)_2TiO(C_2O_4).H_2O$ (ATO) (Aldrich, ammonium titanyl oxalate monohydrate, 99.998%, Catalog Number 22,998-9, CAS Number 10580-03-7) was dissolved in 100 mL DI water and the resulting mixture was centrifuged to remove undissolved solids. One-half of the clarified solution was stirred in a Pyrex® beaker with a Teflon®-coated magnetic stirring bar. 3.15 g $H_2C_2O_4.2H_2O$ (Sigma Aldrich, 99% Reagent Grade, CAS 6153-56-6) and 10.65 g $(NH_4)_2C_2O_4.H_2O$ (Sigma Aldrich, 99+% Reagent Grade, CAS 609-70-7) were added. The sample was heated on a hot plate to produce clear solution at about 80° C. A solution consisting of 1 part concentrated $NH_4OH$ and 1 part DI water by volume was added dropwise to the ATO solution to achieve a pH of about 7.5. The thick slurry was thinned with 10 mL DI water and transferred to a filter funnel and washed three times with 100 mL portions of water heated to about 90° C. The filter cake was dried in air at room temperature. XRPD of the dried product exhibited "anatase-like" peaks.

Example 7f

A portion of powder from Example 7e was heated in air from room temperature to 800° C. over a time period of 3 h, and held at 800° C. for 1 hour. A weight loss of 42.4% was recorded. XRPD of the fired product showed it to be entirely rutile.

Example 7g

A portion of powder from Example 7e was heated in air from room temperature to 1000° C. over a time period of 3 h, and held at 1000° C. for 1 h. A weight loss of 42.8% was recorded. XRPD of the fired product showed it to be entirely rutile.

Example 8a 29.4 g $(NH_4)_2TiO(C_2O_4).H_2O$ (ATO) (Aldrich, ammonium titanyl oxalate monohydrate, 99.998%, Catalog Number 22,998-9, CAS Number 10580-03-7) was dissolved in 100 mL DI water and the resulting mixture was centrifuged to remove undissolved solids. The clarified solution was split into two equal portions and each portion was stirred in a Pyrex® beaker with a Teflon®-coated magnetic stirring bar. To each portion was added 3.15 g $H_2C_2O_4.2H_2O$ (Sigma Aldrich, 99% Reagent Grade, CAS 6153-56-6) and 10.65 g $(NH_4)_2C_2O_4.H_2O$ (Sigma Aldrich, 99+% Reagent Grade, CAS 609-70-7). Both samples were heated on a hot plate to boiling (about 101° C.) to produce clear solutions. A solution consisting of 1 part concentrated $NH_4OH$ and 1 part DI water by volume was added dropwise to each ATO solution to achieve a pH of about 7.5.

The product was transferred to a filter funnel and washed four times with 100 mL portions of hot DI water. The wash water was first heated to boiling on a hot plate, then quickly removed from the hot plate and poured onto the titanium-containing cake. XRPD of the air-dried product showed only "anatase-like" lines.

Example 8b

A portion of powder from Example 8a was heated in air from room temperature to 800° C. over a time period of 3 h, and held at 800° C. for 1 h. A weight loss of 42.9% was recorded. XRPD of the fired product showed it to be entirely rutile.

Example 8c

A portion of powder from Example 8a was heated in air from room temperature to 1000° C. over a time period of 3 h, and held at 1000° C. for 1 h. A weight loss of 42.5% was recorded. XRPD of the fired product showed it to be entirely rutile.

Example 8d

A portion of Example 8a was heated in air from room temperature to 600° C. over a time period of 2 h, and held at 600° C. for 1 h. The sample had a weight loss of 43.4%. XRPD of the fired product showed it to be entirely anatase.

Example 8e 29.4 g $(NH_4)_2TiO(C_2O_4).H_2O$ (ATO) (Aldrich, ammonium titanyl oxalate monohydrate, 99.998%, Catalog Number 22,998-9, CAS Number 10580-03-7) was dissolved in 100 mL DI water and the resulting mixture was centrifuged to remove undissolved solids. The clarified solution was split into two equal portions and each portion was stirred in a Pyrex® beaker with a Teflon®-coated magnetic stirring bar. To each portion was added 3.15 g $H_2C_2O_4.2H_2O$ (Sigma Aldrich, 99% Reagent Grade, CAS 6153-56-6) and 10.65 g $(NH_4)_2C_2O_4.H_2O$ (Sigma Aldrich, 99+% Reagent Grade, CAS 609-70-7). Both samples were heated on a hot plate to boiling (about 101° C.) to produce clear solutions. A solution consisting of 1 part concentrated $NH_4OH$ and 1 part DI water by volume was added dropwise to each ATO solution to achieve a pH of about 7.5.

The product was allowed to stir at boiling for 2 h, after which time it was transferred to a filter funnel and washed four times with 100 mL portions of hot DI water. The resulting filter cake was dried in air at room temperature. XRPD of the dried product showed only "anatase-like" lines.

Example 8f

A portion of powder from Example 8e was heated in air from room temperature to 800° C. over a time period of 3 h, and held at 800° C. for 1 h. A weight loss of 45.0% was recorded. XRPD of the fired product showed it to consist of 95% rutile and 5% anatase.

Example 8g

A portion of powder from Example 8e was heated in air from room temperature to 1000° C. over a time period of 3 h, and held at 1000° C. for 1 h. A weight loss of 43.1% was recorded. XRPD of the fired product showed it to be entirely rutile.

Example 9a 96.0 g $(NH_4)_2TiO(C_2O_4).H_2O$ (ATO) (Aldrich, ammonium titanyl oxalate monohydrate, 99.998%, Catalog Number 22,998-9, CAS Number 10580-03-7) were dissolved in 400 mL DI water and the resulting mixture was filtered to remove undissolved solids. The filtered solution was transferred to a jacketed Pyrex® round-bottomed flask equipped with a water-cooled condenser and heated to 90° C. with stirring using a Teflon®-coated magnetic stirring bar. A solution consisting of 1 part concentrated $NH_4OH$ and 1 part DI water by volume was added dropwise to the ATO solution until a pH of 7.5 was attained. The white slurry was stirred at 90° C. for 15 min after which time it was transferred to a jacketed filter filtered at 90° C. The filter cake was washed several times with water heated to 90° C. until the filtrate had a conductivity of about 500 µS. A small portion of the washed cake was dried in air at room temperature. XRPD showed the dried sample to be nanocrystalline anatase.

Example 9b

A portion of dried sample from Example 9a was heated in air from room temperature to 800° C. over a time period of 3 h, and held at 800° C. for 1 h. XRPD showed the fired product to consist of 99% rutile and 1% anatase.

Example 9c

A portion of a dried sample of Example 9a was mixed with NaCl by grinding in a mortar. The amount of NaCl was 5 wt % based on the weight of dry $TiO_2$. The mixture was heated in air from room temperature to 800° C. over a time period of 3 h, and held at 800° C. for 1 h. XRPD showed the fired product to consist mainly of rutile with a trace of $Na_2Ti_6O_{13}$. No anatase was found.

Example 9d

A portion of dried sample of Example 9a was mixed with NaCl by grinding in a mortar. The amount of NaCl was 5 wt % based on the weight of dry $TiO_2$. The mixture was heated in air from room temperature to 850° C. over a time period of 3 h, and held at 850° C. for 1 h. XRPD showed the fired product to consist mainly of rutile with a trace of $Na_2Ti_6O_{13}$. No anatase was found.

Example 10a

In a 3-L round-bottomed flask equipped with a condenser, thermocouple, and mechanical stirrer, 712.03 g of $(NH_4)_2C_2O_4.H_2O$ (Aldrich reagent grade ammonium oxalate monohydrate, Catalog Number 22,171-6, CAS Number [6009-70-7]) and 630.91 g of $H_2C_2O_4.2H_2O$ (Aldrich reagent grade oxalic acid dihydrate, Catalog Number 24,753-7, CAS Number [6153-56-7]) were mixed with 1057.50 g of DI water and then heated to dissolve the solids. Once dissolved, a sparge tube was inserted below the surface of the liquid and air flow was started. Then 151.85 g of ilmenite ore (Iluka Resources, LTD, Capel, Western Australia, Southwest ilmenite, Sulfate grade) was added. The oxalate to Ti ratio of this mixture is 9.6 and the concentration of oxalate in aqueous solution is 7.5 molal. The system was heated at reflux (~105° C.) for 71.3 h. The resulting mixture was filtered hot. The collected leachate was then placed in ice water and additional solids were removed by filtration. ICP analysis showed 19810 ppm Ti and 19607 ppm Fe contained in the leachate for a molar Fe/Ti ratio of 0.8489.

Example 10b

The leachate from Example 10a was placed into a 2-L round bottomed flask equipped with a condenser, a thermocouple and a mechanical stirrer under an atmosphere of nitrogen and heated to 80° C. with stirring. 31.26 g of Fe powder (Aldrich, <10 µm, 99.94%, Catalog Number 26,795-3, CAS Number [7439-89-6]) was slowly added. The mixture was placed in an ice water bath overnight and then filtered.

Example 10c

To the resulting reduced leachate from Example 10b at room temperature, 68.08 g of $NH_4OH$ (EMD, Catalog Number AX1303-13, CAS Number [1366-21-6] was slowly added to give a final pH of 7.5. Filtration of the resulting precipitate proved difficult. As a result centrifugation was used and the remaining liquids decanted from the solid product. The solids were then washed by resuspension in hot saturated ammonium oxalate solution and recentrifuged. XRPD showed the resulting solids to contain diammonium oxalate monohydrate and amorphous hydrous titanium oxide.

Example 10d

The solids from Example 10c were then washed by resuspension in hot saturated ammonium oxalate solution and recentrifuged. This process was repeated multiple times at which point the solids were resuspended in hot water and centrifuged. XRPD showed the resulting solids to contain diammonium oxalate monohydrate and amorphous hydrous titanium oxide.

Example 11a

A sample of leachate-derived titanium-containing precipitate from Example 10d was heated in an alumina crucible from room temperature to 800° C. over a 2 h period and held at 800° C. for 12 h. XRPD indicated the product to consist of about 75% anatase and 25% rutile. SEM images of the product showed rather shapeless particles.

Example 11b

A sample of leachate-derived titanium-containing precipitate from Example 10d was heated in an alumina crucible from room temperature to 1000° C. over a 3 h period and held at 1000° C. for 12 h. XRPD confirmed the product to be all rutile with an average crystal size of about 60 nm. SEM images of the product showed rounded pieces of $TiO_2$ whose shape was not well-defined.

Example 12a 710.55 g $(NH_4)_2C_2O_4.H_2O$ (Aldrich reagent grade ammonium oxalate monohydrate, Catalog Number 22,171-6, CAS Number [6009-70-7], Lot Number 02309EI), 630.35 g $H_2C_2O_4 \cdot 2H_2O$ (Aldrich reagent grade oxalic acid dihydrate, Catalog Number 24,753-7, CAS Number [6153-56-7]) and 1386.50 g DI water were combined in a 3 L round bottom flask equipped with a condenser, thermocouple, and mechanical stirrer. The contents were brought to reflux and stirred until all solids were in solution. Air was bubbled through a sparge tube into the pot. 151.79 g Ilmenite (Titania A/S, Tellnes, Norway) was added into the pot. The oxalate to Ti ratio of this mixture is 11.8 and the concentration of oxalate in aqueous solution is 6.0 molal. After 72 h, the pot contained an olive-green colored slurry, which was then filtered through a 0.45 μm disposable nylon filter. All solids were removed and the bottle holding the solution was placed in an ice water. The solids formed in the ice bath were filtered off. 2035.01 g of a Kelly-green colored leachate were collected.

Example 12b 2008.92 g of the solution from Example 12a was then treated with 26.57 g Fe powder (Aldrich, <10 μm, 99.94%, Catalog Number 26,795-3, CAS Number [7439-89-6]). After reduction (as indicated by the formation of a blue-colored precipitate when mixed with ammonium hydroxide), the solution was filtered. From this process, 1501.76 g of a root-beer colored reduced leachate was collected.

Example 12c

The solution from Example 12b was titrated with $NH_4OH$ to precipitate the titanium species. 99.35 g $NH_4OH$ (Aldrich) was added to bring the solution to a final pH of 7.58. After stirring for 40 minutes, the pH had dropped to 7.30 and the opaque, bluish slurry was centrifuged to collect the solids. Once collected, the solids were washed repeatedly by reslurrying them in various liquids, centrifuging, decanting the liquids, and repeating. Details of the washes are as follows:
  5 washes with a saturated solution of ammonium oxalate (3530.33 g total used)
  2 washes with 0.25 M ammonium oxalate solution (1216.83 g total used)
  1 wash with pH 7.5 DI water (673.42 g)
  1 wash with 0.25 M ammonium oxalate solution (632.85 g)
The washed solids were combined with 2136.26 g DI water and 255.24 g $H_2C_2O_4 \cdot 2H_2O$ (Aldrich reagent grade oxalic acid dihydrate, Catalog Number 24,753-7, CAS Number [6153-56-7]), heated to 95° C. and stirred until the pH dropped to 1.73. Not all solids went back into solution. 353.11 g of the slurry was removed for small side experiments, leaving 2393.56 slurry, which was centrifuged to remove 220.25 g gray gelatinous sludge. The result was 2171.26 g solution. This solution was titrated to pH 7.69 with 171.99 g $NH_4OH$ (Aldrich Catalog #AX1303-6). The resulting slurry was centrifuged and solids were collected (38.06% solids). XRPD showed the product to contain diammonium oxalate monohydrate and a complex pattern for the hydrous titanium oxide.

Example 13a 711.71 g Ammonium oxalate monohydrate (Aldrich Catalog #22171-6 Lot 02309EI), 630.58 g $H_2C_2O_4 \cdot 2H_2O$ (Aldrich Catalog #247537) and 1719.62 g DI water were combined in a 3 L round bottom flask. The contents were brought to reflux and stirred until all solids were in solution. Air was bubbled through a sparge tube into the pot. pH of the slurry=2.67 (taken at 90° C. with automatic temperature compensation). 151.86 g Ilmenite (Iluka Resources LTD, Capel, Australia) was added into the pot. The oxalate to titanium ratio of this mixture is 9.6 and the concentration of oxalate in aqueous solution is 5.0 molal. After 68 h, the pot contained an olive-green slurry which was then filtered thru a 0.45 μm disposable nylon filter, under a blanket of nitrogen. All solids were removed and the bottle holding the solution was placed in an ice water. The solids formed in the ice bath were filtered off. 2054.50 g of Kelly-green leachate was collected. ICP analysis showed the leachate contained 16600 ppm Fe and 16150 ppm Ti for a molar Fe/Ti ratio of 0.8816.

Example 13b 1121.92 g of the solution from Example 13a was refiltered, heated to 80° C. and then treated with 17.2 g Fe powder (Aldrich Catalog #267953). After reduction (as indicated by the formation of a blue colored precipitate when mixed with ammonium hydroxide), the solution was filtered. From this process, 768.34 g of a root beer colored solution were collected. ICP analysis showed 459 ppm Fe and 12115 ppm Ti for a molar Fe/Ti ratio of 0.0325. Some oxidation of the leachate was observed and an additional 1.92 g of Fe powder was added with the solution at 80° C. After cooling overnight, the mixture was filtered and 722.84 g of a root beer colored solution (pH 5.15) were collected.

Example 13c

The solution from Example 13b was titrated with $NH_4OH$ to precipitate out a titanium precursor. 24.01 g $NH_4OH$ (Aldrich) was added to bring the solution to a final pH of 7.75. Resulting slurry was opaque and blue. Air was bubbled thru the slurry until it was cream in color. The slurry was centrifuged to collect the solids. Once collected, the solids were washed repeatedly by reslurrying them in various liquids, centrifuging, decanting the liquids, and repeating. Details of the washes are as follows:
  5 washes with a saturated solution of ammonium oxalate (2697.68 g total used)
  1 wash with DI water (552.21 g)
  4 washes with a saturated solution of ammonium oxalate (3077.80 g total used)
  1 wash with pH 7.5 DI water (960.23 g)
After centrifuging, the solids were collected and analyzed with XRPD and shown to contain amorphous hydrous titanium oxide.

Example 14a

A sample of the oxalate-containing amorphous hydrous titanium oxide from Example 10c was heated in an alumina crucible at 1000° C. for 1 hour. XRPD indicated the product to be rutile with an average crystal size of 72 nm.

Example 14b

A sample of the amorphous anatase-like hydrous titanium oxide from Example 13c was heated in an alumina crucible at 1000° C. for 1 hour. XRPD indicated the product to be rutile with an average crystal size of 68 nm.

Example 14c

A sample of oxalate-containing hydrous titanium dioxide from Example 12c was heated in an alumina crucible at 1000° C. for 1 hour. XRPD indicated the product to be rutile with an average crystal size of 53 nm.

Example 15a 1820 g DI water, 630 g $H_2C_2O_4 \cdot 2H_2O$ (Aldrich, catalog number 247537), 710 g ammonium oxalate monohydrate (Aldrich, catalog number 221716) and 296 g Iluka Capel ore (Iluka Resources LTD, Capel, Australia) was added to a 4 L glass resin kettle equipped with a heating mantle. The oxalate to titanium ratio of this mixture is 4.9 and the concentration of oxalate in aqueous solution is 4.8 molal. A 4-neck glass lid with vacuum grease was placed on the kettle and clamped shut. In the center port was placed a stir motor with glass stir rod and Teflon® blade. In the three remaining outer ports, a condenser left open to laboratory atmosphere, and two stoppers were placed.

The mixture was stirred at about 300-400 rpm and the temperature raised to reflux (105° C.). Heating of the mixture was continued at reflux for a total of 117 h. The hot solution was transferred to a 0.2 micron ZapCap® filter funnel for vacuum filtration to remove undissolved ore. The filtrate was allowed to cool to room temperature. Once the oxalate solids crystallized out, the leachate was filtered through a 0.45 micron cellulose acetate filter funnel. A total of 2754 g olive-colored unreduced leachate was collected.

Example 15b

The unreduced leachate (2754 g) from Example 15a was transferred to a 4 L glass resin kettle equipped with a heating mantle. A 4-neck glass lid with vacuum grease was placed on the kettle and clamped shut. In the center port was placed a stir motor with glass stir rod and Teflon® blade. In the three remaining outer ports, a condenser equipped with a mineral oil bubbler, a Teflon®-coated thermocouple, and a nitrogen purge line were placed. The nitrogen flow rate was set to deliver about 2-3 bubbles per second.

The leachate was stirred at about 300-400 rpm and the temperature was raised to ~80° C. Added 20 g Fe powder (Aldrich, catalog number 255637). After 30 minutes, a "blue test" was performed. The blue test consists of adding three drops of sample to ~0.5 mL 30% $NH_4OH$ (EMD, catalog number AX130313). If the mixture turns blue, then the leachate has been reduced. The leachate sample failed the blue test. Another 15 g of Fe powder was added before the mixture passed the blue test. The heat was turned off and the mixture was stirred for 89 h. The mixture was filtered through a 0.2 micron ZapCap® filter funnel to remove iron oxalate solids. A lid equipped with a hose barb fitting was used on the filter funnel so that the vacuum pulls nitrogen through the filter cake as filtration took place. Once the filter cake became exposed, it was spray-washed with DI water (~1044 g) until the filtrate turned yellow. 2183 g of reduced leachate was collected and stored in a 2 L bottle under nitrogen. ICP analysis showed the sample to have a molar Fe/Ti Ratio of 0.010.

Example 15c

In a 2-Liter glass resin kettle equipped with a heating mantle, 500 g of reduced leachate prepared as described in Example 15b was diluted with 500 g DI $H_2O$. A 4-neck glass lid with a Viton® o-ring seal was placed on the kettle and clamped shut. In the center port was placed a stir motor with glass stir rod and Teflon® blade. In the three remaining outer ports, a condenser equipped with a mineral oil bubbler, a Teflon®-coated thermocouple, and a nitrogen purge line were placed. In the nitrogen purge line a "tee-connector" was inserted and connected to an anhydrous ammonia gas cylinder equipped with fine metering valve. The nitrogen flow rate was set to deliver about 2-3 bubbles per second.

The diluted solution was stirred at about 300-400 rpm and the temperature was raised to 83-85° C. at which point 81.3 g of ammonium oxalate monohydrate (Aldrich, catalog number 221716) was added. Once the temperature was restabilized at 83-85° C., the thermocouple was replaced with a pH probe and showed the solution pH to be about 4.2. Ammonia (MG Industries) was then added to the flowing nitrogen at a rate such that the pH increased to about 6.0 in approximately 35-40 min with a temperature increase of less than 10° C. Once the pH reached 6.0, the ammonia was turned off. Under flowing nitrogen, the mixture was stirred for another 8 min at temperature. During this period the pH dropped to about 5.9. More ammonia was added until pH was reached 6.1. The ammonia was then turned off again and the mixture stirred for another 11 min at temperature. Final pH was 6.0.

The resulting off-white colored slurry was then placed in a 2-L Büchner funnel insulated with 3-inch wide insulating gauze that had been heated in a vacuum oven at 75° C. for at least 1 hour. The hot slurry is allowed to settle for approximately 15 seconds prior to application of vacuum (−16 to −20 inches Hg). Filtration was complete in about 1-1.5 h. Once the filter cake became exposed toward the end of the filtration, it was sprayed with a hot (~60° C.) solution of pH 7 saturated ammonium oxalate (Aldrich, catalog number 221716) solution from a plastic spray bottle. This process was continued until the filtrate was colorless (~170 g of solution). The filter cake was then dried on the filter.

The cake was transferred back to the kettle using minimal DI $H_2O$. Then 150 mL of warm (30° C.) 30% $NH_4OH$ (EMD, catalog number AX1303-13) was added. In this case the slurry was stirred as before except the system was left open to the laboratory atmosphere. The slurry was stirred until the cake was well dispersed then filtered using the hot, insulated Büchner funnel as described above. The cake was washed with ~100 g of warm (30° C.) 30% ammonium hydroxide. The resulting cake (~119 g) was ~7 mm high.

Example 16a 0.4 g of leachate-derived titanium-containing precipitate from Example 15c was heated in an alumina crucible from room temperature to 600° C. over a 2 h period and held at 600° C. for 1 hour. XRPD indicated the product to consist entirely of anatase.

Example 16b 0.4 g of leachate-derived titanium-containing precipitate from Example 15c was heated in an alumina crucible from room temperature to 800° C. over a 2 h period and held at 800° C. for 1 h. XRPD indicated the product to consist mainly of anatase with a trace of rutile.

Example 17

In a 2 L glass resin kettle equipped with a heating mantle, 500 g of reduced leachate prepared as described in Example 15b was diluted with 500 g DI $H_2O$. A 4-neck glass lid with a Viton® o-ring seal was placed on the kettle and clamped shut. In the center port was placed a stir motor with glass stir rod and Teflon® blade. The solution was stirred for 5 days at room temperature while exposed to lab atmosphere. During this time the solution color changed from root beer to olive indicating it was oxidized. In the three remaining outer ports, a condenser opened to lab atmosphere, a Teflon® coated thermocouple and a connection to an anhydrous ammonia gas cylinder equipped with fine metering valve were connected.

The diluted solution was stirred at about 300-400 rpm and the temperature raised to 83-85° C. at which point 81.3 g of ammonium oxalate monohydrate (Aldrich, catalog number 221716) was added. Once the temperature restabilized at 83-85° C., the thermocouple was replaced with a pH probe and showed the solution pH to be about 4.3. Ammonia (MG Industries) was then added at a rate such that the pH increased to about 6.3 in approximately 60 min with a temperature increase of less than 10° C. Once the pH reached 6.3, the ammonia was turned off. The mixture was stirred for another 10 min. During this period the pH stabilized at about 6.2.

The resulting off-white colored slurry was then placed in a 2 L Büchner funnel insulated with 3 in wide insulating gauze that had been heated in a vacuum oven at 75° C. for at least 1 h. The hot slurry is allowed to settle for approximately 15 s prior to application of vacuum (−15 to −16 in Hg). Filtration was complete in about 1-1.5 h. Once the filter cake became exposed toward the end of the filtration, it was sprayed with a hot (~70° C.) solution of pH 7.4 saturated ammonium oxalate (Aldrich, catalog number 221716) solution from a plastic spray bottle. This process was continued until the filtrate was colorless (~171 g of solution). The filter cake was then dried on the filter.

The cake was transferred to a beaker and reslurried with ~150 g of warm 30% ammonium hydroxide. The slurry was transferred back to the kettle using ~100 g DI water then stirred overnight with an outside temperature of 60° C. while left open to the laboratory atmosphere. The next morning, outside temperature was raised to 110° C. (70° C. inside). The slurry was filtered using the hot, insulated Büchner funnel as described above. Filtration was complete in about 10 min. The cake was washed with ~192 g of pH 9.0 DI H$_2$O. The resulting TiO(OH)$_2$ cake weighed 115 g.

Example 18

In a 2 L glass resin kettle equipped with a heating mantle, 500 g of reduced leachate prepared as described in Example 15b was diluted with 500 g DI H$_2$O. A 4-neck glass lid with a Viton® o-ring seal was placed on the kettle and clamped shut. In the center port was placed a stir motor with glass stir rod and Teflon® blade. The solution was stirred for 3 days at room temperature while exposed to lab atmosphere. During this time the solution color changed from root-beer to olive indicating it was oxidized. In the three remaining outer ports, a condenser opened to lab atmosphere, a Teflon®-coated thermocouple and a connection to an anhydrous ammonia gas cylinder equipped with fine metering valve were connected.

The diluted solution was stirred at about 300-400 rpm and the temperature was raised to 83-85° C. at which point 81.5 g of ammonium oxalate monohydrate (Aldrich, catalog number 221716) was added. Once the temperature restabilized at 83-85° C., the thermocouple was replaced with a pH probe and showed the solution pH to be about 4.2. Ammonia (MG Industries) was then added at a rate such that the pH increased to about 6.2 in approximately 30-40 min with a temperature increase of less than 10° C. Once the pH reached 6.2, the ammonia was turned off. The mixture was allowed to stir for another 10 minutes. During this period the pH stabilized at about 6.2.

The resulting off-white colored slurry was then placed in a 2 L Büchner funnel insulated with 3 in wide insulating gauze that had been heated in a vacuum oven at 75° C. for at least 1 h. The hot slurry is allowed to settle for approximately 15 s prior to application of vacuum (−15 to −18 in Hg). Filtration was complete in about 2-2.5 h. Once the filter cake became exposed toward the end of the filtration, it was sprayed with a hot (~75° C.) solution of pH 7.4 saturated ammonium oxalate (Aldrich, catalog number 221716) solution from a plastic spray bottle. This process was continued until the filtrate was colorless (~243 g of solution). The filter cake was then dried on the filter.

The cake was transferred to a beaker and reslurried with ~200 g of warm 30% ammonium hydroxide. The slurry was transferred back to the kettle using ~50 mL 30% NH$_4$OH and then stirred overnight with an outside temperature of 60° C. while left open to the laboratory atmosphere. The next morning, the outside temperature was raised to 140° C. (86° C. inside). The slurry was filtered using the hot, insulated Büchner funnel as described above. Filtration was complete in about 20 min. The cake was washed with ~157 g of pH 9.0 DI H$_2$O. The resulting TiO(OH)$_2$ cake weighed 117 g.

Example 19

In a 2 L glass resin kettle equipped with a heating mantle, 500 g of reduced leachate prepared as described in Example 15c was diluted with 500 g DI H$_2$O. A 4-neck glass lid with a Viton® o-ring seal was placed on the kettle and clamped shut. In the center port was placed a stir motor with glass stir rod and Teflon® blade. The solution was stirred for 3 days at room temperature while exposed to lab atmosphere. During this time the solution color changed from root beer to olive indicating it was oxidized. In the three remaining outer ports, a condenser opened to lab atmosphere, a Teflon®-coated thermocouple and a connection to an anhydrous ammonia gas cylinder equipped with fine metering valve were connected.

The diluted solution was stirred at about 300-400 rpm and the temperature was raised to 83-85° C. at which point 81.5 g of ammonium oxalate monohydrate (Aldrich, catalog number 221716) was added. Once the temperature restabilized at 83-85° C., the thermocouple was replaced with a pH probe and showed the solution pH to be about 4.3. Ammonia (MG Industries) was then added at a rate such that the pH increased to about 6.3 in approximately 50-60 min with a temperature increase of less than 10° C. Once the pH reached 6.3, the ammonia was turned off. The mixture was stirred for another 20 minutes. During this period the pH stabilized at about 6.2.

The resulting off white-colored slurry was then placed in a 2 L Büchner funnel insulated with 3 in wide insulating gauze that had been heated in a vacuum oven at 75° C. for at least 1 h. The hot slurry is allowed to settle for approximately 15 s prior to application of vacuum (−15 to −16 in Hg). Filtration was complete in about 30-40 minutes. Once the filter cake became exposed toward the end of the filtration, it was sprayed with a hot (~75° C.) solution of pH 7.4 saturated ammonium oxalate (Aldrich, catalog number 221716) solution from a plastic spray bottle. This process was continued until the filtrate was colorless (~222 g of solution). The filter cake was then dried on the filter.

The cake was transferred to a beaker and reslurried with ~200 mL of warm 30% ammonium hydroxide. The slurry was transferred back to the kettle using ~50 mL 30% ammonium hydroxide. The outside temperature of the kettle was raised to 130° C. and held for one hour. Slurry was filtered using the hot, insulated Büchner funnel as described above. Filtration was complete in about 10 minutes. The cake was washed with ~150 g of pH 9.0 DI H$_2$O. The resulting TiO(OH)$_2$ cake weighed 68 g.

Example 20a

A 0.3 g sample of leachate-derived titanium precipitate prepared as described in Example 17 was fired in an alumina crucible from room temperature to 800° C. over a 2 h period and held at 800° C. for 1 h. XRPD showed the product to contain all anatase.

Example 20b

A 0.3 g sample of leachate-derived titanium precipitate prepared as described in Example 18 was fired in an alumina crucible from room temperature to 800° C. over a 2 h period and held at 800° C. for 1 h. XRPD showed the product to contain all anatase.

Example 20c

A 0.3 g sample of leachate-derived titanium precipitate prepared as described in Example 19 was fired in an alumina crucible from room temperature to 800° C. over a 2 h period and held at 800° C. for 1 h. XRPD showed the product to contain mainly anatase with a trace of rutile.

Example 21a

A sample of ilmenite ore (Iluka Resources, LTD) was placed into two 1800 mL ceramic jar mills. Using ⅜ inch alumina balls ~1000 mL per jar with voids filled with the ore, the jars were rolled at 72 rpm. Once a day the contents of the jars were screened −325/+400 mesh. Approximately 100 g a day were obtained in that size range.

Example 21b

A mixture containing 378 g of $H_2C_2O_4 \cdot 2H_2O$ (Sigma Aldrich, 99% purity, A.C.S. reagent grade, CAS#6153-56-6, cat no. 24,753-7), 426 g of ammonium oxalate monohydrate (Sigma Aldrich, 99+% purity, A.C.S reagent grade, CAS#6009-70-7, cat no. 221716-2.5KG), 152 g of Capel ilmenite ore (Iluka Resources, LTD, ground to a particle size between 325 and 400 mesh as described in Example 21a), and 1037 g of DI water were added to a 3 L zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor head space was purged with argon at 100 sccm to remove any oxygen from the reactor. The reactor pressure was maintained at a constant 6.45 atm (80 psig) with a back pressure regulator. The reactor was heated at 1 K/min from 298.15 to 413.15 K (25 C to 140° C.) and held at 413.15 K (140° C.)+/−1 K for 12 h. Under these conditions, oxalic acid and ammonium oxalate react to form ammonium hydrogen oxalate. Liquid samples were taken from the reactor through a dip tube and analyzed by ICP for titanium (Ti). Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 1) for the six liquid and vapor samples taken out of the reactor and used to calculate the conversion of titanium in the original ore to the amount of titanium in the liquid phase, the overall amount of the original oxalate that decomposed into carbon monoxide and carbon dioxide. A conversion of 80% is achieved in 6 h. The amount of oxalate decomposed in 6 h was 1.2+/−0.1 wt % of the original amount of oxalate added to the reactor.

TABLE 1

Non-Oxidative Ore Digestion

| Sample | Time (h) | $H_2$ (ppmv) | CO (ppmv) | $CO_2$ (ppmv) | Ti (ppmw) | Conversion (%) |
|---|---|---|---|---|---|---|
| 1 | 1.5 | — | 10376 | 14020 | 14734 | 54 |
| 2 | 3.6 | — | 26083 | 29558 | 17817 | 68 |
| 3 | 5.8 | — | 93839 | 121506 | 20902 | 78 |
| 4 | 8.0 | — | 56995 | 80165 | 20890 | 84 |
| 5 | 10.5 | — | 47006 | 67604 | 21676 | 87 |
| 6 | 12.1 | — | 48150 | 68690 | 21867 | 85 |

Example 22

A mixture containing 378 g of $H_2C_2O_4 \cdot 2H_2O$ (Sigma Aldrich, 99% purity, A.C.S. reagent grade, CAS#6153-56-6, cat no. 24,753-7), 426 g of ammonium oxalate monohydrate (Sigma Aldrich, 99+% purity, A.C.S reagent grade, CAS#6009-70-7, cat no. 221716-2.5KG), 152 g of Capel ilmenite ore (Iluka Resources, LTD, ground to a particle size between 325 and 400 mesh as described in Example 21a), and 1037 g of DI water were added to a 3 L zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor head space was purged with argon at 100 sccm to remove any oxygen from the reactor. The reactor pressure was maintained at a constant 6.45 atm (80 psig) with a back pressure regulator. The reactor was heated at 1 K/min from 298.15 to 413.15 K (25° C. to 140° C.) and held at 413.15 K (140° C.)+/−1 K for 8 h. Under these conditions, oxalic acid and ammonium oxalate react to form ammonium hydrogen oxalate. Liquid samples were taken from the reactor through a dip tube and analyzed by inductively coupled plasma (ICP) for titanium (Ti). Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 2) for the one liquid and vapor sample taken out of the reactor and used to calculate the conversion of titanium in the original ore to the amount of titanium in the liquid phase, the overall amount of the original oxalate that decomposed into carbon monoxide and carbon dioxide. A conversion of 87% is achieved in 8 h. The amount of oxalate decomposed in 8 h is 1.6+/−0.1 wt %.

TABLE 2

Non-Oxidative Ore Digestion

| Sample | Time (h) | $H_2$ (ppmv) | CO (ppmv) | $CO_2$ (ppmv) | Ti (ppmw) | Conversion (%) |
|---|---|---|---|---|---|---|
| 1 | 8.0 | — | 60325 | 82695 | 20890 | 87 |

Example 23

Unreduced leachate from Example 21b and Example 22 was combined and filtered through a 0.2 μm nylon filter funnel. ICP showed that the combined leachate had a molar ratio of Fe/Ti of 0.48. The leachate (1936.0 g) was transferred to a 2 L glass resin kettle equipped with a heating mantle.

Added 13 g Fe granules (Aldrich, catalog number 413054) and 7 g Fe chip (Aldrich, catalog number 267945). A 4-neck glass lid with a Viton® o-ring seal was placed on the kettle and clamped shut. In the center port was placed a stir motor with glass stir rod and Teflon® blade. In the three remaining outer ports, a condenser equipped with a mineral oil bubbler, a Teflon® coated thermocouple, and a nitrogen purge line were placed. The nitrogen flow rate was set to deliver about 2-3 bubbles per second.

The leachate was stirred at about 300-400 rpm and the temperature raised to 82° C. After 24 h, a "blue test" was performed. The blue test consists of adding three drops of sample to ~0.5 mL 30% $NH_4OH$ (EMD, catalog number AX130313, Lot number 45076). If the mixture turns blue, then the leachate has been reduced. The leachate sample passed the blue test. Transferred the reduced leachate to a 0.2 μm cellulose acetate filter funnel to remove iron oxalate solids. A lid equipped with a hose barb fitting on the filter funnel was used so that the vacuum pulls nitrogen through the filter cake as filtration takes place. Once the filter cake became exposed, it was spray-washed with DI water until the filtrate turned yellow (~113 g of wash water). Combined wash water with reduced leachate filtrate (1670.6 g total).

The reduced leachate was stored in a 2 L bottle under nitrogen. ICP showed the sample of leachate to have a molar Fe/Ti Ratio of 0.014. The iron oxalate solid yield was 226 g after drying overnight in a 75° C. vacuum oven.

Example 24

In a 2 L glass resin kettle equipped with a heating mantle, 499.2 g of reduced leachate prepared as described in Example 23 was diluted with 499.2 g DI $H_2O$. A 4-neck glass lid with a Viton® o-ring seal was placed on the kettle and clamped shut. In the center port was placed a stir motor with glass stir rod and Teflon® blade. In the three remaining outer ports, a condenser equipped with a mineral oil bubbler, a Teflon®-coated thermocouple, and a nitrogen purge line were placed. In the nitrogen purge line a "tee-connector" was inserted and connected to an anhydrous ammonia gas cylinder equipped with fine metering valve. The nitrogen flow rate was set to deliver about 2-3 bubbles per second.

The diluted solution was stirred at about 300-400 rpm and the temperature raised to 83-85° C. at which point 81.4 g of ammonium oxalate monohydrate (Aldrich, catalog number 221716) was added. Once the temperature restabilized at 83-85° C., the thermocouple was replaced with a pH probe and showed the solution pH to be about 3.8. Ammonia (MG Industries) was then added to the flowing nitrogen at a rate such that the pH increased to about 6.4 in approximately 35-40 min with a temperature increase of less than 10° C. Once the pH reached 6.4, the ammonia was turned off. Under flowing nitrogen, the mixture was stirred for another 2.5 h at temperature. During this period the pH stabilized at about 6.0.

The resulting gray-colored slurry was then placed in a 2 L Büchner funnel insulated with 3 in wide insulating gauze that had been heated in a vacuum oven at 75° C. for at least 1 h. The hot slurry is allowed to settle for approximately 15 s prior to application of vacuum (−16 to −20 in Hg). Filtration was complete in about 1-1.5 h. Once the filter cake became exposed toward the end of the filtration, it was sprayed with a hot (~80° C.) solution of pH 7 saturated ammonium oxalate (Aldrich, catalog number 221716) solution from a plastic spray bottle. This process was continued until the filtrate was colorless (~250 g of solution). The filter cake was then dried on the filter.

The cake was transferred back to the kettle using ~500 g DI $H_2O$. In this case the slurry was stirred as before except the system was left open to the laboratory atmosphere. Once the cake was well-dispersed 7.2 g of 30% $NH_4OH$ was added to the slurry until pH reaches 9.0 and then allowed to stir overnight. The temperature was then raised to about 90° C. and an additional 89.5 g of 30% $NH_4OH$ was added. The slurry was stirred for 1 h and then filtered using the hot, insulated Büchner funnel as described above. Filtration was complete in about 10 min. The cake was washed with ~200 g of pH 9.0 DI $H_2O$. The resulting cake (~132 g) was ~11 mm high. On drying a sample at 75° C. in a vacuum oven overnight, the material lost 22.5 wt %. ICP showed the sample to have a molar ratio of Fe/Ti of 0.00089 compared to 0.014 for the reduced leachate. Using the standard permanganate test for oxalate, an analysis of the final wet cake showed 0.16 mmoles of oxalate/g.

Example 25a 18.0 mL $TiOCl_2$ solution (9.59% Ti, 16.0 wt % $TiO_2$, 1.512 g/mL) were thoroughly mixed with 23 mL DI water at room temperature with stirring. This titanium-containing solution was rapidly poured into 100 mL DI water that was heated to about 80° C. on a hot plate and stirred with a Teflon®-coated magnetic stirring bar in a Pyrex® beaker. The mixture was stirred for about 15 s and removed from the hot plate. The mixture was cooled to room temperature with continuous stirring, and it was allowed to stir at room temperature for at least 4 h, but not more than about 72 h, before using in experiments.

Example 25b 2.5 g of leachate-derived Ti-ppt cake (19.3 wt % $TiO_2$ on dry basis) from Example 24 were mixed with 1 g of a solution consisting of 2.4 w % $AlCl_3.6H_2O$ in $H_2O$ and 1 g of 2.9 wt % rutile seed suspension (prepared as described in Example 25a) in aqueous HCl solution. The sample was heated to 1150° C. over a period of 3 h and held at 1150° C. for 4 h. XRPD confirmed the product was all rutile.

Example 26

2.5 g of leachate-derived Ti-ppt cake (19.3 wt % $TiO_2$ on dry basis) from Example 24 were mixed with 0.5 g of a solution consisting of 0.19 wt % $KH_2PO_4$, 0.38 wt % $K_2HPO_4$, and 0.09 wt % $Na_2HPO_4$ in $H_2O$, 1 g of a solution consisting of 2.4 wt % $AlCl_3.6H_2O$ in $H_2O$, and 1 g of 2.9 wt % rutile seed suspension in aqueous HCl solution (prepared as described in Example 25a). The sample was heated to 1150° C. over a period of 3 h and held at 1150° C. for 4 h. XRPD confirmed the product was all rutile.

Example 27a

In a 2 L glass resin kettle equipped with a heating mantle, 500 g of reduced leachate prepared as described in Example 15b was diluted with 500 g DI $H_2O$. A 4-neck glass lid with a Viton® o-ring seal was placed on the kettle and clamped shut. In the center port was placed a stir motor with glass stir rod and Teflon® blade. The solution was stirred for 3 days at room temperature while exposed to lab atmosphere. During this time the solution color changed from root beer to olive indicating it was oxidized. In the three remaining outer ports, a condenser opened to lab atmosphere, a Teflon®-coated thermocouple and a connection to an anhydrous ammonia gas cylinder equipped with fine metering valve were connected.

The diluted solution was stirred at about 300-400 rpm and the temperature raised to 83-85° C. at which point 81.5 g of ammonium oxalate monohydrate (Aldrich, catalog number 221716) was added. Once the temperature restabilized at 83-85° C., the thermocouple was replaced with a pH probe and showed the solution pH to be about 4.2. Ammonia (MG Industries) was then added at a rate such that the pH increased to about 6.2 in approximately 30-40 min with a temperature increase of less than 10° C. Once the pH reached 6.2, the ammonia was turned off. The mixture was stirred for another 10 minutes. During this period the pH stabilized at about 6.2.

The resulting off white-colored slurry was then placed in a 2 L Büchner funnel insulated with 3 in wide insulating gauze that had been heated in a vacuum oven at 75° C. for at least 1 h. The hot slurry is allowed to settle for approximately 15 s prior to application of vacuum (−15 to −18 in Hg). Filtration was complete in about 2-2.5 h. Once the filter cake became exposed toward the end of the filtration, it was sprayed with a hot (~75° C.) solution of pH 7.4 saturated ammonium oxalate (Aldrich, catalog number 221716) solution from a plastic spray bottle. This process was continued until the filtrate was colorless (~243 g of solution). The filter cake was then dried on the filter.

The cake was transferred to a beaker and reslurried with ~200 mL of warm 30% ammonium hydroxide. The slurry was transferred back to the kettle using ~50 mL 30% NH$_4$OH then stirred overnight with an outside temperature of 60° C. while left open to the laboratory atmosphere. The next morning, outside temperature was raised to 140° C. (86° C. inside). Slurry was filtered using the hot, insulated Büchner funnel as described above. Filtration was complete in about 20 min. The cake was washed with ~157 g of pH 9.0 DI H$_2$O. The resulting "TiO(OH)$_2$-like" cake weighed 117 g.

Example 27b

A 3 L zirconium autoclave with attached pressure filter, wash vessel, rinse vessel and filtrate receiving vessel was set up. The vessel and the filtrate receiving vessel were washed. 62.7 g of the material of Example 15c and 105.4 g of the material of Example 27a were loaded into the clave along with 686.5 g DI water. An additional 20 mL of DI water was used to complete transfer. 300 mL DI water was loaded into wash vessel and heated to 105° C. under 40 psig nitrogen. The clave was heated to 100° C. with agitation then the slurry was transferred to the pressure filter. With the bypass valve open, upper and lower chambers of the pressure filter were charged with 20 psig nitrogen. The bypass valve was then closed and the bottom chamber pressure adjusted to 18 psig using the backpressure regulator. Pressure filtration took place between 85-102° C. over 25 min using a pressure difference of 2-5 psig. Next, 300 mL of 100° C. wash water was sprayed onto the filter. Wash filtration was complete in 20 min. Heat was turned off to allow solids to cool. A mass of 166.9 g wet titanyl hydroxide was recovered from the pressure filter.

Example 28a, 28b, 28c, 28d, 28e 2.5 g samples of leachate-derived titanium-containing precipitate cake from Example 27b, containing about 0.5 g TiO$_2$ on a dry basis, were heated with NaCl (5 wt % and 33 wt % on TiO$_2$), and with AlCl$_3$.6H$_2$O (1 wt % Al$_2$O$_3$ on TiO$_2$), as described in Table 3 below in an alumina crucible from room temperature to 90° C. over a 1 h period. The material was held at 90° C. for 4 h at which time the temperature was increased to 850° C. over a 3 h period, and held at 850° C. for 1 h.

Results of XRPD analyses are given in the Table 3 and indicate that NaCl greatly assists the formation of rutile, while in the absence of NaCl, anatase is the predominant product. The results also show addition of aluminum chloride counteracts the sodium chloride and stabilizes anatase.

TABLE 3

| | Effect of NaCl and/or AlCl$_3$•6H$_2$O addition to Ti-ppt on calcination product | | | | |
|---|---|---|---|---|---|
| Ingredient (g) | A | B | C | D | E |
| Ti-ppt | 2.5 | 2.5 | 2.5 | 2.5 | 2.5 |
| NaCl | — | 0.025 | 0.167 | 0.025 | 0.167 |
| AlCl$_3$•6H$_2$O | — | — | — | 0.024 | 0.024 |
| H$_2$O | 1 | 1 | 1 | 1 | 1 |
| Product | anatase | anatase + tr. Na$_2$Ti$_6$O$_{13}$ | ~98% rutile ~2% anatase tr. Na$_2$Ti$_6$O$_{13}$ | anatase | anatase |

Example 29

Example 28C was repeated without the initial 4 h heating at 90° C. and the reaction mixture was heated from room temperature to 850° C. over a 3 h period and held at 850° C. for 1 h. From XRPD, the product was identified as mainly rutile with traces of anatase and Na$_2$Ti$_6$O$_{13}$.

Example 30

Example 28A was repeated at 800° C. with no hold at temperature. The reaction mixture was heated from room temperature to 800° C. over a 3 h period. When the temperature reached 800° C., power to the furnace was removed and the furnace and sample cooled naturally to room temperature. The product was found to be all anatase by XRPD.

Example 31a 937.99 g Ammonium Oxalate Monohydrate (Aldrich Catalog #22171), 416.14 g H$_2$C$_2$O$_4$.2H$_2$O (Aldrich Catalog #247537) and 1137.20 g DI water were combined in a 3 L round-bottomed flask. The contents were brought to reflux and stirred until all solids were in solution. Under these conditions, oxalic acid and ammonium oxalate react to form ammonium hydrogen oxalate. The system was placed under a nitrogen blanket. 145.02 g Ilmenite (Iluka, Capel) was added into the pot. The oxalate to titanium ratio of this mixture is 9.9 and the concentration of oxalate in aqueous solution is 7.2 molal. After 72 h, the pot contained an olive-green slurry which was then filtered through two 0.45 μm disposable nylon filters. All solids were removed and the bottles holding the solution were placed in an ice water bath. The solids formed in the ice bath were filtered off. 1245.06 g of Kelly-green leachate was collected. ICP analysis showed the leachate to contain 12250 ppm Fe and 18150 ppm Ti for a molar Fe/Ti ratio of 0.579.

Example 31b 710.77 g Ammonium oxalate monohydrate (Aldrich Catalog #22171 Lot 02309EI), 630.66 g H2C2O4.2H$_2$O (Aldrich Catalog #247537 Lot 07921TU) and 1387.57 g DI water were combined in a 3 L round bottom flask. The contents were brought to reflux and stirred until all solids were in solution.

Under these conditions, oxalic acid and ammonium oxalate react to form ammonium hydrogen oxalate. The system was placed under a nitrogen blanket. 151.82 g Ilmenite (Iluka, Capel) was added into the pot. The oxalate to titanium ratio of this mixture is 9.6 and the concentration of oxalate in aqueous solution is 6.0 molal. After 25 h, the pot contained an olive-green slurry which was then filtered thru two 0.45 μm disposable nylon filters. All solids were removed and the bottles holding the solution were placed in an ice water bath. The solids formed in the ice bath were filtered off. 1725.93 g of Kelly-green leachate was collected. ICP analysis showed the leachate contained 8400 ppm Fe and 13510 ppm Ti for a molar Fe/Ti ratio of 0.533.

Example 31c 710.66 g Ammonium oxalate monohydrate (Aldrich Catalog #22171 Lot 02309EI), 630.35 g $H_2C_2O_4.2H_2O$ (Aldrich Catalog #247537 Lot 07921 TU) and 1388.55 g DI water were combined in a 3 L round bottomed flask. The contents were brought to reflux and stirred until all solids were in solution. Under these conditions, oxalic acid and ammonium oxalate react to form ammonium hydrogen oxalate. Air was bubbled through a sparge tube into the pot. 151.82 g Ilmenite (Iluka, Capel) was added into the pot. The oxalate to titanium ratio of this mixture is 9.6 and the concentration of oxalate in aqueous solution is 6.0 molal. After 72 h, the pot contained a pale-green slurry that was then filtered thru two 0.45 μm disposable nylon filters. All solids were removed and the bottles holding the solution were placed in an ice water bath. The solids formed in the ice bath were filtered off. 1916.05 g of green leachate was collected. ICP analysis of the leachate showed it contained 15150 ppm Fe and 19650 ppm Ti for a Fe/Ti ratio of 0.661.

Example 31d

Unreduced leachate from Examples 31 a, Example 31 b and Example 31c were combined and filtered through a 0.45 μm cellulose acetate filter funnel. ICP showed that the combined leachate had a molar Fe/Ti ratio of 0.60. The leachate (~3500 mL) was transferred to a 4 L glass resin kettle equipped with a heating mantle. 25 g Fe powder (Aldrich, catalog number 255637) was added. A 4-neck glass lid with vacuum grease was placed on the kettle and clamped shut. In the center port was placed a stir motor with glass stir rod and Teflon® blade. In the three remaining outer ports, a condenser equipped with a mineral oil bubbler, a Teflon®-coated thermocouple, and a humidified nitrogen purge line were placed. The nitrogen flow rate was set to deliver about 2-3 bubbles per second.

The leachate was stirred at about 300-400 rpm and the temperature raised to 85° C. After 64 h, a "blue test" was performed. The blue test consists of adding three drops of sample to ~0.5 mL 30% $NH_4OH$ (EMD, catalog number AX130313). If the mixture turns blue, then the leachate has been reduced. The leachate sample did not pass the blue test. The reduced leachate was transferred to a 0.2 μm cellulose acetate filter funnel to remove iron oxalate solids. A lid equipped with a hose barb fitting on the filter funnel was used so that the vacuum pulls nitrogen through the filter cake as filtration takes place. Once the filter cake became exposed, spray washed with DI water until the filtrate turned yellow (~56 g of wash water). Stored ~3500 mL of reduced leachate in a 4 L bottle under nitrogen. ICP showed the sample to have a molar Fe/Ti Ratio of 0.35.

Example 31e 1250 g of reduced leachate from Example 31d was transferred to a 2 L bottle to which was added 250 g of DI water. This solution was stirred while exposed to laboratory atmosphere for 2 days so it would oxidize. The solution was filtered through a 0.2 μm ZapCap®filter funnel to remove yellow solids that had formed. The filtration step yielded 1440 g green colored leachate.

All of the leachate was transferred to a 2 L glass resin kettle equipped with a heating mantle. The leachate was heated to 85° C. Then 99.7 g ammonium oxalate monohydrate (Aldrich, catalog number 221716) which had been ground in a mortar and pestle was added. Once temperature was re-established at 85° C., the solution was titrated with ammonia gas (MG Industries) until pH is maintained at 7.0. The solution was now a lime-colored slurry with the consistency of milk. The solution was stirred over the weekend at 75° C. After stirring, the solution was beige-colored slurry with the consistency of milk and a pH of 7.0. The temperature was brought back up to 85° C. The slurry was transferred to a 2 L Büchner funnel insulated with 3 in wide insulating gauze that had been heated in a vacuum oven at 75° C. for at least 1 h. Filtration was finished in 2.5 h using a vacuum of −15 to −18 in Hg. Once the cake became exposed, it was spray washed with 215 g of a saturated solution of ammonium oxalate in water. Another 219 g of saturated ammonium oxalate in water was added to the cake before storing in a beaker. The final product is a 615.8 g mixture of titanyl hydroxide and saturated ammonium oxalate in water.

Example 31f 132 g of water saturated with $H_2C_2O_4.2H_2O$ (Aldrich, catalog number 247537) was added to the titanyl hydroxide slurry from Example 31e. The mixture was heated to 85-90° C. 75 g of $H_2C_2O_4.2H_2O$ (Aldrich, catalog number 247537) and ~75 mL DI water to rinse inside top of beaker was added. After 45 minutes, the mixture dissolved into a green colored solution with a pH of 3.5.

The solution was transferred to a 2 L resin kettle equipped with heating mantle, Teflon®-coated magnetic stir bar, condenser and a nitrogen purge. 2 g Fe granules (Aldrich, catalog number 413054) was added. The solution was heated to 60° C. After 22 h, a "blue test" was performed. The blue test consists of adding three drops of sample to ~0.5 mL 30% $NH_4OH$ (EMD, catalog number AX130313). If the mixture turns blue, then the leachate has been reduced. The sample passed the blue test. The magnetic stir bar was removed which in turn removed all of the undissolved Fe granules. The heat was turned off and the leachate was stirred overnight. The reduced leachate was transferred to a 0.2 μm ZapCap® filter funnel to remove iron oxalate solids. A lid equipped with a hose barb fitting was used on the filter funnel so that the vacuum pulls nitrogen through the filter cake as filtration takes place. Once the filter cake became exposed, it was spray washed with DI water until the filtrate turned yellow (~218 g of wash water). 691.1 g of reduced leachate was stored in a 1 L bottle under nitrogen. ICP showed the sample to have a molar Fe/Ti ratio of 0.017.

Example 31g 676.4 g of reduced leachate was transferred from Example 31f to a 1 L glass resin kettle equipped with a heating mantle. A 4-neck glass lid with a Viton® o-ring seal was placed on the kettle and clamped shut. In the center port was placed a stir motor with glass stir rod and Teflon® blade. In the three remaining outer ports, a condenser equipped with a mineral oil bubbler, a Teflon®-coated thermocouple, and a nitrogen purge line were placed. In the nitrogen purge line a "tee-connector" was inserted and connected to an anhydrous ammonia gas cylinder equipped with fine metering valve. The nitrogen flow rate was set to deliver about 2-3 bubbles per second.

The solution was stirred at about 300-400 rpm and the temperature raised to 87° C. at which point 400 g of DI water was added. Once the temperature restabilized at 87° C., the thermocouple was replaced with a pH probe and showed the solution pH to be about 2.7. Ammonia (MG Industries) was then added to the flowing nitrogen at a rate such that the pH increased to about 6.5 in approximately 60 min with a temperature increase of less than 10° C. Once the pH reached 6.5, the ammonia was turned off. Under flowing nitrogen, the mixture was stirred for another 10 min at temperature. During this period the pH drifted down to 6.4. Ammonia was added until pH reached 6.6 and then the ammonia was turned off. After 15 minutes, the pH stabilized at 6.6.

The resulting gray-colored slurry was then placed in a 2-L Büchner funnel insulated with 3-inch wide insulating gauze that had been heated in a vacuum oven at 75° C. for at least 1 h. The hot slurry was allowed to settle for approximately 15 s prior to application of vacuum (−15 to −16 in Hg). Filtration was complete in about 1-1.5 h. Once the filter cake became exposed toward the end of the filtration, it was sprayed with a hot (~80° C.) solution of pH 7 saturated ammonium oxalate (Aldrich, catalog number 221716) solution from a plastic spray bottle. This process was continued until the filtrate was colorless (~268 g of solution). The filter cake was then dried on the filter.

The cake was then transferred to a beaker using ~426 g DI water. The slurry was stirred, while open to the laboratory atmosphere, using an overhead mixer. Once the cake was well-dispersed 108 g of 30% $NH_4OH$ was added and then allowed to stir overnight. A watch glass was placed on the beaker and the temperature was raised until reflux was observed (60° C.). Heating was continued for 1 h. The final titanyl hydroxide slurry was white and had a mass of ~800 g.

Example 31h

A 3 L zirconium autoclave with attached pressure filter, wash vessel, rinse vessel and filtrate receiving vessel was set up. 800 g of titanyl hydroxide slurry from Example 31 g was loaded into the clave. An additional 75 mL of DI water was used to complete transfer. 800 mL of DI water was loaded into the wash vessel and heated to 120° C. 300 mL of DI water was loaded into the rinse vessel. The clave was heated to 115° C. with 20 psig nitrogen and agitation of 200 rpm. The slurry was transferred to the pressure filter followed by 300 mL of DI water from the rinse vessel. Pressure filtration started at 110° C. with 29 psig nitrogen in the upper chamber and 27 psig in the lower (a pressure drop of 2 psig). Pressure drop was increased to 6 psig to speed the filtration. Filtration was finished in ~1 h. Next, 800 mL of 120° C. wash water was sprayed onto the filter. Wash filtration was complete in 40 minutes. Heat was turned off to allow solids to cool. A mass of 293.7 g wet titanyl hydroxide was recovered from the pressure filter. A portion of the sample was dried. Microanalysis showed 0.82% C and 2.89% N in the material.

Example 32a, 32b

A portion of leachate-derived titanium-containing precipitate cake from Example 31h was dried in air at room temperature and used for experiments 32A and 32B. 0.6 g samples, containing about 0.5 g $TiO_2$ on a dry basis, were ground together with NaCl (a) 5 wt % and (b) 33 wt % NaCl on $TiO_2$ and heated in alumina crucibles from room temperature to 850° C. over a 3 h period, and held at 850° C. for 1 h. Results of XRPD are given in the Table 4 and indicate that NaCl greatly assists the formation of rutile.

TABLE 4

Compositional details and XRPD results

| Ingredient (g) | A | B |
|---|---|---|
| Ti-ppt | 0.6 | 0.6 |
| NaCl | 0.025 | 0.167 |
| Product | ~1:1 rutile:anatase Trace $Na_2Ti_6O_{13}$ | Essentially all rutile with tr. $Na_2Ti_6O_{13}$ |

Example 33a, 33b

A portion of leachate-derived titanium-containing precipitate cake from Example 31h was dried in air at room temperature and used for experiments A and B. 0.6 g samples, containing about 0.5 g $TiO_2$ on a dry basis, were ground together with 0.0005 g $Na_2SO_4$ (Fischer Certified ACS anhydrous), 0.0025 g $K_2SO_4$ (J. T. Baker ACS Reagent 100%), 0.0024 g $NH_4H_2PO_4$ (J. T. Baker Ultrapure Reagent (99.66%), and 0.025 g rutile seed. 0.025 g NaCl (5 wt %, EMP, GR ACS 99.0% min.) was added to sample B and both samples were heated in alumina crucibles from room temperature to 800° C. over a 3 h period, and held at 800° C. for 1 hour. Results of X-ray powder diffraction analyses are given in the Table 5 and indicate that NaCl greatly assists the formation of rutile.

TABLE 5

XRPD Results for Examples 33a and 33b

| | A | B |
|---|---|---|
| Product | Mainly anatase with v. small amount rutile | ~60% rutile, 40% anatase |

Example 34a 36.8 g ammonium titanyl oxalate (ATO), Aldrich 99.998%, were dissolved in 300 mL DI water and the resulting mixture was filtered to remove undissolved solids. The filtered solution was transferred to a Pyrex® beaker and stirred with a Teflon®-coated stirring bar. Concentrated $NH_4OH$ was added dropwise to the ATO solution until a pH of 9 was attained. The white slurry was filtered immediately and the filter cake was washed with 400 mL DI water at room temperature. The Ti-containing cake was transferred to a beaker and 450 mL concentrated $NH_4OH$ were added and the mixture was stirred and boiled for 30 minutes. The precipitate filtered rapidly. The Ti cake was again transferred to a beaker and reslurried with concentrated $NH_4OH$, then boiled for 30 minutes. After collecting the solids on a filter, the cake was transferred to a beaker, slurried with about 450 mL DI water, stirred for one day at room temperature, then boiled for one hour. After collecting the solids, the washed cake was dried in air under IR heat (~40 C). XRPD showed anatase with an average crystal size of 6 nm.

Example 34b

The entire sample from Example 34a was heated to 800° C. over a period of 3 h, and held at 800° C. for 3 h. An XRPD of the fired product showed it to be mainly rutile with a trace of anatase. SEM imaging showed media-milled product to consist mainly of 20-100 nm irregularly-shaped particles.

Example 34c 36.8 g ammonium titanyl oxalate (ATO), Aldrich 99.998%, was dissolved in 300 mL DI water and the resulting mixture was filtered to remove undissolved solids. The filtered solution was transferred to a Pyrex® beaker and stirred with a Teflon®-coated stirring bar. Concentrated $NH_4OH$ was added dropwise to the ATO solution until a pH of 9 was attained. The white slurry was filtered immediately and the filter cake was washed with 400 mL DI water at room temperature. The Ti-containing cake was transferred to a beaker and 450 mL concentrated $NH_4OH$ were added and the mixture was stirred and boiled for 30 minutes. The precipitate filtered rapidly. The Ti cake was again transferred to a beaker and reslurried with concentrated $NH_4OH$ and then boiled for 30 minutes. After collecting the solids on a filter, the cake was transferred to a beaker, slurried with about 450 mL DI water, stirred for one day at room temperature and then boiled for one hour. After collecting the solids, 3.32 g NaCl, dissolved in 10 mL $H_2O$ were mixed into the $TiO_2$ cake, which was then dried in air under IR heat (~40° C.).

Example 34d

The entire sample from Example 34c was heated to 800° C. over a period of 3 h, and held at 800° C. for 1 hour. An XRPD of the fired product showed it to be 95% rutile and 5% anatase. SEM imaging showed media-milled product to consist of well-shaped primary particles in the range of about 100-500 nm and some small, <100 nm, irregularly-shaped particles.

Example 35a 426.30 g Ammonium oxalate monohydrate (Aldrich, CAS 6009-70-7, Catalog #221716-2.5 kg), 378.20 g $H_2C_2O_4 2H_2O$ (Aldrich, CAS 6153-56-6, Catalog #247537) and 838.49 g DI water were combined in a 3 L round bottom flask. The contents were brought to reflux and stirred until all solids were in solution. The pot was purged with nitrogen and then kept under a nitrogen blanket. 151.85 g Ilmenite (Iluka Resources LTD, Capel, Australia) was added into the pot. The oxalate to titanium ratio of this mixture is 5.74 and the concentration of oxalate in aqueous solution is 6.0 molal. After 90 h, the pot contained an olive-green slurry which was then treated with 12.43 g Fe powder (Aldrich, CAS 7439-89-6, Catalog #267953-1 kg). After reduced (as indicated by the formation of a blue colored precipitate when mixed with $NH_4OH$ (EMD Chemicals, CAS 1336-21-6, Catalog #AX1303-6)), the solution was placed in an ice bath and stirred overnight to allow for maximum solids to form. The slurry was filtered through a 0.45 μm disposable nylon filter, under a blanket of nitrogen. From this process, 1118.59 g root beer colored solution was collected.

Example 35b 1080.49 g of the root beer colored solution of Example 35a was mixed with 1000.58 g, deoxygenated DI water. The water was deoxygenated by heating to 90° C. and bubbling nitrogen through a sparge tube into the water for 1 h. The diluted solution (still reduced) was then treated with $NH_4OH$ to precipitate out a titanium precursor. 111.74 g $NH_4OH$ was added to bring the solution to a final pH of 6.34. Resulting slurry is opaque and blue. The slurry was bottled and split into 2 batches. The bottles were set aside for 2 days, and allowed to cool to room temperature. Batch A weighed 479.04 g. Batch B weighed 1538.08 g. The slurries were heated and filtered to collect the solids. Once collected, the solids were washed repeatedly by re-slurrying them in various liquids, heating them to 90° C., filtering and repeating. Details of the washes are as follows:

Batch A 3 washes with saturated ammonium oxalate solution (1564.39 g total)
1 wash with 529.00 g DI water and 250.37 g $NH_4OH$
1 wash with DI water (800.18 g)
The slurry was kept at reflux with a port of the flask open to drive off the ammonia. Water was replaced to keep the volume constant. When the vapors coming off the slurry were 7.0, the slurry was filtered.

Batch B 1 wash with 529.00 g DI water (1568.59 g)
1 wash with 0.20 M ammonium oxalate solution (993.61 g)
2 washes with saturated ammonium oxalate solution taken to pH 7.3 with ammonium hydroxide (2044.06 g total)
1 wash with DI water taken to pH 7.4 with $NH_4OH$ (800.18 g)
2 washes with DI water and $NH_4OH$ (1886.08 g $NH_4OH$ and 842.55 g $H_2O$)
Solids from Batches A and B were combined in a flask with 1667.02 g DI water. The slurry was kept at reflux with a port of the flask open to drive off the ammonia. Water was replaced to keep the volume constant. When the vapors coming off the slurry were at ph ~7.00, the slurry was filtered and the solids were collected.

Example 36a, 36b, 36c 315 g of leachate-derived Ti-ppt cake from Example 35b, containing ~49 g $TiO_2$ on a dry basis was mixed with 49 g of a solution consisting of 0.19 wt % $KH_2PO_4$, 0.38 wt % $K_2HPO_4$, and 0.09 wt % $Na_2HPO_4$ in $H_2O$, 98 g of a solution consisting of 2.4 wt % $AlCl_3.6H_2O$ in $H_2O$, 49 g of a solution consisting of 4.8 wt % NaCl in $H_2O$, and 69 g of 2.9 wt % rutile seed suspension in aqueous HCl solution prepared as described in Example 25a. The mixture was dried in air under IR heat (~40° C.) and powdered in a mortar.

36a:
55 g of the dried mixture were heated to 1050° C. in a fused silica rotary calciner over a period of 3 h and held at 1050° C. for 8 h. XRPD of the product showed it to be all rutile.

36b
2.5 g of the dried mixture were fired in an alumina crucible to 1050° C. over a 12 h period at which point power to the furnace was removed and the sample was allowed to cool naturally to room temperature. An XRPD pattern of the product showed it to be rutile with a trace of $Na_2Ti_6O_{13}$.

36c
2.5 g of the dried mixture prepared as described in Example 36a were fired in an alumina crucible to 1150° C. over a 12 h period at which point power to the furnace was removed and the sample was allowed to cool naturally to room temperature. XRPD of the product showed it to be all rutile.

Example 37a 426.30 g Ammonium oxalate monohydrate (Aldrich, CAS 6009-70-7, Catalog #221716-2.5 kg), 378.25 g $H_2C_2O_4 \cdot 2H_2O$ (Aldrich, CAS 6153-56-6, Catalog #247537) and 832.61 g DI water were combined in a 3 L round bottom flask. The contents were brought to reflux and stirred until all solids were in solution. Under these conditions, oxalic acid and ammonium oxalate react to form ammonium hydrogen oxalate. The pH of the slurry was 2.47 (taken at 90° C. with automatic temperature compensation). 151.75 g Ilmenite (Iluka Resources LTD, Capel, Australia) was added into the pot. The oxalate to titanium ratio of this mixture is 5.8 and the concentration of oxalate in aqueous solution is 6.0 molal. After 72 h, the pot contained an olive-green slurry which was then treated with 12.31 g Fe powder. After reduction, the solution was filtered through a 0.45 μm disposable nylon filter under a blanket of nitrogen. A root beer colored leachate was collected. ICP of the reduced leachate showed it contains 192 ppm Fe and 21069 ppm Ti for a molar Fe/Ti ratio of 0.0078.

Example 37b

In a 2 L flask, 787.89 g DI water was brought to 90° C. and nitrogen was bubbled through the water for 1 h. 948.93 g of the root beer colored leachate from Example 37a were added into the flask. This solution was titrated with $NH_4OH$ to precipitate out a titanium precursor. 94.14 g $NH_4OH$ was added to bring the solution to a final pH of 6.60. Resulting slurry is opaque and blue. The slurry was centrifuged to collect the solids. Once collected, the solids were washed repeatedly by re-slurrying them in various liquids and bringing the temperature to 60° C., centrifuging, decanting the liquids, and repeating. Details of the washes are as follows:
  1 wash with DI water (1000.07 g)
  1 wash with saturated ammonium oxalate solution (760.18 g) and DI water (739.88 g)
The solids were collected for later studies.

Example 37c 639.45 g Ammonium oxalate monohydrate, 567.32 g $H_2C_2O_4 \cdot 2H_2O$ and 1257.21 g DI water were combined in a 3 L round bottom flask. The contents were brought to reflux and stirred until all solids were in solution. Under these conditions, oxalic acid and ammonium oxalate react to form ammonium hydrogen oxalate. Air was bubbled into the solution through a sparge tube for 30 min at 5 psi. 227.72 g Ilmenite (Iluka Resources LTD, Capel, Australia) was added into the pot. The oxalate to titanium ratio of this mixture is 5.8 and the concentration of oxalate in aqueous solution is 6.0 molal. After 74 h, the pot contained an olive-green slurry which was then filtered through a 0.45 μm disposable nylon filter. 1577.34 g boiling DI water was poured over the solids and combined with the filtrate. The diluted leachate was analyzed by ICP to have 12691 ppm Fe and 12484 ppm Ti for a molar Fe/Ti ratio of 0.872.

Example 37d 1959.11 g leachate from Example 37c were combined with 555.37 g DI water, heated to 90° C. and then treated with 21.54 g Fe powder (Aldrich, CAS 7439-89-6, Catalog #267953-1 kg) and allowed to stir overnight while held at temperature. The slurry was then filtered, resulting in 2347.77 g of a root beer colored solution.

Example 37e

In a 2 L flask, 1410.08 g of reduced leachate from Example 37d was brought to 90° C. and titrated with $NH_4OH$ to precipitate out a titanium precursor. 60.63 g $NH_4OH$ was added to bring the solution to a final pH of 6.34 (taken at 90° C. with automatic temperature compensation). Resulting slurry is brownish and opaque. The slurry was filtered and when the wet cake of solids was exposed, it was spritzed with saturated ammonium oxalate solution until the drops of filtrate coming through the frit of the funnel are colorless. The solids were collected for later studies.

Example 37f 2815.69 g leachate from Example 37c was combined with 789.68 g DI water and heated to 90° C. and bubbled with nitrogen. 28.34 g Fe powder was added and allowed to stir overnight, held at temperature. The slurry was then cooled to room temperature and stirred for one week, to maximize solids formation. The result was 2529.41 g of a root beer colored leachate. ICP analysis showed it contained 832 ppm Fe and 18400 ppm Ti for a molar Fe/Ti ratio of 0.0386.

Example 37g

The following outlines the first step of the procedure. In a 1 L flask, 827.17 g of reduced leachate from Example 37f were brought to 85° C. under a blanket of nitrogen and titrated with $NH_4OH$ to precipitate out a titanium precursor. 41.59 g $NH_4OH$ was added to bring the solution to a final pH of 6.04 (taken at 85° C. with automatic temperature compensation). The resulting slurry was blue and opaque. The slurry was filtered through a Büchner funnel that had been wrapped in insulation and heated in the oven at 80° C. for 3 h. The solids collected were re-slurried with 760.20 g saturated ammonium oxalate solution, heated to 60° C. and stirred for 4 days. The solids were collected.

The following outlines the second step of the procedure. In a 1 L flask, 883.55 g of reduced leachate from Example 37f were combined with 75.39 g ammonium oxalate dihydrate, was brought to 85° C. under a blanket of nitrogen and titrated with $NH_4OH$ to precipitate out a titanium precursor. 34.23 g $NH_4OH$ was added to bring the solution to a final pH of 6.16 (taken at 85° C. with automatic temperature compensation). The resulting slurry was stirred, under nitrogen for 2 days and was grey and opaque. The slurry was filtered through a Büchner funnel that had been wrapped in insulation and heated in the oven at 80° C. for 3 h. The solids collected were re-slurried with 656.29 g saturated ammonium oxalate solution, heated to 60° C. and stirred for 4 days. The solids were collected.

The solids from the first step and the second step were combined with 557.65 g DI water, heated to 60° C. and stirred for 1 h. The slurry was filtered through a Büchner funnel that had been wrapped in insulation and heated in the oven at 80° C. for 3 h. The solids were collected for later study.

Example 37h 513.57 g Ammonium Oxalate Monohydrate, 455.70 g $H_2C_2O_4 \cdot 2H_2O$ and 1316.78 g DI water were combined in a 3 L round bottom flask. The contents were brought to reflux and stirred until all solids were in solution. Under these conditions, oxalic acid and ammonium oxalate react to form ammonium hydrogen oxalate. The pH of the slurry was 2.42 (taken at 90° C. with automatic temperature compensation). Air was bubbled into the solution through a sparge tube. 204.09 g Ilmenite (Iluka Resources LTD, Capel, Australia) was added into the pot. The oxalate to titanium ratio of this mixture is 4.8 and the concentration of oxalate in aqueous solution is 5.2 molal. After 74 h, the pot contained an olive-green slurry which was then filtered thru a 0.45 µm disposable nylon filter. Solids that formed as the solution cooled to room temperature were filtered off. A Kelly-green leachate was collected that ICP analysis showed to contain 23469 ppm Fe and 22594 ppm Ti for a molar Fe/Ti ratio of 0.891.

Example 37i

In a 2 L flask, 1075.78 g DI water was brought to 80° C. and combined with 989.09 g of leachate from Example 37h. Nitrogen was bubbled through the solution and it was then treated with 18.80 g Fe powder. The slurry was cooled to room temperature and stirred overnight, then filtered, resulting in 1787.27 g root beer colored leachate, which analyzed by ICP to contain 1716 ppm Fe and 11500 ppm Ti for a molar Fe/Ti ratio of 0.128.

Example 37j 1760.80 g of reduced leachate from Example 37i were titrated with $NH_4OH$ to precipitate out a titanium precursor. 43.64 g $NH_4OH$ was added to bring the solution to a pH of 7.84. 6.19 g $H_2C_2O_4 \cdot 2H_2O$ was added to lower the pH to 7.05 g. 1.02 g $NH_4OH$ was added to bring the solution to a pH of 7.42. Resulting slurry was opaque and blue. The slurry was filtered through a Büchner funnel. The solids were washed repeatedly by reslurrying them in various liquids, filtering and repeating. Details of the washes are as follows:
- 2 washes with DI water (1586.98 g total) (Solids were re-slurried and filtered.)
- 1 wash with 1586.98 g DI water and 33.41 g Pol-E-Z® 2706. (Liquid was decanted off of flocculated solids.)
- 1 wash with 468.59 g saturated ammonium oxalate solution and 2.70 g Pol-E-Z® 2706. (Solids were re-slurried, heated to 90° C., stirred for 2 h.) Slurry was centrifuged. Liquids were decanted.

Solids were collected.

Example 37k 590.27 g of "$TiO(OH)_2$" from Example 37b, 244.36 g of "$TiO(OH)_2$" from Example 37e, 131.27 g of "$TiO(OH)_2$" from Example 37g and 105.86 g of "$TiO(OH)_2$" from Example 37j were combined with 766.87 g saturated ammonium oxalate solution. The slurry was heated to 90° C. under a blanket of nitrogen and stirred for 2 h, then centrifuged and decanted. The solids were washed repeatedly by reslurrying them in various liquids, heating, centrifuging and repeating. Details of the washes are as follows:
- 1 wash with 1503.36 g DI water and 70.43 g ammonium oxalate monohydrate (Aldrich Lot 02039EI) at 80° C. (subsequent washes are filtered, not centrifuged)
- 1 wash with 800.14 g DI water and 135.57 g $NH_4OH$ at 75° C.
- 1 wash with 1053.81 g DI water and 55.27 g $NH_4OH$ at 85° C.
- 1 wash with 800.31 g DI water and 54.19 g $NH_4OH$ at 90° C.
- 1 wash with 1002.76 g DI water and 161.05 g $NH_4OH$ at 90° C.

Solids were collected.

Example 38

Leachate-derived Ti-precipitates from Example 37k were washed with water at room temperature to remove $NH_4OH$ via cycles of stirring and centrifuging until the pH was about 7-8. The slurry used for the experiments contained 13.18 wt % $TiO_2$. A sample of slurry was dried in air at room temperature and XRPD showed the presence of poorly crystalline anatase. C/N analyses gave 0.39 wt % C and 2.36 wt % N.

As described in the Table 6 below, mixtures were prepared and fired. XRPD results indicated anatase and rutile or mixtures as shown in the table. Sodium chloride is a good rutile promoter and particle morphology control agent at 800° C.

TABLE 6

| Run Number, E110365-10- | g of Leachate Ti-ppt E109693-025-1 R6 washed (110365-18), 13.2 wt % $TiO_2$ | g of $H_3PO_4$ Solution 110365-17A, 0.48 wt % $H_3PO_4$ | g of KCl Solution 110365-17B, 0.43 wt % KCl | g of NaCl Solution 110365-17C, 0.07 wt % NaCl | g of NaCl Solution 110365-17D, 3.0 wt % NaCl | Ramp-up hrs | Final Temp C. | Hold Time hrs | % Rutile (ACS) | % Anatase | % other |
|---|---|---|---|---|---|---|---|---|---|---|---|
| 1 | 15.2 | 1 | 3 | 1 | 2 | 5 | 1050 | 4 | 100 | 0 | 0 |
| 11 | 15.2 | 3 | 1 | 3 | 0 | 5 | 1050 | 4 | 99 | 0 | 1.0 unknown |
| 2 | 15.2 | 1 | 3 | 3 | 2 | 5 | 850 | 0 | 60 | 39 | 1.0 unknown |
| 20 | 15.2 | 3 | 1 | 1 | 0 | 5 | 850 | 0 | 0 | 100 | 0 |
| 9 | 15.2 | 3 | 1 | 3 | 2 | 5 | 1050 | 0 | 100 | 0 | 0 |
| 30 | 15.2 | 1 | 3 | 1 | 0 | 5 | 1050 | 0 | 96.5 | 3.5 | 0 |
| 20 | 15.2 | 1 | 1 | 1 | 2 | 15 | 1050 | 0 | 100 | 0 | 0 |
| 25 | 15.2 | 3 | 3 | 3 | 0 | 15 | 1050 | 0 | 96 | 0 | 4.0 unknown |
| 20 | 15.2 | 3 | 1 | 1 | 2 | 5 | 850 | 4 | 99 | 1 | 0 |
| 22 | 15.2 | 1 | 3 | 3 | 0 | 5 | 850 | 4 | 3.7 | 96.3 | 0 |
| 15 | 15.2 | 1 | 1 | 3 | 0 | 15 | 850 | 0 | 0.5 | 99.5 | 0 |
| 27 | 15.2 | 3 | 3 | 1 | 2 | 15 | 850 | 0 | 100 | 0 | 0 |
| 16 | 15.2 | 3 | 3 | 3 | 2 | 15 | 1050 | 4 | 100 | 0 | 0 |
| 31 | 15.2 | 1 | 1 | 1 | 0 | 15 | 1050 | 4 | 100 | 0 | 0 |
| 17 | 15.2 | 1 | 1 | 3 | 2 | 15 | 850 | 4 | 100 | 0 | 0 |

TABLE 6-continued

| Run Number, E110365-10- | g of Leachate Ti-ppt E109693-025-1 R6 washed (110365-18), 13.2 wt % TiO2 | g of H3PO4 Solution 110365-17A, 0.48 wt % H3PO4 | g of KCl Solution 110365-17B, 0.43 wt % KCl | g of NaCl Solution 110365-17C, 0.07 wt % NaCl | g of NaCl Solution 110365-17D, 3.0 wt % NaCl | Ramp-up hrs | Final Temp C. | Hold Time hrs | % Rutlle (ACS) | % Anatase | % other |
|---|---|---|---|---|---|---|---|---|---|---|---|
| 32 | 15.2 | 3 | 3 | 1 | 0 | 15 | 850 | 4 | 3 | 97 | 0 |
| 1B | 15.2 | 1 | 0 | 3 | 0 | 15 | 800 | 0 | 0 | 100 | |
| 38 | 15.2 | 1 | 1 | 3 | 3.33 | 15 | 800 | 0 | 12 | 88 | soluble NaCl |
| 28 | 15.2 | 1 | 0 | 3 | 3.33 | 15 | 850 | 0 | 100 | 0 | soluble NaCl |
| 1B-2 | 15.2 | 1 | 0 | 3 | 0 | 15 | 800 | 0 | 0 | 100 | 0 |
| 3B-2 | 15.2 | 1 | 1 | 3 | 3.33 | 16 | 800 | 4 | 100 | 0 | 0 |

Example 39a, 39b, 39c, 39d, 39e, 39f

A portion of leachate-derived titanium-containing precipitate cake from Example 37k was dried in air at room temperature and used for experiments A and B. A portion of leachate-derived titanium-containing precipitate cake from Example 31h was dried in air at room temperature and used for experiments C, D, E, and F. 0.6 g samples of powder, containing about 0.5 g $TiO_2$ on a dry basis, were mixed with LiCl as indicated in the Table 7 below. The ingredients were ground together in a mortar. The weights of LiCl used were about 0.5 wt %, 2 wt %, 5 wt %, and 33 wt % based on the dry $TiO_2$.

Samples A-D were heated in alumina crucibles from room temperature to 800° C. over a 3 h period, and held at 800° C. for 1 h. Products A-C were found to consist mainly of rutile with small amounts of a Li—Ti—O impurity with more of the impurity in samples using a higher percentage of LiCl. Product D consisted mainly of rutile and contained a small amount of anatase. Samples E and F were heated in alumina crucibles from room temperature to 700° C. over a 2 h period, and held at 700° C. for 1 hour. Products E and F consisted mainly of anatase with small amounts of a Li—Ti—O impurity. Product F with a high LiCl content also contained some rutile. XRPD analyses are given in the Table and indicate that LiCl greatly assists the formation of rutile, while in the absence of LiCl and at higher temperature, Example 28A (see above), anatase is the predominant product.

TABLE 8

| Ingredient (g) | A | B |
|---|---|---|
| Ti-ppt | 0.6 | 0.6 |
| LiCl | 0.010 | 0.0025 |
| Product from | anatase | anatase |
| XRPD | 28 nm | 18 nm |

Example 41a, 41b

A portion of leachate-derived titanium-containing precipitate cake from Example 31h was dried in air at room temperature and used for experiments A and B. 0.6 g samples, containing about 0.5 g $TiO_2$ on a dry basis, were ground together with 0.010 g LiCl (~2 wt % on $TiO_2$) and heated in alumina crucibles. Sample A was heated from room temperature to 700° C. over a 3 h period, and held at 700° C. for 4 h. Sample B was heated from room temperature to 750° C. over a 3 h period, and held at 750° C. for 2 h. Results of XRPD are given in the Table 9 and indicate LiCl assists rutile formation. See Example 39 for comparison above.

TABLE 7

| | A | B | C | D | E | F |
|---|---|---|---|---|---|---|
| Dry Ti-ppt (g) | 0.6 | 0.6 | 0.6 | 0.6 | 0.6 | 0.6 |
| LiCl (g) | 0.025 | 0.17 | 0.010 | 0.0025 | 0.025 | 0.17 |
| Temp (° C.) | 800 | 800 | 800 | 800 | 700 | 700 |
| Product from XRPD | Rutile + Li—Ti—O | Rutile + Li—Ti—O | Rutile + Li—Ti—O | 99% Rutile + 1% Anatase | Anatase + Li—Ti—O tr. | 90% Anatase + 10% Rutile + Li—Ti—O tr. |

Example 40a, 40b

A portion of leachate-derived titanium-containing precipitate cake from Example 31h was dried in air at room temperature and used for experiments A and B. 0.6 g samples, containing about 0.5 g $TiO_2$ on a dry basis, were ground together with LiCl (2 wt % and 0.5 wt % LiCl on $TiO_2$) and heated in alumina crucibles from room temperature to 700° C. over a 2 h period, and held at 700° C. for 1 h. Results of XRPD are given in the Table 8 and indicate that LiCl assists $TiO_2$ crystal size growth.

TABLE 9

| | A | B |
|---|---|---|
| Ti-ppt (g) | 0.6 | 0.6 |
| LiCl (g) | 0.010 | 0.010 |
| Temp (° C.) | 700 | 750 |
| Product from XRPD | 96% anatase, 4% rutile | 98% rutile, 2% Li—Ti—O |

Example 42a, 42b, 42c, 42d 3.5 g samples of leachate-derived Ti-ppt cake (19.3 wt % $TiO_2$ on dry basis) from Example 24 were mixed with sulfate additives and LiCl as shown in Table 10. The sulfate additives were in the form of a solution consisting of 0.19 wt % $KH_2PO_4$, 0.38 wt % $K_2HPO_4$, and 0.09 wt % $Na_2HPO_4$ in $H_2O$. The LiCl was added in the form of a solution consisting of 0.25 wt % LiCl in $H_2O$. The samples were heated to 950° C. over a period of 3 h and held at 950° C. for 4 h. XRPD results are also listed in Table 10. LiCl is a good rutile promoter with and without P, K, and Na additives.

TABLE 10

|  | A | B | C | D |
|---|---|---|---|---|
| Ti-ppt cake (g) | 3.5 | 3.5 | 3.5 | 3.5 |
| $H_2O$ (g) | 1 | 0 | 0.5 | 0 |
| P, K, Na solution (g) | 0 | 0 | 0 | 0.5 |
| LiCl solution(g) | 0 | 1 | 0.5 | 1 |
| Temp (° C.) | 950 | 950 | 950 | 950 |
| Product from XRPD | Anatase | Rutile | 25% Rutile + 75% Anatase | Rutile + trace of Anatase |

Example 43

10.0 g samples of as-received Iluka-Capel ilmenite ore were heated at 300° C., 550° C., and 800° C., for 1 h and for 12 h in air in a rotary calciner equipped with a fused silica tube with baffles. Samples were heated to 300° C. and 500° C. over a 45 min period, and to 800° C. over a 60 min period. A 30% increase in surface area was seen for ore roasted at 300° C.

Example 44

A mixture containing 378 grams of H2C2O4.2H2O (Sigma Aldrich, 99% purity, A.C.S. reagent grade, CAS#6153-56-6, cat no. 24,753-7), 426 grams of ammonium oxalate monohydrate (Sigma Aldrich, 99+% purity, A.C.S reagent grade, CAS#6009-70-7, cat no. 221716-2.5KG), 152 grams of Capel ilmenite ore (Iluka Resources, LTD, ground to a particle size between 325 and 400 mesh as described in Example 21a), 11.6 grams of Fe powder (Sigma Aldrich, <10 micron, 99+% purity, CAS#7439-89-6, cat no. 267953-2506), and 1037 grams of DI water were added to a 3 L zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor head space was purged with argon at 100 sccm to remove any oxygen from the reactor. The reactor pressure was maintained at a constant 6.45 atm (80 psig) with a back pressure regulator. The reactor was heated at 1 K/min from 298.15 K to 373.15 K (25° C. to 100° C.) and held at 373.15 K (100° C.)+/−1 K for 50 h. Liquid samples were taken from the reactor through a dip tube and analyzed by ICP for Ti and Fe. Lithium chloride (Sigma Aldrich, 99+% purity, A.C.S. reagent grade, CAS#7447-41-8, cat no. 310468-1006) was added to each liquid sample and used as an internal standard for accurately determining Ti and Fe concentrations. Vapor samples were taken from the head space of the reactor and analyzed by gas chromatography (Agilent model 6890) for hydrogen, carbon monoxide, and carbon dioxide. Concentration data are provided as a function of time (Table 11) for the five liquid and vapor samples taken out of the reactor and used to calculate the conversion of titanium metal in the original ore to the amount of titanium in the liquid phase, the overall amount of the original oxalate that decomposed into carbon monoxide and carbon dioxide, and the titanium to Fe ratio. A conversion of 80% is achieved in 8 h, after which the conversion slows due to mass transfer limitations (i.e., product layer diffusion control) to a maximum conversion of 88+/−2% in 24 h. The amount of oxalate decomposed in the first 8 h was 0.5+/−0.1 wt % of the original amount of oxalate added to the reactor. The Ti/Fe ratio was about 2.8+/−0.2 on a mass basis. The molar Fe/Ti ratio was 0.290.

TABLE 11

Reductive Ore Digestion

| Sample | Time (h) | $H_2$ (ppmv) | CO (ppmv) | $CO_2$ (ppmv) | Ti (ppmw) | Fe (ppmw) | Conversion (%) |
|---|---|---|---|---|---|---|---|
| 1 | 2 | 39225 | 2714 | 6127 | 10619 | 4225 | 35 |
| 2 | 8 | 5529 | 1769 | 2491 | 25975 | 10347 | 80 |
| 3 | 24 | 2286 | 628 | 1118 | 29408 | 10714 | 90 |
| 4 | 32 | 1763 | 634 | 939 | 28693 | 10253 | 88 |
| 5 | 50 | 450 | 528 | 854 | 27954 | 9436 | 86 |

Example 45

A mixture containing 378 grams of H2C2O4.2H2O (Sigma Aldrich, 99% purity, A.C.S. reagent grade, CAS#6153-56-6, cat no. 24,753-7), 426 grams of ammonium oxalate monohydrate (Sigma Aldrich, 99+% purity, A.C.S reagent grade, CAS#6009-70-7, cat no. 221716-2.5KG), 152 grams of Capel ilmenite ore (Iluka Resources, LTD, ground to a particle size between 325 and 400 mesh as described in Example 21a), and 1037 grams of DI water were added to a 3 L zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor head space was purged with argon at 100 sccm to remove any oxygen from the reactor. The reactor pressure was maintained at a constant 6.45 atm (80 psig) with a back pressure regulator. The reactor was heated at 1 K/min from 298.15 K to 373.15 K (25° C. to 100° C.) and held at 373.15 K (100° C.)+/−1 K for 50 h. Liquid samples were taken from the reactor through a dip tube and analyzed by ICP for Ti. Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 12) for the ten liquid and vapor samples taken out of the reactor and used to calculate the conversion of titanium in the original ore to the amount of titanium in the liquid phase, the overall amount of the original oxalate that decomposed into carbon monoxide and carbon dioxide. A conversion of 80% is achieved in 42 h. The amount of oxalate decomposed in 42 h was 0.4+/−0.1 weight percent of the original amount of oxalate added to the reactor.

TABLE 12

Non-Oxidative Ore Digestion

| Sample | Time (h) | H$_2$ (ppmv) | CO (ppmv) | CO$_2$ (ppmv) | Ti (ppmw) | Conversion (%) |
|---|---|---|---|---|---|---|
| 1 | 3 | — | 1537 | 2564 | 7927 | 33 |
| 2 | 5 | — | 3153 | 4016 | 11102 | 46 |
| 3 | 7.2 | — | 2758 | 3555 | 13732 | 57 |
| 4 | 9.3 | — | 2251 | 3010 | 16060 | 66 |
| 5 | 11.3 | — | 1883 | 2398 | 17257 | 70 |
| 6 | 13.3 | — | 1577 | 1997 | 17059 | 69 |
| 7 | 15.3 | — | 1398 | 1750 | 17498 | 69 |
| 8 | 21.3 | — | 1011 | 1164 | 18793 | 72 |
| 9 | 33.3 | — | 796 | 965 | 20376 | 78 |
| 20 | 49.8 | — | 682 | 819 | 21000 | 81 |

Example 46

A mixture containing 378 grams of H2C2O4.2H2O (Sigma Aldrich, 99% purity, A.C.S. reagent grade, CAS#6153-56-6, cat no. 24,753-7), 426 grams of ammonium oxalate monohydrate (Sigma Aldrich, 99+% purity, A.C.S reagent grade, CAS#6009-70-7, cat no. 221716-2.5KG), 152 grams of Capel ilmenite ore (Iluka Resources, LTD, ground to a particle size between 325 and 400 mesh as described in Example 21a), and 1037 grams of DI water were added to a 3 liter zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor head space was purged with argon at 100 sccm to remove any oxygen from the reactor. The reactor pressure was maintained at a constant 6.45 atm (80 psig) with a back pressure regulator. The reactor was heated at 1 K/min from 298.15 K to 393.15 K (25° C. to 120° C.) and held at 393.15 K (120° C.)+/−1 K for 33 h. Liquid samples were taken from the reactor through a dip tube and analyzed by ICP for Ti. Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 13) for the eight liquid and vapor samples taken out of the reactor and used to calculate the conversion of titanium in the original ore to the amount of titanium in the liquid phase, the overall amount of the original oxalate that decomposed into carbon monoxide and carbon dioxide. A conversion of 80% is achieved in 12 h. The amount of oxalate decomposed in 12 h was 0.7+/−0.1 wt % of the original amount of oxalate added to the reactor.

TABLE 13

Non-Oxidative Ore Digestion

| Sample | Time (hr) | H$_2$ (ppmv) | CO (ppmv) | CO$_2$ (ppmv) | Ti (ppmw) | Conversion (%) |
|---|---|---|---|---|---|---|
| 1 | 3 | — | 13944 | 17054 | 16000 | 60 |
| 2 | 7.5 | — | 9890 | 14201 | 20537 | 75 |
| 3 | 11.7 | — | 8488 | 12178 | 21973 | 80 |
| 4 | 18.3 | — | 6852 | 9806 | 20366 | 82 |
| 5 | 24.5 | — | 6694 | 9652 | 22048 | 87 |
| 6 | 28.5 | — | 6707 | 9667 | 18711 | 73 |
| 7 | 31.0 | — | 6643 | 9633 | 20874 | 81 |
| 8 | 33.0 | — | 5985 | 9009 | 24187 | 91 |

Example 47

A mixture containing 378 grams of H2C2O4.2H2O (Sigma Aldrich, 99% purity, A.C.S. reagent grade, CAS#6153-56-6, cat no. 24,753-7), 426 grams of ammonium oxalate monohydrate (Sigma Aldrich, 99+% purity, A.C.S reagent grade, CAS#6009-70-7, cat no. 221716-2.5KG), 152 grams of Capel ilmenite ore (Iluka Resources, LTD, ground to a particle size between 325 and 400 mesh as described in Example 21a), and 1037 grams of DI water were added to a 3 L zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor was purged with a mixture of 21 volume percent oxygen and 79 volume percent argon at 1000 sccm using a sparger tube at the bottom of the reactor below the lower impeller. The reactor pressure was maintained at a constant 6.45 atm (80 psig) with a back pressure regulator. The reactor was heated at 1 K/min from 298.15 K to 373.15 K (25° C. to 100° C.) and held at 373.15 K (100° C.)+/−1 K for 31 h. Liquid samples were taken from the reactor through a dip tube and analyzed by ICP for Ti. Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 14) for the four liquid and vapor samples taken out of the reactor and used to calculate the conversion of titanium in the original ore to the amount of titanium in the liquid phase, the overall amount of the original oxalate that decomposed into carbon monoxide and carbon dioxide. A conversion of 80% is achieved in 24 h. The amount of oxalate decomposed in 24 h was 2.0+/−0.1 weight percent of the original amount of oxalate added to the reactor.

TABLE 14

Oxidative Ore Digestion

| Sample | Time (hr) | H$_2$ (ppmv) | CO (ppmv) | CO$_2$ (ppmv) | Ti (ppmw) | Conversion (%) |
|---|---|---|---|---|---|---|
| 1 | 3 | — | 182 | 13464 | 10442 | 40 |
| 2 | 7 | — | — | 11557 | 17265 | 67 |
| 3 | 24 | — | — | 16828 | 20496 | 80 |
| 4 | 31 | — | — | 17716 | 20700 | 81 |

Example 48

A mixture containing 378 grams of H2C2O4.2H2O (Sigma Aldrich, 99% purity, A.C.S. reagent grade, CAS#6153-56-6, cat no. 24,753-7), 426 grams of ammonium oxalate monohydrate (Sigma Aldrich, 99+% purity, A.C.S reagent grade, CAS#6009-70-7, cat no. 221716-2.5KG), 152 grams of Capel ilmenite ore (Iluka Resources, LTD, ground to a particle size between 325 and 400 mesh as described in Example 21a), and 1037 grams of DI water were added to a 3 L zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor was purged with a mixture of 21 volume percent oxygen and 79 volume percent argon at 1000 sccm using a sparger tube at the bottom of the reactor below the lower impeller. The reactor pressure was maintained at a constant 6.45 atm (80 psig) with a back pressure regulator. The reactor was heated at 1 K/min from 298.15 K to 393.15 K (25° C. to 120° C.) and held at 393.15 K (120° C.)+/−1 K for 12 h. Liquid samples were taken from the reactor through a dip tube and analyzed by ICP for Ti. Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 15) for the three liquid and vapor samples taken out of the reactor and used to calculate the conversion of titanium in the original ore to the amount of titanium in the liquid phase, the overall amount of the original oxalate that decomposed into carbon monoxide and carbon dioxide. A conversion of 80% is achieved in 8 h. The amount of oxalate decomposed in 8 h was 2.4+/−0.1 weight percent of the original amount of oxalate added to the reactor.

TABLE 15

Oxidative Ore Digestion

| Sample | Time (hr) | $H_2$ (ppmv) | CO (ppmv) | $CO_2$ (ppmv) | Ti (ppmw) | Conversion (%) |
|---|---|---|---|---|---|---|
| 1 | 3 | — | 2087 | 21835 | 12342 | 48 |
| 2 | 8 | — | 2336 | 28729 | 20300 | 79 |
| 3 | 12 | — | 1939 | 19871 | 20900 | 81 |

Example 49

A mixture containing 378 grams of H2C2O4.2H2O (Sigma Aldrich, 99% purity, A.C.S. reagent grade, CAS#6153-56-6, cat no. 24,753-7), 426 grams of ammonium oxalate monohydrate (Sigma Aldrich, 99+% purity, A.C.S reagent grade, CAS#6009-70-7, cat no. 221716-2.5KG), 152 grams of Capel ilmenite ore (Iluka Resources, LTD, ground to a particle size between 325 and 400 mesh as described in Example 21a), and 1037 grams of DI water were added to a 3 liter zirconium reactor. The oxalate to titanium ratio of this mixture is 5.7 and the concentration of oxalate in aqueous solution is 5.0 molal. The reactor was agitated with two impellers mounted on a single shaft at 1000 rpm. The reactor was purged with a mixture of 21 volume percent oxygen and 79 volume percent argon at 1000 sccm using a sparger tube at the bottom of the reactor below the lower impeller. The reactor pressure was maintained at a constant 6.45 atm (80 psig) with a back pressure regulator. The reactor was heated at 1 K/min from 298.15 K to 413.15 K (25° C. to 140° C.) and held at 413.15 K (140° C.)+/−1 K for 5 h. Liquid samples were taken from the reactor through a dip tube and analyzed by ICP for Ti. Lithium chloride (Sigma Aldrich, 99+% purity, A.C.S. reagent grade, CAS#7447-41-8, cat no. 310468-1006) was added to each liquid sample and used as an internal standard for accurately determining Ti concentration. Vapor samples were taken from the head space of the reactor and analyzed by gas chromatography (Agilent model 6890) for hydrogen, carbon monoxide, and carbon dioxide. Concentration data are provided as a function of time (Table 16) for the five liquid and vapor samples taken out of the reactor and used to calculate the conversion of titanium in the original ore to the amount of titanium in the liquid phase, the overall amount of the original oxalate that decomposed into carbon monoxide and carbon dioxide. A conversion of 80% is achieved in 5 h. The amount of oxalate decomposed in 5 h was 6.0+/−0.1 weight percent of the original amount of oxalate added to the reactor.

TABLE 16

Oxidative Ore Digestion

| Sample | Time (hr) | $H_2$ (ppmv) | CO (ppmv) | $CO_2$ (ppmv) | Ti (ppmw) | Conversion (%) |
|---|---|---|---|---|---|---|
| 1 | 1 | — | 16199 | 197482 | 7900 | 34 |
| 2 | 2.5 | — | 2156 | 225705 | 16800 | 65 |
| 3 | 5.0 | — | — | 208971 | 20800 | 81 |

Example 50

A mixture containing 150 g of a reagent grade ammonium titanyl oxalate monohydrate (Acros; CAS#10580-03-7) and 1200 g of DI water was added to a 4 L glass beaker. The mixture was agitated by a magnetic stir bar for 30 min at room temperature and filtered via a 0.45 µm disposable nylon filter cup to remove any insoluble impurities. The filtrate was collected and transferred back into the 4 L glass beaker and heated to 80° C. on a hot plate with constant agitation. Concentrated NH4OH (28-30 wt % NH3; CAS#1336-21-6) was gradually added to titrate the ammonium titanyl oxalate solution to pH 8.0-8.3, while the temperature of the mixture was maintained at 80° C. The reaction mixture was kept at temperature for an additional 15 min and then filtered via a 24 cm #54 Whatman paper filter to yield 463 g of titanyl hydroxide precipitate. The titanyl hydroxide precipitate was collected and reslurried with 2 L of DI water at room temperature. The mixture was heated to 60° C. on a hot plate with agitation and held at this temperature for 20 min. A small amount of concentrated NH4OH solution was added to maintain the solution pH at 8.0-8.3. The solution was then filtered via a 24 cm #54 Whatman paper filter to yield 438 g of wet titanyl hydroxide cake. The wet cake was then washed by resuspending the material in 2 L of DI water and filtering at room temperature to remove residual oxalate. The washing step was repeated until the conductivity of the filtration liquid dropped below 100 µS. The resulting titanyl hydroxide precipitate had an estimated solid content of 10 wt % and was found to have an amorphous XRPD pattern with no distinctive anatase-like or rutile-like peaks. Elemental C—N analysis revealed that the synthesized titanyl hydroxide precipitate contained 0.2% C and 2.7% N on a dry basis.

Example 51

A mixture consisting of 4 g of a reagent grade ammonium titanyl oxalate derived titanyl hydroxide precipitate (refer to Example 50 for precipitate preparation and characterization), 0.0102 g of $ZnCl_2$ (reagent grade, CAS#7646-85-7), and 3.9 g of a dilute HCl solution was diluted with DI water to a concentration of 4 g of $TiO_2$ per 100 grams of slurry. The dilute HCl solution was prepared by combining 2.8 g of a 12.1N reagent grade HCl solution (CAS#7647-01-0) and 32.6 g of DI water. The mixture containing the titanium precipitate was added to a 10 mL gold tube with a welded bottom. The top of the gold tube was then crimped, and the tube was inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. This added argon pressure, along with the autogenous hydrothermal pressure was contained inside the sealed reaction vessel. The reactor was heated to an internal temperature of 250° C. via the use of an external electrical heating jacket and held at this temperature for 8 h without agitation. After the completion of the hydrothermal reaction, the $TiO_2$ slurry was recovered from the gold tube and warmed to 35° C. on a hot plate. It was then filtered via a 0.2 μm nylon membrane and washed with DI water. The wet $TiO_2$ cake was dried in a 75° C. vacuum oven for 13-14 h to yield 0.3 g of $TiO_2$ powder. The recovered $TiO_2$ product was 100% rutile with an average crystal domain size of 34 nm as determined by XRPD. The material had a mono-modal PSD and a $d_{50}$ of 131 nm ($d_{10}$=92 nm; $d_{90}$=197 nm). SEM confirmed that the primary particles of the synthesized $TiO_2$ product were of nano-size on the order of 150 nm.

Example 52

A mixture consisting of 4 g of a reagent grade ammonium titanyl oxalate derived titanyl hydroxide precipitate (refer to Example 50 for precipitate preparation and characterization), 0.0582 g of $ZnCl_2$ (reagent grade, CAS#7646-85-7), and 2.1 g of a dilute HCl solution was diluted with DI water to a concentration of 4 g of $TiO_2$ per 100 g of slurry. The dilute HCl solution was prepared by combining 2.8 g of a 12.1N reagent grade HCl solution (CAS#7647-01-0) and 33.3 g of DI water. The mixture containing the titanium precipitate was added to a 10 mL gold tube with a welded bottom. The top of the gold tube was then crimped, and the tube was inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. This added argon pressure, along with the autogenous hydrothermal pressure was contained inside the sealed reaction vessel. The reactor was heated to an internal temperature of 250° C. via the use of an external electrical heating jacket and held at this temperature for 16 h without agitation. After the completion of the hydrothermal reaction, the $TiO_2$ slurry was recovered from the gold tube and warmed to 35° C. on a hot plate. It was then filtered via a 0.2 μm nylon membrane and washed with DI water. The wet $TiO_2$ cake was dried in a 75° C. vacuum oven for 13-14 h to yield 0.3 g of $TiO_2$ powder. The recovered $TiO_2$ product was 100% rutile with an average crystal domain size of 54 nm as determined by XRPD. The PSD of the material had a $d_{10}$ of 220 nm, $d_{50}$ of 535 nm, and $d_{90}$ of 930 nm. SEM images confirmed that the primary particles of the synthesized $TiO_2$ product were of pigmentary size on the order of 200-500 nm.

Example 53

A mixture consisting of 140 g of a reagent grade ammonium titanyl oxalate derived titanyl hydroxide precipitate (refer to Example 50 for precipitate preparation and characterization), 2.2182 g of $ZnCl_2$ (reagent grade, CAS#7646-85-7), 7 g of a 12.1N reagent grade HCl solution (CAS#7627-01-0), and 175 g of DI water was added to a 1 L Zr-702 pressure vessel. 50 psig argon pressure was brought into the reactor prior to heat-up. The added argon pressure, along with the autogenous hydrothermal pressure was contained inside the sealed reaction vessel. The reaction mixture was agitated by a pitch blade impeller at a constant speed of 130 rpm. The reactor was heated to an internal temperature of 250° C. via the use of an external electrical heating jacket and held at this temperature for 16 h. The reactor internal temperature was measured by a thermocouple inside the reactor thermowell, which was immersed in the reaction mixture. After the completion of the hydrothermal crystallization reaction, the $TiO_2$ slurry was recovered from the zirconium reactor and found to have a pH of 1.1. It was then filtered at room temperature via a 0.2 μm disposable nylon filter cup and washed thoroughly with DI water to yield 20.11 g of a wet $TiO_2$ cake with an estimated solid content of 55 wt %. The $TiO_2$ produced was 100% rutile with an average crystal domain size of 55 nm as determined by XRPD. The material had a mono-modal PSD and a $d_{50}$ of 802 nm ($d_{10}$=453 nm; $d_{90}$=1353 nm). The primary particles of the synthesized $TiO_2$ product were pigmentary in size on the order of 200-500 nm as determined by SEM.

The pigmentary rutile $TiO_2$ was then surface treated via a standard chloride-process technology to encapsulate the $TiO_2$ base material with a silica/alumina coating. X-Ray fluorescence spectroscopy (XRF) of the coated-product indicated a $SiO_2$ composition of 3.1 wt % and an $Al_2O_3$ composition of 1.5 wt %. The material had an acid solubility value of 0.2% (relative to a commercial specification of <9%), which indicated the production of a photo-durable $TiO_2$ product. SEM images of the surface treated $TiO_2$ confirmed the uniform deposition of the silica/alumina coating on the $TiO_2$ particles.

Example 54

A mixture consisting of 2.7 g of a Capel ilmenite ore (Iluka, Australia) derived titanyl hydroxide precipitate as described in Example 80 (15 wt % solid), 0.0583 g of $ZnCl_2$ (reagent grade, CAS#7646-85-7), and 3.2 g of a dilute HCl solution was diluted with DI water to a concentration of 4 g of $TiO_2$ per 100 g of slurry. The dilute HCl solution was prepared by combining 2.8 g of a 12.1N reagent grade HCl solution (CAS#7647-01-0) and 48.9 g of DI water. The mixture containing the titanium precipitate was added to a 10 mL gold tube with a welded bottom. The top of the gold tube was then crimped, and the tube was inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. This added argon pressure, along with the autogenous hydrothermal pressure was contained inside the sealed reaction vessel. The reactor was heated to an internal temperature of 250° C. via the use of an external electrical heating jacket and held at this temperature for 24 h without agitation. After the completion of the hydrothermal reaction, the $TiO_2$ slurry was recovered from the gold tube and warmed to 35° C. on a hot plate. It was then filtered via a 0.2 μm nylon membrane and washed with DI water. The wet $TiO_2$ cake was dried in a 75° C. vacuum oven for 13-14 h to yield 0.25 g of $TiO_2$ powder. The recovered $TiO_2$ product was 94% rutile with an average crystal domain size of 45 nm as determined by XRPD. SEM images of the $TiO_2$ product revealed primary particles of super-pigmentary size, on the order of 500-1000 nm. The material exhibited a bi-modal PSD with a significant percentage of the particles in the pigmentary range of 500-1000 nm ($d_{10}$=104 nm; $d_{50}$=610 nm; $d_{90}$=1199 nm).

Example 55a-i

A mixture consisting of 4 g of a reagent grade ammonium titanyl oxalate derived titanyl hydroxide precipitate (refer to Example 50 for precipitate preparation and characterization), 0.0582 g of $ZnCl_2$ (reagent grade, CAS#7646-85-7), and a small amount (as shown in Table 17) of a dilute HCl solution was diluted with DI water to a concentration of 4-5 g of $TiO_2$ per 100 g of slurry. The dilute HCl solution was prepared by combining 2.8 g of a 12.1 N reagent grade HCl solution (CAS#7647-01-0) and 32.6 g of DI water. The mixture containing the titanium precipitate was added to a 10 mL gold tube with a welded bottom. The top of the gold tube was then crimped, and the tube was inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. The added argon pressure, along with the autogenous hydrothermal pressure was contained inside the sealed reaction vessel. The reactor was heated to an internal temperature as specified in Table 17 via the use of an external electrical heating jacket and held at this temperature for 24 h without agitation. After the completion of the hydrothermal reaction, the $TiO_2$ slurry was recovered from the gold tube and warmed to 35° C. on a hot plate. It was then filtered via a 0.2 μm nylon membrane and washed with DI water. The wet $TiO_2$ cake was dried in a 75° C. vacuum oven for 13-14 h, and the resulting $TiO_2$ powder was characterized by XRPD and PSD. The product characterization data showed that a pigmentary rutile $TiO_2$ product was produced at a hydrothermal temperature of 235° C. (sample A). SEM images of the material confirmed that its primary particles were of pigmentary size on the order of 200-500 nm. A nano-size rutile $TiO_2$ product with a monomodal PSD was observed at 220° C. (sample F). Lowering the reaction temperature further to 200° C. favored the formation of the anatase phase (sample G); however, the percent of nano-size rutile in product was found to improve with increasing HCl concentration (sample I).

TABLE 17

Lower Temperature (≦235° C.) Hydrothermal Crystallization Of Tio$_2$

| | | | TiO$_2$ Product | |
|---|---|---|---|---|
| Sample | Rxtn. Temp. (° C.) | Dilute HCl (g) | Structure (% Rutile) | Domain Size (nm) | $d_{50}$ (nm) |
| A | 235 | 2.0 | 99 | 59 | 548 |
| B | 235 | 2.4 | 100 | 51 | 350 |
| C | 235 | 3.0 | 100 | 38 | 144 |
| D | 220 | 2.0 | 68 | 44 | 191 |
| F | 220 | 2.4 | 94 | 39 | 156 |
| F | 220 | 3.0 | 100 | 37 | 142 |
| G | 200 | 2.0 | 30 | 34 | 53 |
| H | 200 | 2.4 | 47 | 33 | 92 |
| I | 200 | 3.0 | 87 | 28 | 103 |

Example 56a-s

A mixture consisting of 4-5 g of a reagent grade ammonium titanyl oxalate derived titanyl hydroxide precipitate (refer to Example 50 for precipitate preparation and characterization) and 0.025 g of a mineralizing salt (as shown in Table 18) was diluted with DI water to a concentration of 4-5 g of $TiO_2$ per 100 g of slurry. A small amount of acid (as shown in Table 18) was added to the mixture to lower its pH to approximately 1. The acidic mixture containing the titanium precipitate and the mineralizing salt was charged into a 10 mL gold tube with a welded bottom. The top of the gold tube was then crimped, and the tube inserted vertically into a 1 L pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50-60 psig of argon pressure was brought into the reactor prior to heat-up. The added argon pressure, along with the autogenous hydrothermal pressure was contained inside the sealed reaction vessel. The reactor was heated to an internal temperature of 250° C. via the use of an external electrical heating jacket and held at this temperature for 16 h without agitation. After the completion of the hydrothermal reaction, the $TiO_2$ slurry was recovered from the gold tube and warmed to 35° C. on a hot plate. It was then filtered via a 0.2 μm nylon membrane and washed with DI water. The wet $TiO_2$ cake was dried in a 75° C. vacuum oven for 13-14 h, and the resulting $TiO_2$ powder was characterized by XRPD and PSD. The product characterization data showed that among the 18 tested mineralizing salts, $ZnCl_2$, ZnO, $MgCl_2$, and NaCl were found to promote both rutile formation and the growth of equiaxed $TiO_2$ crystals. Mineralizers KBr, KCl, LiCl, $SnCl_4$, $ZnF_2$, $NH_4F$, and NaF were found to be rutile phase directing but had no significant effect on crystal morphology. $KH_2PO_4$, $Al_2(SO_4)_3$, $ZnSO_4$, and $Na_2SO_4$ favored the formation of the anatase phase, while the presence of $AlCl_3$, $Al_2O_3$, and $Al(OH)_3$ negatively affected the formation and growth of the $TiO_2$ particles.

TABLE 18

Mineralizer Effect on TiO$_2$ Formation

| | | | TiO$_2$ Product | | |
|---|---|---|---|---|---|
| Sample | Mineralizer | Acid | Structure* | Domain Size (nm) | $d_{50}$ (nm) |
| A | N/A | HCl | 100% R | 36 | 144 |
| B | $ZnCl_2$ | HCl | 100% R | 41 | 185 |
| C | ZnO | HCl | 100% R | 47 | 179 |
| D | $MgCl_2 \cdot 6H_2O$ | HCl | 100% R | 42 | 145 |
| E | NaCl | HCl | 100% R | 40 | 144 |
| F | KBr | HCl | 100% R | 39 | 152 |
| G | KCl | HCl | 98% R; 2% A | 29 | 117 |
| H | LiCl | HCl | 100% R | 37 | 147 |
| I | $SnCl_4$ | HCl | 100% R | 26 | 112 |
| J | $ZnF_2$ | HCl | 100% R | 32 | 132 |
| K | $NH_4F$ | HCl | 88% R; 12% A | 30 | 124 |
| L | NaF | HCl | 90% R; 10% A | 31 | 131 |
| M | $KH_2PO_4$ | HCl | 100% A | 19 | 68 |
| N | $Al_2(SO_4)_3$ | $H_2SO_4$ | 100% A | 13 | 47 |
| O | $ZnSO_4 \cdot H_2O$ | $H_2SO_4$ | 100% A | 14 | 51 |
| P | $Na_2SO_4$ | $H_2SO_4$ | 100% A | 13 | 49 |
| Q | $AlCl_3 \cdot 6H_2O$ | HCl | 77% R; 9% A; 14% B | 23 | 73 |

TABLE 18-continued

Mineralizer Effect on TiO$_2$ Formation

| | | | TiO$_2$ Product | | |
|---|---|---|---|---|---|
| Sample | Mineralizer | Acid | Structure* | Domain Size (nm) | $d_{50}$ (nm) |
| R | α-Al$_2$O$_3$ | HCl | 50% R; 28% A; 22% B | 18 | 36 |
| S | Al(OH)$_3$ | HCl | 23% R; 56% A; 21% B | 14 | 48 |

*R = Rutile;
A = Anatase;
B = Brookite

Rutile/anatase mixtures were quantified using a calibrated XRPD technique on multiple known standard mixtures. Rutile/anatase/brookite mixtures were estimated using Whole Pattern Fitting (WPF) and Rietveld refinement of crystal structures in JADE®XRPD analysis software (JADE® v.6.1 ©2006 by Materials Data, Inc., Livermore, Calif.).

Example 57a-d

A mixture consisting of 3 g of a reagent grade ammonium titanyl oxalate derived titanyl hydroxide precipitate (refer to Example 50 for precipitate preparation and characterization) and a small amount of ZnCl$_2$ (reagent grade, CAS#7646-85-7, as shown in Table 19) was diluted with DI water to a concentration of 3-4 g of TiO$_2$ per 100 g of slurry. Varying amounts of a dilute HCl solution were added to the titanyl hydroxide slurry as reported in Table 19. The mixture was then charged into a 10 mL gold tube with a welded bottom. The top of the gold tube was crimped, and the tube inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. The added argon pressure, along with the autogenous hydrothermal pressure was contained inside the sealed reaction vessel. The reactor was heated to an internal temperature of 250° C. via the use of an external electrical heating jacket and held at this temperature for 16 h without agitation. After the completion of the hydrothermal reaction, the TiO$_2$ slurry was recovered from the gold tube and warmed to 35° C. on a hot plate. It was then filtered via a 0.2 μm nylon membrane and washed with DI water. The wet TiO$_2$ cake was dried in a 75° C. vacuum oven for 13-14 h, and the resulting TiO$_2$ powder was characterized by XRPD and PSD. The product characterization data indicated that under hydrothermal reaction conditions, control of reaction pH was critical to determining TiO$_2$ crystal phase and morphology. An increase in HCl concentration favored the formation of rutile but had a negative impact on TiO$_2$ crystal growth. Pigmentary rutile TiO$_2$ was observed at an acid concentration of 0.0018 moles of HCl per 3 g of titanyl hydroxide precipitate (sample B). Increasing the HCl concentration further led to the production of nano-size rutile TiO$_2$.

TABLE 19

Reaction pH Effect on TiO$_2$ Formation

| | | | TiO$_2$ Product | | |
|---|---|---|---|---|---|
| Sample | HCl (mol) | ZnCl$_2$ (g) | Structure (% Rutile) | Domain Size (nm) | $d_{50}$ (nm) |
| A | 0.0007 | 0.2301 | 68 | 35 | 117 |
| B | 0.0018 | 0.1447 | 100 | 52 | 584 |
| C | 0.0028 | 0.0735 | 100 | 44 | 233 |
| D | 0.0038 | 0.2896 | 100 | 36 | 142 |

Example 58a-b

A mixture consisting of 2.7 g of a Capel ilmenite ore (Iluka, Australia) derived titanyl hydroxide precipitate as described in Example 80 (15 wt % solid), 0.0583 g of ZnCl$_2$ (reagent grade, CAS#7646-85-7), 0.02 g of a rutile seed derived from TiOCl$_2$ (100% rutile by XRPD; $d_{10}$=56 nm, $d_{50}$=86 nm, $d_{90}$=143 nm by PSD), and 2.9 g of a dilute HCl solution was diluted with DI water to a concentration of 4 g of TiO$_2$ per 100 g of slurry. The dilute HCl solution was prepared by combining 2.8 g of a 12.1 N reagent grade HCl solution (CAS#7647-01-0) and 48.9 g of DI water. The mixture containing the ore derived titanium precipitate and the rutile seed was added to a 10 mL gold tube with a welded bottom. The top of the gold tube was then crimped, and the tube was inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. This added argon pressure, along with the autogenous hydrothermal pressure was contained inside the sealed reaction vessel. The reactor was heated to an internal temperature of 250° C. via the use of an external electrical heating jacket and held at this temperature for 24 h without agitation. After the completion of the hydrothermal reaction, the TiO$_2$ slurry was recovered from the gold tube and warmed to 35° C. on a hot plate. It was then filtered via a 0.2 μm nylon membrane and washed with DI water. The wet TiO$_2$ cake was dried in a 75° C. vacuum oven for 13-14 h, and the resulting TiO$_2$ powder was characterized by XRPD and PSD. The TiO$_2$ product (sample A in Table 20) was 97% rutile with an average crystal domain size of 30 nm as determined by XRPD. The material had a bi-modal PSD and a $d_{50}$ of 155 nm ($d_{10}$=99 nm; $d_{90}$=4893 nm). For comparison, an unseeded TiO$_2$ product (sample B in Table 20) was also synthesized under the same hydrothermal reaction conditions. The unseeded TiO$_2$ was 68% rutile with an average crystal domain size of 40 nm as determined by XRPD. The material also exhibited a bi-modal PSD with a $d_{50}$ of 462 nm ($d_{10}$=162 nm; $d_{90}$=3513 nm). The data suggest that the presence of the TiOCl$_2$ derived rutile seed promotes the formation of the rutile phase but negatively impacts TiO$_2$ particle growth.

TABLE 20

Seeding Effect on Low Temperature Hydrothermal
Crystallization of $TiO_2$ from Capel Ilmenite Ore Derived
Titanyl Hydroxide Precipitate

| Sample | Rutile Seed (g) | Dilute HCl (g) | $ZnCl_2$ (g) | $TiO_2$ Product Structure (% Rutile) | Domain Size (nm) | $d_{50}$ (nm) |
|---|---|---|---|---|---|---|
| A | 0.02 | 2.9 | 0.0583 | 97 | 30 | 155 |
| B | 0.00 | 2.9 | 0.0583 | 68 | 40 | 462 |

Example 59a-d

A mixture consisting of 4 g of a reagent grade ammonium titanyl oxalate derived titanyl hydroxide precipitate (refer to Example 50 for precipitate preparation and characterization) and a small amount of a dilute HCl solution (as shown in Table 21) was diluted with DI water to a concentration of 7-8 g of $TiO_2$ per 100 g of slurry. The dilute HCl solution was prepared by combining 4.3 g of a 12.1 N reagent grade HCl solution (CAS#7647-01-0) with 14.5 g of water. Varying amounts of $Na_2C_2O_4$ were added to the titanyl hydroxide slurry to adjust its oxalate concentration. The grams of $Na_2C_2O_4$ (reagent grade, CAS#62-76-0) added are reported in Table 21. The mixture was then charged into a 10 mL gold tube with a welded bottom. The top of the gold tube was crimped, and the tube inserted vertically into a 1 L Zr-702 pressure vessel. To facilitate heat transfer inside the 1 L reactor, water was added to submerge the bottom half of the inserted gold tube. The reactor thermowell was also immersed in water, and it contained a thermocouple for determining the reactor internal temperature. 50 psig argon pressure was brought into the reactor prior to heat-up. The added argon pressure, along with the autogenous hydrothermal pressure was contained inside the sealed reaction vessel. The reactor was heated to an internal temperature of 250° C. via the use of an external electrical heating jacket and held at this temperature for 16 h without agitation. After the completion of the hydrothermal reaction, the $TiO_2$ slurry was recovered from the gold tube and warmed to 35° C. on a hot plate. It was then filtered via a 0.2 µm nylon membrane and washed with DI water. The wet $TiO_2$ cake was dried in a 75° C. vacuum oven for 13-14 h, and the resulting $TiO_2$ powder was characterized by XRPD and PSD. Based on the product characterization data, the presence of oxalate in the initial titanyl hydroxide mixture was found to promote the formation of the rutile phase under hydrothermal reaction conditions; however, the $TiO_2$ particle size decreased with increasing initial oxalate concentration.

TABLE 21

Oxalate Effect on $TiO_2$ Formation

| Sample | Dilute HCl (g) | $Na_2C_2O_4$ (g) | $TiO_2$ Product Structure (% Rutile) | Domain Size (nm) | $d_{50}$ (nm) |
|---|---|---|---|---|---|
| A | 0.8 | 0 | 60 | 51 | 68 |
| B | 0.8 | 0.157 | 90 | 18 | 54 |
| C | 1.8 | 0 | 100 | 39 | 400 |
| D | 1.8 | 0.080 | 100 | 31 | 131 |

Example 60

A mixture consisting of 80 g of a Capel ilmenite ore (Iluka, Australia) derived titanyl hydroxide precipitate from Example 91, 8 g of concentrated $NH_4OH$ solution (28-30 wt % $NH_3$, CAS#1336-21-6), 0.4 g of a nano-size rutile seed (100% rutile by XRPD: $d_{10}$=118 nm, $d_{50}$=185 nm, $d_{90}$=702 nm by PSD), and 173 g of DI water was added to a 1 L PTFE-lined Hastelloy® B-3 pressure vessel. The wetted reactor components, including the thermowell, agitator shaft, and impeller were made of Zr-702 metal to minimize $TiO_2$ contamination by metal corrosion products under elevated temperature and pH conditions. 90 psig argon pressure was brought into the reactor prior to heat-up. The added argon pressure, along with the autogenous hydrothermal pressure was contained inside the sealed reaction vessel. The reaction mixture was agitated by a pitch blade impeller at a constant speed of 90 rpm. The reactor was heated to an internal temperature of 220° C. via the use of an external electrical heating jacket and held at this temperature for 8 h. The reactor internal temperature was measured by a thermocouple inside the reactor thermowell, which was immersed in the reaction mixture. After the completion of the hydrothermal crystallization reaction, the $TiO_2$ slurry was recovered from the reactor and found to have a pH of 9.5. The slurry was combined with 160 g of DI water and charged into a 1 L round bottom flask. The mixture was agitated via a magnetic stir bar at a temperature of 80° C. for approximately 5 h under reflux conditions. The $TiO_2$ slurry was then filtered via a 0.2 µm disposable nylon filter cup while it was still hot. The resulting wet $TiO_2$ cake was washed thoroughly with 80° C. DI water, and it was then dried in a 75° C. vacuum oven for approximately 12 h to yield 8 g of $TiO_2$ powder. The recovered $TiO_2$ product contained as much as 25% amorphous material as determined by XRPD. The relative amount of three crystalline $TiO_2$ passes in the product was estimated using Whole Pattern Fitting (WPF) and Rietveld refinement of crystal structures in JADE® XRPD analysis software ((JADE® v.6.1© 2006 by Materials Data, Inc., Livermore, Calif.). This analysis indicated the recovered crystalline product consisted of 10% rutile, 10% anatase and 80% brookite. The sample XRPD also revealed that its crystalline phase was a mixture of 50% brookite, 36% anatase, and 14% rutile. The material exhibited a mono-modal PSD and a $d_{50}$ of 86 nm ($d_{10}$=49 nm; $d_{90}$=159 nm).

Example 61

A mixture consisting of 20.0 g of an ammonium titanyl oxalate-derived titanyl hydroxide precipitate as prepared in Example 9A and 100 ml of a 0.1 N HCl solution was charged into a 125 ml glass vessel specifically designed to fit into a high pressure autoclave (maximum pressure rating=1000 atm). The glass vessel incorporates an open trap to allow for pressure equilibration. The pH of the mixture prior to crystallization was 2.3. The sealed autoclave was externally heated to 350° C. and developed an autogenous hydrothermal pressure of 172 atm. The autoclave was held at temperature for 16 h without agitation. After the completion of the hydrothermal reaction, the resultant $TiO_2$ slurry was recovered from the glass vessel, filtered and washed with DI water, and allowed to air dry. The recovered $TiO_2$ product was predominantly rutile (84% rutile/16% anatase) with an average crystal domain size of 38.5 nm as determined by XRPD. SEM images of the $TiO_2$ product revealed equiaxed primary particles of pigmentary size, on the order of 200-500 nm. The material exhibited a mono-modal PSD with a significant percentage of the particles in the pigmentary range of 500-1000 nm ($d_{10}$=414 nm; $d_{50}$=732 nm; $d_{90}$=1183 nm).

Example 62a 150 g of ATO (ammonium titanyl oxalate monohydrate, Aldrich 229989) in 1200 mL of water for 30 min was left unstirred overnight. The ATO was resuspended and filtered through 0.45 μm Teflon® filter (ZAPCAP®-CR) wetted with acetone. Transferred filtrate and heated to 86° C. on hot plate with stirring. 180 mL conc. NH$_4$OH in 25 mL aliquots was added resulting in a pH of 8.3 (8.1 with temp correction). 300 mL water was added to allow stirring of the suspension. The suspension was stirred for 20 min and then filtered hot through a 24 cm #54 Whatman paper filter. Filtering time was about 5 min. Yield was about 402 g of a wet filter cake. The filter cake was placed in 1000 mL water at room temperature and resuspended. The pH of the TiO$_2$ slurry was about 8.2. The slurry was heated to 65° C. and then filtered hot as described above. The filtrate was saved. The filter cake was resuspended at room temperature in 2000 mL water (pH 8.6; Slurry conductivity: 6 mMHO) and filtered through a #54 Whatman paper filter. The resuspension and filtering was repeated three additional times until the slurry pH was 8.7 and the slurry conductivity was 108 μMHOs. The weight of the filter cake was 306 g.

Example 62b

A mixture consisting of 6.0 grams of an ammonium titanyl oxalate-derived titanyl hydroxide precipitate from Example 62a and 10 mL of a 1.0 N HCl solution was charged into a 15 mL gold tube with a welded bottom. The top of the gold tube was then crimped to allow for pressure equilibration, and the tube was inserted vertically into a high-pressure autoclave (maximum pressure rating=1000 atm). The pH of the mixture prior to crystallization was 1.3. The sealed autoclave was externally heated to 350° C. and developed an autogenous hydrothermal pressure of 163 atm. The autoclave was held at temperature for 16 h without agitation. After the completion of the hydrothermal reaction, the resultant TiO$_2$ slurry was recovered from the gold tube, filtered and washed with DI water, and allowed to air dry. The recovered TiO$_2$ product was 100% rutile with an average crystal domain size of 56.9 nm as determined by XRPD. SEM images of the TiO$_2$ product revealed a majority of equiaxed primary particles of pigmentary size, on the order of 200-500 nm, and some super-pigmentary-sized primary particles ($\geq$1 μm). The material exhibited a mono-modal PSD with a significant percentage of the particles in the pigmentary range of 500-1000 nm ($d_{10}$=358 nm; $d_{50}$=746 nm; $d_{90}$=1378 nm).

Example 63a 426.30 g Ammonium oxalate monohydrate (Aldrich, CAS 6009-70-7, Catalog #221716-2.5 kg, Lot 02039EI), 378.23 g H2C2O4.2H2O (Aldrich, CAS 6153-56-6, Catalog #247537, Lot 07921TU) and 838.50 g DI water were combined in a 2 L round bottom flask. The contents were brought to reflux and stirred until all solids were in solution (pH=2.70). Air was bubbled through a sparge tube into the pot. 151.89 g Ilmenite (Iluka Resources LTD, Capel, Australia) was added into the pot. After 72.5 h, the pot contained olive-green slurry which was then filtered through a 0.22 μm disposable nylon filter. 1711.63 g of Kelly-green leachate was collected and designated E109693-017-1-S. ICP of the leachate showed it to be 2.24% Fe and 2.33% Ti.

Example 63b 1678.81 g of leachate from Example 63a was heated to 90° C. under a nitrogen blanket and treated with 21.34 g Fe powder (Aldrich, CAS 7439-89-6, Catalog #267953-250 kg, Lot 11413MU). After reduced (as indicated by the formation of a blue colored precipitate when mixed with NH$_4$OH (EMD Chemicals, CAS 1336-21-6, Catalog #AX1303-6, Lot 44135)), the solution was filtered. 173.54 g yellow solids were separated from 1554.59 g root beer colored leachate. 509.37 g of the leachate was mixed with 500.21 g DI water and heated to 90° C. under a blanket of nitrogen. The heat source was turned off and the slurry was stirred for 3 days. Another 48.90 g yellow solids were filtered off through a 0.22 μm nylon filter and 949.20 g root beer colored leachate was. ICP shows the solution to contain 1.31% Ti and 730 ppm Fe (molar ratio Fe:Ti=$4.78\times10^{-2}$).

Example 63c

In a 2 L round bottom flask, under N$_2$, 944.15 g of reduced leachate from Example 63b, 55.11 g DI water and 120.58 g ammonium oxalate dihydrate (Aldrich, 02309EI) were mixed. The mixture was then heated to 90° C. and titrated with 37.76 g of NH$_4$OH to precipitate out the titanium species. The slurry was allowed to stir, at temperature, for 1 h and then filtered through a Büchner funnel that was wrapped with insulating tape and had been removed from an oven heated at 80° C. for 1 h immediately prior to filtering. The filtration rate was approximately 1000 mL in 70 min. The solids were sprayed with warm saturated ammonium oxalate solution. The filter cake was reslurried with 503.29 g DI water and heated to 90° C. The pH was raised to 9.00 with the addition of 68.14 g NH$_4$OH (Aldrich, 29% NH$_3$ in H$_2$O). The solids were filtered through a 600 mL Büchner funnel.

Example 63d

A mixture consisting of 6.0 grams of a Capel ilmenite ore (Iluka, Australia)-derived titanyl hydroxide precipitate from Example 63c and 10 mL of a 1.0 N HCl solution was charged into a 15 mL gold tube with a welded bottom. The top of the gold tube was then crimped to allow for pressure equilibration, and the tube was inserted vertically into a high-pressure autoclave (maximum pressure rating=1000 atm). The sealed autoclave was externally heated to 350° C. and developed an autogenous hydrothermal pressure of 165 atm. The autoclave was held at temperature for 16 h without agitation. After the completion of the hydrothermal reaction, the resultant TiO$_2$ slurry was recovered from the gold tube, filtered and washed with DI water, and allowed to air dry. The recovered TiO$_2$ product was 100% rutile with an average crystal domain size of 42.3 nm as determined by XRPD. SEM images of the TiO$_2$ product revealed a majority of equiaxed primary particles of pigmentary size, on the order of 200-500 nm, and some super-pigmentary-sized primary particles ($\geq$1 μm). The material exhibited a bi-modal PSD with a significant percentage of the particles in the pigmentary range of 500-1000 nm ($d_{10}$=99 nm; $d_{50}$=156 nm; $d_{90}$=622 nm).

Example 64a 38 g of ATO (ammonium titanyl oxalate, Aldrich 229989) was stirred in 300 mL of water for 30 min and left unstirred for 2 h. It was resuspended and filtered through #4 Whatman paper. The filtrate was transferred and heated to 90° C. on hot plate with stirring. 125 mL conc. NH$_4$OH in 10 mL aliquots was added to obtain pH ~9 (no temp correction was used) This solution was stirred 20 min at 80° C. (temp dropped during liquid addition) and filtered hot through an 11 cm #4 Whatman paper filter in about 5 min. The filtrate crystallized as it cooled in filter flask. The filter cake was transferred to 300 mL room temperature DI water and resuspended and allowed to sit unstirred overnight. This formed a TiO$_2$ slurry of pH ~8.

This slurry was heated to 80° C. and added conc. NH$_4$OH to pH 9 (60 mL) and filtered hot as above. The filter cake was resuspended at room temperature in 400 mL DI water and stirred 60 min with pH of slurry at ~8. No addition of NH$_4$OH was made. The slurry was filtered as above. The filtrate conductivity was 6 mMHO. The filter cake was resuspended in 400 mL DI water and heated to 60° C. and then filtered. The filtrate conductivity was 1.6 mMHO. The filter cake was resuspended in 400 mL DI water at 60° C. The conductivity was monitored during stirring and found to stabilize at about 0.6 mMHO after about one h of stirring (pH 7.5). Concentrated NH$_4$OH was added to obtain pH 9. The slurry was filtered hot (60° C.). The filter cake was resuspended with 1500 mL room temp DI water. The conductivity was 0.067 mMHO. The slurry was found difficult to filter. The pH was raised to 9.5 and heated to 70° C. Filtration was still slow. The slurry was allowed to sit overnight without stirring. There was some settling of slurry with a bottom layer of solids, a middle layer of gel and a top layer clear. These volume ratios were 1:8:1. The slurry was filtered using a 24 cm diameter #54 Whatman paper filter. 50 g of wet material was recovered. The filtrate conductivity was 150 μMHO.

Example 64b

A mixture consisting of 6.0 grams of an ammonium titanyl oxalate-derived titanyl hydroxide precipitate from Example 64a and 6 mL of a 0.2 N HCl solution was charged into a 15 mL gold tube with a welded bottom. The top of the gold tube was then crimped to allow for pressure equilibration, and the tube was inserted vertically into a high-pressure autoclave (maximum pressure rating=1000 atm). The pH of the mixture prior to crystallization was 4.7. The sealed autoclave was externally heated to 350° C. and developed an autogenous hydrothermal pressure of 170 atm. The autoclave was held at temperature for 16 h without agitation. After the completion of the hydrothermal reaction, the resultant TiO$_2$ slurry was recovered from the gold tube, filtered and washed with DI water, and allowed to air dry. The recovered TiO$_2$ product was 100% anatase with an average crystal domain size of 20.3 nm as determined by XRPD.

Example 65

A mixture consisting of 6.0 grams of an ammonium titanyl oxalate-derived titanyl hydroxide precipitate from Example 64a and 10 ml of a 1.0 N HNO$_3$ solution was charged into a 15 mL gold tube with a welded bottom. The top of the gold tube was then crimped to allow for pressure equilibration, and the tube was inserted vertically into a high-pressure autoclave (maximum pressure rating=1000 atm). The pH of the mixture prior to crystallization was 2.2. The sealed autoclave was externally heated to 350° C. and developed an autogenous hydrothermal pressure of 170 atm. The autoclave was held at temperature for 16 h without agitation. After the completion of the hydrothermal reaction, the resultant TiO$_2$ slurry was recovered from the gold tube, filtered and washed with DI water, and allowed to air dry. The recovered TiO$_2$ product was 100% rutile with an average crystal domain size of 27.0 nm as determined by XRPD. SEM images of the TiO$_2$ product revealed a majority of nano-sized acicular primary particles, on the order of 100 nm in length with an aspect ratio (length/width) of between 2 and 5. The material exhibited a mono-modal PSD with the majority of the particles in the nano-sized range of 50-200 nm ($d_{10}$=77 nm; $d_{50}$=115 nm; $d_{90}$=171 nm).

Example 66

A mixture consisting of 6.0 g of an ammonium titanyl oxalate-derived titanyl hydroxide precipitate from Example 64a and 10 ml of a 1.0 N H$_2$SO$_4$ solution was charged into a 15 mL gold tube with a welded bottom. The top of the gold tube was then crimped to allow for pressure equilibration, and the tube was inserted vertically into a high-pressure autoclave (maximum pressure rating=1000 atm). The pH of the mixture prior to crystallization was 1.6. The sealed autoclave was externally heated to 350° C. and developed an autogenous hydrothermal pressure of 170 atm. The autoclave was held at temperature for 16 h without agitation. After the completion of the hydrothermal reaction, the resultant TiO$_2$ slurry was recovered from the gold tube, filtered and washed with DI water, and allowed to air dry. The recovered TiO$_2$ product was 100% anatase with an average crystal domain size of 44.5 nm as determined by XRPD. The material exhibited a bi-modal PSD ($d_{10}$=98 nm; $d_{50}$=154 nm; $d_{90}$=700 nm).

Example 67a, 67b, 67c

Mixtures consisting of 6.0 g of an ammonium titanyl oxalate-derived titanyl hydroxide precipitate from Example 62a, 0.5 mol % a) LiCl, b) NaCl, and c) SnCl$_4$ mineralizers, and 10 mL of a 1.0 N HCl solution were each charged into 15 mL gold tubes with a welded bottom. The top of the gold tubes was then crimped to allow for pressure equilibration, and the tubes were inserted vertically into a high-pressure autoclave (maximum pressure rating=1000 atm). The pH of the mixtures prior to crystallization was 1.3. The sealed autoclave was externally heated to 350° C. and developed an autogenous hydrothermal pressure of 157 atm. The autoclave was held at temperature for 16 h without agitation. After the completion of the hydrothermal reaction, the resultant TiO$_2$ slurries were recovered from the gold tubes, filtered and washed with DI water, and allowed to air dry. The recovered TiO$_2$ products were 100% rutile. Average crystal domain sizes of 54.5 (LiCl), 64.6 (NaCl), and 54.7 (SnCl$_4$) nm, were determined by XRPD. These materials exhibited bi-modal PSDs (LiCl: $d_{10}$=122 nm; $d_{50}$=307 nm; $d_{90}$=818 nm; NaCl: $d_{10}$=153 nm; $d_{50}$=523 nm; $d_{90}$=1026 nm; SnCl$_4$: $d_{10}$=84 nm; $d_{50}$=169 nm; $d_{90}$=719 nm).

Example 68a, 68b, 68c

Mixtures consisting of 6.0 g of an ammonium titanyl oxalate-derived titanyl hydroxide precipitate from Example 73, a) 0, b) 10, and c) 20 mol % NaCl mineralizer, and 10 mL of a 1.0 N HCl solution were each charged into 15 mL gold tubes with a welded bottom. The top of the gold tubes was then crimped to allow for pressure equilibration, and the tubes were inserted vertically into a high-pressure autoclave (maximum pressure rating=1000 atm). The sealed autoclave was externally heated to 350° C. and developed an autogenous hydrothermal pressure of 158 atm. The autoclave was held at temperature for 16 h without agitation. After the completion of the hydrothermal reaction, the resultant TiO$_2$ slurries were recovered from the gold tubes, filtered and washed with DI water, and allowed to air dry. The recovered TiO$_2$ products were 100% rutile. Average crystal domain sizes of 31.1 (0 mol % NaCl), 44.8 (10 mol % NaCl), and 54.6 (20 mol % NaCl) nm, were determined by XRPD. The materials exhibited mono-modal, tri-modal, and mono-modal PSDs, respectively, (0 mol % NaCl: $d_{10}$=93 nm; $d_{50}$=131 nm; $d_{90}$=192 nm;

10 mol % NaCl: $d_{10}$=58 nm; $d_{50}$=167 nm; $d_{90}$=572 nm; 20 mol % NaCl: $d_{10}$=349 nm; $d_{50}$=604 nm; $d_{90}$=948 nm).

Example 69

Mixtures consisting of 3.0 g of an ammonium titanyl oxalate-derived titanyl hydroxide precipitate from Example 81, 0.14 g of $ZnCl_2$ mineralizer, and 6 mL of a 1.0 N HCl solution were each charged into 15 mL gold tubes with a welded bottom. The top of the gold tubes was then crimped to allow for pressure equilibration, and the tubes were inserted vertically into a high-pressure autoclave (maximum pressure rating=1000 atm). The sealed autoclave was externally heated to 350° C. and developed an autogenous hydrothermal pressure of 39 atm. The autoclave was held at temperature for 16 h without agitation. After the completion of the hydrothermal reaction, the resultant $TiO_2$ slurries were recovered from the gold tubes, filtered and washed with DI water, and allowed to air dry. The recovered $TiO_2$ products were 100% rutile. An average crystal domain size of 47.0 nm was determined by XRPD. The material exhibited a mono-modal PSD ($d_{10}$=345 nm; $d_{50}$=669 nm; $d_{90}$=1108 nm).

Example 70a, 70b

Mixtures consisting of 12.0 g of an ammonium titanyl oxalate-derived titanyl hydroxide precipitate as prepared in Example 81, 0.43 g of $MgCl_2.6H_2O$ (Mallinckrodt Chemical) and 0.68 g of $CaCl_2.2H_2O$ mineralizer, respectively, and 6 ml of a 1.0 N HCl solution were each charged into 15 mL gold tubes with a welded bottom. The top of the gold tubes was then crimped to allow for pressure equilibration, and the tubes were inserted vertically into a high-pressure autoclave (maximum pressure rating=1000 atm). The sealed autoclave was externally heated to 350° C. and developed an autogenous hydrothermal pressure of 170 atm. The autoclave was held at temperature for 16 h without agitation. After the completion of the hydrothermal reaction, the resultant $TiO_2$ slurries were recovered from the gold tubes, filtered and washed with DI water, and allowed to air dry. The recovered $TiO_2$ products were 100% rutile. An average crystal domain size of 54 nm for the "$MgCl_2.6H_2O$-mineralizer" rutile product and 30 nm for the "$CaCl_2.2H_2O$-mineralizer" rutile product was determined by XRPD. The rutile products exhibited mono-modal PSDs ($MgCl_2.6H_2O$: $d_{10}$=75.6 nm; $d_{50}$=654.1 nm; $d_{90}$=1317.2 nm and $CaCl_2.2H_2O$: $d_{10}$=99.4 nm; $d_{50}$=140.9 nm; $d_{90}$=251.1 nm).

Example 71a 426.40 g Ammonium oxalate monohydrate (Aldrich, CAS 6009-70-7, Catalog #221716-2.5 kg, Lot 02039EI), 378.34 g $H_2C_2O_4.2H_2O$ (Aldrich, CAS 6153-56-6, Catalog #247537, Lot 08507LU) and 832.66 g DI water were combined in a 3 L round bottom flask. The contents were brought to reflux and stirred until all solids were in solution (pH=2.70). Under these conditions, oxalic acid and ammonium oxalate react to form ammonium hydrogen oxalate. Air was bubbled through a sparge tube into the pot. 151.77 g Ilmenite (Iluka Resources LTD, Capel, Australia) was added into the pot. After 72.5 h, the pot contained an olive-green slurry which was then filtered through a 0.45 µm disposable nylon filter. All solids were removed and the bottle holding the solution was placed in an ice water bath for 3 h. The solids formed were filtered off. 1347.61 g of Kelly-green leachate were collected. ICP of the leachate showed it to contain 2.17% Fe and 2.07% Ti.

Example 71b

The solution of Example 71a was then heated to 80° C. and treated with 31.06 g Fe powder (Aldrich, CAS 7439-89-6, Catalog #267953-250 kg, Lot 11413MU). Yellow solids formed. The temperature of the slurry was increased to 95° C. and 13.73 g ball milled Iron Oxalate (Aldrich, CAS 6047-25-2, Catalog #30772-6, Lot DU06027BS) was added. After reduction as indicated by the formation of a blue colored precipitate when mixed with $NH_4OH$ (EMD Chemicals, CAS 1336-21-6, Catalog #AX1303-6, Lot 44135)), the solution was filtered. Yellow solids were collected, and dried in a vacuum oven (70° C., −15 in Hg).

Example 71c 25.04 g of the yellow solids of Example 71 b were calcined for 4 h at 375° C. in a vertical tube furnace with heated nitrogen flowing upwards through a frit and then through the sample. The calcination was repeated with the same conditions. 10.71 g of dark brown solids were collected.

Another 34.65 g of the yellow solids were placed into the tube furnace. The nitrogen valve was opened completely and nitrogen flowing through the sample was increased. Sample was taken to 400° C. and held for 12 h. 14.62 g of dark brown solids were collected.

The two brown products were combined and ground together. XRPD indicates a mixture of iron oxides formed including $Fe_2O_3$ (hematite, maghemite) and $Fe_3O_4$ (magnetite) was formed.

Example 72

79.40 g of the yellow solids collected in Example 71b were calcined in for 4 h at 375° C. in air using a box furnace. 37.35 g of reddish solids were collected and determined to be primarily hematite by XRPD.

Example 73

123 g of ammonium titanyl oxalate monohydrate (Aldrich 229989) was added to 1000 ml of DI water and stirred for 30 minutes. The solution was filtered through a 0.45 µm Teflon® filter (ZAPCAP®-CR) to remove any insoluble white precipitate. 200 mL of DI water was added to the filtrate and the solution was heated to 82° C. on a hot plate with stirring. The pH of the solution was adjusted to 8.2 through the slow addition of concentrated $NH_4OH$. The solution was stirred for 20 min, during which time, a white precipitate, $TiO(OH)_2 \cdot nH_2O$, formed. The suspension of $TiO(OH)_2 \cdot nH_2O$ was filtered through #54 Whatman filter paper yielding approximately 200 grams of wet $TiO(OH)_2 \cdot nH_2O$ filter cake. The filter cake was washed via re-suspension in 1000 ml of DI water overnight. The $TiO(OH)_2 \cdot nH_2O$ slurry had a pH of 8.0 and a conductivity of 5.2 mMHO. The pH of the slurry was adjusted to 8.2 with concentrated $NH_4OH$ and then filtered through a #54 Whatman paper filter. The washing and filtering was repeated three more times, each time adjusting the slurry pH to 8.2. The measured conductivity of the slurry prior to filtering was 1.52 mMHO, 0.6 mMHO, and 220 µMHO, respectively. The final weight of the damp TiO$(OH)_2 \cdot nH_2O$ filter cake was approximately 180 grams. The $TiO(OH)_2 \cdot nH_2O$ material was stored damp for ease of resuspension in the subsequent $TiO_2$ hydrothermal crystallization experiments. Conversion of the damp $TiO(OH)_2 \cdot nH_2O$ to $TiO_2$ by heating to 500° C. resulted in approximately 10 wt % solids.

Example 74

108.3 g of ammonium oxalate monohydrate (Aldrich, catalog number 221716) was dehydrated overnight in a 75° C. vacuum oven. 94.6 g of dehydrated ammonium oxalate was transferred to a quartz tube with baffles. 360 g SEPR (68% $ZrO_2$ and 31% $SiO_2$ from Saint-Gobain) 2 mm beads as mixing media was added. The quartz tube was placed in rotary tube furnace and attached chain from motor to sprocket. A glass pot, with stopcock, containing 300 mL of DI water and Teflon® stir bar was attached to the inlet side of the quartz tube. The glass pot was placed on a hotplate stirrer. The quartz tube that protrudes outside each end of the furnace was wrapped with heat tape and insulation. Both heat tape temperatures were kept at 105° C. which prevented steam from condensing during the experiment. A vacuum pump with trap was attached to the outlet side of the quartz tube. The trap sat in an ice water bucket and condensed ammonia and water leaving the system. The tube furnace was programmed so that the heating cycle went from ambient to 180° C. over 30 min and then held for 4 h. The motor to rotate (12 rpm) quartz tube was turned on. The vacuum pump was turned on to full vacuum (~29.2 in Hg). While tube furnace was in 30 min warm-up cycle, the stopcock to the water bottle opened and the hotplate heat was turned on to low (~60-70° C.) while stirring (~250 rpm). Once the tube furnace was at 180° C., the stopcock on glass bottle was adjusted so that a total of 90-100 g of water were delivered to solids over the next 4 h. After 4 h at 180° C., the tube furnace heat and the stopcock to the water bottle were turned off. Cooling was switched over from water to house nitrogen while solids cooled. Once the solids temperature was <80° C., vacuum and nitrogen were turned off and quartz tube was removed from furnace. Total water used during reaction was 93.4 g but only 33.8 g liquid (pH 10) was recovered in the trap due to strong vacuum and inefficient condensing. Frosting inside of quartz tube, on the outlet side, was scraped back in with the solids. The white solids were removed from the quartz tube, sieved to remove mixing media, and ground in a mortar and pestle so they were homogenous.

Approximately 1 g of the solids were slurried with ~2 g DI water. The liquid pH was 2.5 which indicated that complete deammoniation may have occurred. Microanalysis reported 0.2285 wt % C and 0.1347 wt % N on the solids. These results along with the amount recovered (79.6 g) during the reaction show a 99% conversion to ammonium hydrogen oxalate and a 2.6% yield loss.

Example 75

Unreduced leachate (2754 g) from Example 15a was transferred to a 4 L glass resin kettle equipped with a heating mantle. A 4-neck glass lid with vacuum grease was placed on the kettle and clamped shut. In the center port was placed a stir motor with glass stir rod and Teflon® blade. In the three remaining outer ports, a condenser equipped with a mineral oil bubbler, a Teflon® coated thermocouple, and a nitrogen purge line were placed. The nitrogen flow rate was set to deliver about 2-3 bubbles per second.

The leachate was stirred at about 300-400 rpm and the temperature raised to ~80° C. 20 g Fe powder (Aldrich, catalog number 255637) was added. After 30 minutes, a "blue test" was performed. The blue test consists of adding two drops of sample to ~0.5 mL 30% $NH_4OH$ (EMD, catalog number AX130313). If the mixture turns blue, then the leachate has been reduced. The leachate sample failed the blue test. Another 15 g of Fe powder was added before the mixture passed the blue test. The heat was turned off and the mixture stirred for 89 h.

The mixture was filtered through a 0.2 μm ZapCap® filter funnel to remove iron oxalate solids. A lid equipped with a hose barb fitting on the filter funnel was used so that the vacuum pulls nitrogen through the filter cake as filtration takes place. There were enough solids that two filter funnels (#1 and #2) had to be used. Once the filter cake became exposed, it was spray washed solids with DI water until the filtrate turned yellow. Solids from filter #1 were immediately dried overnight in a 75° C. vacuum oven with a nitrogen purge. Solids from filter #2 were inadvertently exposed to lab atmosphere the first night but dried the second night. The reaction yielded 163.8 g of dark yellow iron oxalate from filter #1 and 238.3 g of dark orange iron oxalate from filter #2. ICP showed the sample from filter #1 to have a molar Fe/Ti Ratio of 505.

Example 76

Iron(II) oxalate (44.99 g) from Example 75 was transferred to a 1 L autoclave with Teflon® liner and magnetic stirring. Then 200.7 g DI water, 52.98 g ammonium oxalate monohydrate (Aldrich, catalog number 221716) and 16.08 g $H2C2O4.2H2O$ (Aldrich, catalog number 247537) was added. The autoclave lid with a Simrize® o-ring as the seal was attached.

The clave was pressurized with 250 psig air (MG Industries, catalog number UN1002) and checked for leaks. The heat was turned on and stirring was begun. The inside temperature of clave was brought to 160° C. and held for 1 h. The clave heat was turned off and the reactor cooled to <80° C. The clave was opened and the warm solution transferred to a preheated (30 min in 75° C. vacuum oven) 0.2 μm nylon ZapCap® filter funnel. A vacuum filtration was performed while solution was warm (~70° C.). Once the filtrate cooled to room temperature, more solids precipitate out. The vacuum filtration step was repeated at room temperature. The reaction yielded 264.1 g of a dark green ammonium iron(III) oxalate solution.

Example 77

The dark green colored ammonium iron(III) oxalate solution (263.6 g) of Example 76 was transferred to a 1 L clave with Teflon® liner and magnetic stirring. The clave lid with a Simriz® o-ring as the seal was attached An anhydrous ammonia gas cylinder was attached to the needle valve on the clave lid using a Teflon®-lined stainless steel flexhose.

The heat was turned on and stirring was begun. The inside temperature of clave was brought to 132° C. (60 psig). Ammonia (MG Industries) was then introduced to the clave by fully opening the clave needle valve for 5 minutes. After closing the valve, temperature was 142° C. (82 psig) then after 3 min drifted down to 138° C. (68 psig). The above procedure was repeated until the temperature and pressure remained constant (140° C., 73 psig) when ammonia was introduced. The clave heat was turned off and the reactor cooled to <100° C. The clave was opened and the hot solution transferred to a preheated (30 min in 75° C. vacuum oven) 0.2 μm nylon ZapCap® filter funnel. A vacuum filtration was performed to isolate the iron product. The iron product solids were spray washed with ~10 g DI water. The iron product solids were dried overnight in 75° C. vacuum oven. The reaction yielded 8.7 g of dark purple non-magnetic iron oxide. ICP showed the sample to have a molar Fe/Ti Ratio of 151.

Example 78

426.40 g Ammonium oxalate monohydrate (Aldrich, CAS 6009-70-7, Catalog #221716, Lot 07020JD), 378.23 g $H_2C_2O_4.2H_2O$ (Aldrich, CAS 6153-56-6, Catalog #247537, Lot 07921TU) and 838.84 g DI water were combined in a 2 L round bottom flask. The contents were brought to reflux and stirred for 120 min. Under these conditions, oxalic acid and ammonium oxalate react to form ammonium hydrogen oxalate. Air was bubbled through a sparge tube into the pot at 10 psi. 151.83 g Ilmenite (Iluka Resources LTD, Capel, Australia) was added into the pot. After 8 h, 5.58 g was removed for sampling. After 24 h, 5.04 g was removed for sampling. After 72 h, 6.95 g was removed for sampling. At this point, the pot contained an olive-green slurry which was then cooled to 85° C. and treated with 31.69 g Fe powder (Aldrich, CAS 7439-89-6, Catalog #267953-1 kg). After reduction (as indicated by the formation of a blue colored precipitate when mixed with $NH_4OH$ (EMD Chemicals, CAS 1336-21-6, Catalog #AX1303-6)), the solution was filtered allowed to cool to room temperature and for 3 days, after which time, it was filtered through a 0.45 µm nylon disposable filter. The filtrate was collected.

Example 79

The reduced leachate from Example 78 was stirred on a hot plate on medium setting, and air was bubbled through a sparge tube into the solution until it turned a light olive-green. 503.03 g of the oxidized leachate was combined with 81.59 g trioctylamine (Aldrich 98% Batch 02304AD, CAS: 1116-76-3) in a 1 L Pyrex® bottle. The bottle was shaken vigorously for 30 seconds and then allowed to settle. 301.24 g kerosene was added and the bottle was shaken vigorously again. The contents of the bottle were dumped into a separatory funnel and allowed to settle over the weekend. The result was 3 layers. The bottom layer was collected.

Example 80

In a 1 L pot, 273.04 g of trioctylamine treated leachate from Example 79 (Molar Ratio Fe:Ti=$7.05 \times 10^{-4}$) was combined with 490.87 g DI water and heated to 60° C. The solution was then titrated using $NH_4OH$ (Aldrich, 29% $NH_3$ in water) to precipitate out a titanium precursor. pH readings were taken at temperature, with automatic temperature compensation. 233.18 g $NH_4OH$ was added to bring the solution to a final pH of 8.24. After stirring for 15 minutes, the pH had dropped to 7.66 and the slurry was filtered to collect the solids. Once collected, the solids were washed repeatedly by re-slurrying them in DI water, heating to 60° C., filtering and repeating. Details of the washes are as follows:
 1 wash with 1629.33 g DI water
 1 wash with 1504.42 g DI water
 1 wash with 1571.27 g DI water The washed solids (152.03 g) were collected. The material was 15% solids and an air-dried sample produced a highly amorphous XRPD pattern, with some peaks indicating some rutile and anatase formation. Elemental analysis showed the sample has a molar ratio of Fe:Ti=$7.05 \times 10^{-4}$ and to contain 0.02% Carbon and 0.68% Nitrogen.

Example 81

300 g of ATO (American Elements TI-AMOXL-05, ammonium titanyl oxalate monohydrate) was stirred in 2500 mL of water for 30 min in a 4 L beaker. There was a little insoluble white precipitate. The slurry was filtered in several aliquots, through 0.45 µm Teflon® filter (ZAPCAP®-CR) pre-wetted with acetone. The filtrate was clear. The filtrate was transferred to a hot-plate and heated to 80° C. with stirring. 300 mL conc. $NH_4OH$ (diluted 1 to 3 with DI water) was added slowly to obtain pH about 6.5. The mixture thickened so that another 1000 mL of water had to be added in order to continue stirring. The mixture was stirred 30 min until the mixture looked uniform. Another 120 mL of diluted $NH_4OH$ was added to obtain pH 8.15. Heating was maintained to keep the temp about 77-78° C. The slurry was filtered hot, in two batches, through 24 cm #54 Whatman filter paper. The large filter funnel had holes drilled in an outer ring so that the 24 cm filter paper would lie flat at the edges. This yielded 850 g wet filter cake. The filter cake was transferred to a 4 L beaker. 2500 mL room temperature DI water was added to resuspended the solids into a slurry. The pH at room temperature was 9.1. The conductivity was 23 mS/cm. The slurry sat overnight covered without stirring. The slurry was filtered through 24 cm #54 Whatman filter paper. Repeatedly, the slurry was resuspended in 2500 mL DI water, then filtered slurry through 24 cm #54 Whatman filter paper until final pH of slurry was 8.8 and the conductivity was 0.88 mS/cm. This obtained 728 g with 14% solids.

Example 82a

In a 2-L glass resin kettle equipped with a heating mantle, 500 g of reduced leachate prepared as described in Example 15b was diluted with 500 g DI $H_2O$. A 4-neck glass lid with a Viton® o-ring seal was placed on the kettle and clamped shut. In the center port was placed a stir motor with glass stir rod and Teflon®-blade. The solution was stirred for 3 days at room temperature while exposed to lab atmosphere. During this time the solution color changed from root beer to olive indicating it was oxidized. In the three remaining outer ports, a condenser opened to lab atmosphere, a Teflon®-coated thermocouple and a connection to an anhydrous ammonia gas cylinder equipped with fine metering valve were connected.

The diluted solution was stirred at about 300-400 rpm and the temperature raised to 83-85° C. at which point 81.5 g of ammonium oxalate monohydrate (Aldrich, catalog number 221716) was added. Once the temperature restabilized at 83-85° C., the thermocouple was replaced with a pH probe and showed the solution pH to be about 4.2. Ammonia (MG Industries) was then added at a rate such that the pH increased to about 6.2 in approximately 30-40 min with a temperature increase of less than 10° C. Once the pH reached 6.2, the ammonia was turned off. Let mixture stir for another 10 min. During this period the pH stabilized at about 6.2.

The resulting off white-colored slurry was then placed in a 2 L Büchner funnel insulated with 3 in wide insulating gauze that had been heated in a vacuum oven at 75° C. for at least 1 h. The hot slurry is allowed to settle for approximately 15 sec prior to application of vacuum (−15 to −18 in Hg). 871 g of virgin filtrate was collected over 2-2.5 h. Once the filter cake became exposed toward the end of the filtration, it was sprayed with a hot (~75° C.) solution of pH 7.4 saturated ammonium oxalate (Aldrich, catalog number 221716) solution from a plastic spray bottle. This process was continued until the filtrate was colorless (~243 g of solution). The filter cake was then dried on the filter.

The cake was transferred to a beaker and reslurried with ~200 mL of warm 30% ammonium hydroxide. The slurry was transferred back to the kettle using ~50 mL 30% $NH_4OH$ then stirred overnight with an outside temperature of 60° C. while left open to the laboratory atmosphere. The next morning, outside temperature was raised to 140° C. (86° C. inside). Slurry was filtered using the hot, insulated Büchner funnel as described above. Filtration was complete in about 20 minutes. The cake was washed with ~157 g of pH 9.0 DI $H_2O$. The resulting $TiO(OH)_2$ cake weighed 117 g.

Example 82b

After cooling to room temperature, all of the virgin filtrate from Example 82a was filtered through a 0.2 μm nylon filter funnel. The solids were washed with an aqueous saturated ammonium oxalate solution (353 g) until the filtrate became colorless. The solids were dried in a 75° C. vacuum oven overnight. The final weight of ammonium oxalate was 64.9 g.

Example 83a

In a 2 L glass resin kettle equipped with a heating mantle, 500 g of reduced leachate prepared as described in Example 15b was diluted with 500 g DI $H_2O$. A 4-neck glass lid with a Viton® o-ring seal was placed on the kettle and clamped shut. In the center port was placed a stir motor with glass stir rod and Teflon®-blade. In the three remaining outer ports, a condenser equipped with a mineral oil bubbler, a Teflon®-coated thermocouple, and a nitrogen purge line were placed. In the nitrogen purge line a "tee-connector" was inserted and connected to an anhydrous ammonia gas cylinder equipped with fine metering valve. The nitrogen flow rate was set to deliver about 2-3 bubbles per sec.

The diluted solution was stirred at about 300-400 rpm and the temperature raised to 83-85° C. at which point 81.3 g of ammonium oxalate monohydrate (Aldrich, catalog number 221716, batch number 07020JD) was added. Once the temperature restabilized at 83-85° C., the thermocouple was replaced with a pH probe and showed the solution pH to be about 4.2. Ammonia (MG Industries) was then added to the flowing nitrogen at a rate such that the pH increased to about 6.0 in approximately 35-40 min with a temperature increase of less than 10° C. Once the pH reached 6.0, the ammonia was turned off. Under flowing nitrogen, the mixture was stirred for another 8 min at temperature. During this period the pH dropped to about 5.9. Added more ammonia until pH was reached 6.1. The ammonia was then turned off again and the mixture stirred for another 11 min at temperature. Final pH was 6.0.

The resulting off white colored slurry was then placed in a 2 L Büchner funnel insulated with 3 in wide insulating gauze that had been heated in a vacuum oven at 75° C. for at least 1 h. The hot slurry is allowed to settle for approximately 15 s prior to application of vacuum (−16 to −20 in Hg). 881 g of virgin filtrate was collected in about 1-1.5 h. Once the filter cake became exposed toward the end of the filtration, it was sprayed with a hot (~60° C.) solution of pH 7 saturated ammonium oxalate (Aldrich, catalog number 221716, batch number 07020JD) solution from a plastic spray bottle. This process was continued until the filtrate was colorless (~170 g of solution). The filter cake was then dried on the filter.

The cake was transferred back to the kettle using minimal DI $H_2O$. Then 150 mL of warm (30° C.) 30% $NH_4OH$ (EMD, catalog number AX1303-13) was added. In this case the slurry was stirred as before except the system was left open to the laboratory atmosphere. The slurry was stirred until the cake was well dispersed then filtered using the hot, insulated Büchner funnel as described above. The cake was washed with 100 g of warm (30° C.) 30% $NH_4OH$. The resulting cake weighed 119 g.

Example 83b

After cooling to room temperature, all of the virgin filtrate from Example 83a was filtered through a 0.45 μm cellulose acetate filter funnel. This resulted in a clear yellow filtrate and ammonium oxalate solids. The next morning solids were present in the filtrate. The filtration was repeated using a 0.45 μm cellulose acetate filter funnel. This resulted in a clear yellow filtrate and solids. The filtrate became turbid in 2-3 h. Filtration in a 0.2 μm ZapCap® filter funnel was repeated. This resulted in a clear yellow filtrate and solids.

All of the ammonium oxalate solids were placed in a 75° C. vacuum oven. The top of the solids began to turn tan. The solids were removed from the vacuum oven and placed in a 0.2 μm ZapCap® filter funnel. With vacuum on, the solids were spray washed with a saturated solution of ammonium oxalate in water until tan color disappeared. The filtrate weighed 300 g. The ammonium oxalate weighed 62.1 g.

Example 84a 75 g of recycled ammonium oxalate (a mixture of material from Examples 82b and 83b) were slurried with 350 g DI water while being stirred over heat. The system came to a boil and was the consistency of milk. 100-150 mL of 30% $NH_4OH$ (EMD, catalog number AX1303-13) were added and the system was allowed to reflux over the weekend. The hot slurry was poured into a preheated 2 L fine frit Büchner funnel. Filtration took 8 min to collect 450 mL of filtrate. After the filtrate cooled to room temperature, needle-like crystals precipitated out. The crystals were isolated using a 0.2 μm nylon filter funnel then spray-washed with DI water. The crystals were allowed to dry with vacuum with nitrogen sweep overnight. The final mass of ammonium oxalate was 331.5 g.

Example 84b 7.1 g of recycled ammonium oxalate from Example 84a was placed on a watch glass (Sample A). This procedure was repeated using another watch glass after the recycled ammonium oxalate was ground in a mortar and pestle (Sample B). Both watch glasses were placed in a 175° C. vacuum oven for ~4.5 h. Steam was introduced to the oven by placing a beaker of DI water on a balance and using house vacuum (−25 in Hg) to bring it into the oven chamber where it was converted to steam. A chilled trap was placed between the oven exit and the house vacuum so that steam and ammonia could be condensed. A metering valve was placed between the DI water and the oven inlet so that flow could be regulated at 0.05-0.06 g per min. Once heating was completed, water flow was turned off, nitrogen turned on and oven door opened.

Once solids had cooled to room temperature, 5.8 g of oxalate solids were recovered from Sample A and 5.5 g from Sample B. A 1 g sample of each was slurried with 1 g of DI water. The pH of the liquid was 4.2 for Sample A and 3.9 for Sample B. There was 13.6 g of water sent through the system and 9.3 g of pH 10 liquid recovered in the trap (from both samples combined). Some solids had sublimed and coated the oven door. Both oxalate samples were microanalysed for % C and % N. The results showed that the N to C ratio (N/C) was 0.91 (Sample A) and 0.88 (Sample B) versus 0.50 for complete conversion to ammonium binoxalate. Results indicate that ground ammonium oxalate deammoniates faster than unground ammonium oxalate.

Example 85

501.97 g iron oxalate dihydrate was slurried in about 2 L of water. 352 g of 29% ammonia were added and the slurry was stirred overnight. The slurry was then filtered, washed with water, dried at 110° C., and ground to a powder. XRPD showed a mixture of iron oxalate and magnetite. The powder was reslurried in about 2 L of water and about 200 g additional 29% ammonia was added. The slurry was heated to 95° C. for about 2 h. The slurry was then filtered, washed, dried, and ground. Now XRPD showed a mixture of magnetite and FeOOH.

The powder was sieved to −100 mesh and dried at 135° C. for several days. 158.22 g of the powder was mixed with 5.61 g 2-hydroxyethylcellulose. 96.73 g of 11% $HNO_3$ was added to form a paste. The paste was extruded using a Bonnot 1" lab-scale extruder several times into ⅛-in cylinders in order to thoroughly mix the paste. After the final extrusion, the extrudates were air dried. A batch of the extrudates was fired at 1000° C. for 4 h in a 200 sccm flow of 500 ppm $O_2$ in nitrogen. The temperature was ramped up at 1°/min to 400° C. and then at 5°/min to 1000° C. The resulting extrudates showed only magnetite by XRPD. They also showed very high crush strengths (>25 pounds).

Example 86

A mixture consisting of 10.0 grams of ammonium titanyl oxalate-derived titanyl hydroxide from Example 73 and 1 mL of a concentrated 12 N HCl solution was charged into a 15 mL gold tube with a welded bottom. The top of the gold tubes was then crimped to allow for pressure equilibration, and the tube was inserted vertically into a high-pressure autoclave (maximum pressure rating=1000 atm). The sealed autoclave was externally heated to 350° C. and developed an autogenous hydrothermal pressure of 170 atm. The autoclave was held at temperature for 16 h without agitation. After the completion of the hydrothermal reaction, the resultant $TiO_2$ slurry was recovered from the gold tube, filtered and washed with DI water, and allowed to air dry. The recovered $TiO_2$ product was 100% rutile. An average crystal domain size of 66.4 nm was determined by XRPD. The material exhibited a bi-modal PSD ($d_{10}$=411 nm; $d_{50}$=784 nm; $d_{90}$=5503 nm).

Example 87

A small (50 mL) round bottom flask with magnetic stir bar was fitted with a sloped sidearm condenser. Heat was supplied via electric mantle hooked up to a POWERSTAT transformer and temperature was monitored using a digital thermometer. Dry ice vapors were passed through the shell side of the condenser tube to provide cooling to vapors traveling inside. Condensation droplets were collected in an Erlenmeyer flask.

7.1 g (0.050 mole) of ammonium oxalate monohydrate (Aldrich, catalog number 221716) are ground in a mortar and pestle and added to 40 g (0.645 mole) of ethylene glycol (Aldrich, catalog number 102466) in the flask. This is much more excess ethylene glycol than should be needed but was necessary in order to create a stirrable slurry without adding an extraneous liquid. Mixture was heated to 167° C. in <1 h then to 178° C. over the next 45 min. Solids disappeared around 170° C. Vapors exiting condenser were pH 11 and first condensation droplets were pH 11.5. Heat was turned off and mixture allowed to cool to <100° C. Solids reappear at 110° C.

Collected 1.28 g of pH 11 condensate which had some transparent crystals. Filtered mixture through a 0.2 μm nylon filter funnel. Recovered 0.64 g of solids after washing and drying. A portion of solids redissolved in water were pH 5. Final filtrate was 40-45 g of clear yellow liquid.

The IR spectrum of the residual solids are consistent with that of oxamide. This is indicative of a condensation side reaction. High temperature is most likely the cause of this. The residual liquid was analyzed via GC/MS and found to contain various oxalate esters. One of those esters is believed to be the expected ethylene oxalate compound. A larger amount of an open loop diester $(HOCH_2CH_2)_2C_2O_4$ was also detected. More abundantly still, an intriguing monoacid monoester compound was detected and may have resulted from premature hydrolysis of the ethylene oxalate. Excess ethylene glycol dominates much of the residual liquid.

In conclusion, concentrated aqueous ammonia distillate was distilled from heating a slurry mixture of ethylene glycol and ammonium oxalate monohydrate. Further analysis of the residual liquid provides evidence that glycolic esters of oxalate were formed, which could be hydrolyzed to oxalic acid and ethylene glycol. Hydrolysis was not carried out.

Example 88a 568.45 g Ammonium oxalate monohydrate (Aldrich Catalog #22171), 504.47 g $H_2C_2O_4.2H_2O$ (Aldrich Catalog #247537) and 846.07 g DI water were combined in a 3 L round bottom flask. The contents were brought to reflux and stirred until all solids were in solution. Under these conditions, oxalic acid and ammonium oxalate react to form ammonium hydrogen oxalate. 151.79 g Ilmenite (Denmark) was added into the pot. After 74 h, the pot contained an olive-green slurry, which was then filtered thru two 0.45 μm disposable nylon filters. All solids were removed and the bottles holding the solution were placed in an ice water bath. The solids formed in the ice bath were filtered off. 1003.19 g of a Kelly-green leachate was collected. The solids collected from the filtering and re-filtering to remove the precipitate after the cold water bath were re-combined in a 3 L round bottom flask. 1034.01 g DI water was added to the flask, heat and stirring were turned on, and the solution was brought to reflux and stirred overnight. After 24 h, the pot contained an olive-green slurry, which was then filtered thru two 0.45 μm disposable nylon filters. All solids were removed and the bottles holding the solution were placed in an ice water bath. The solids formed in the ice bath were filtered off. 785.01 g of a Kelly-green leachate were collected. The solids collected from the filtering and re-filtering to remove the precipitate after the cold water bath were re-combined in a 3 L round bottom flask. 1052.95 g DI water was added to the flask, heat and stirring were turned on, and the solution was brought to reflux and stirred over night. After 24 h, the pot contained olive green slurry, which was then filtered thru two 0.45 μm disposable nylon filters. All solids were removed and the bottles holding the solution were placed in an ice water bath. The solids formed in the ice bath were filtered off. 785.01 g of a green leachate were collected.

The leachates collected in the first and second pass above were re-filtered again and the resulting leachates were combined with the re-filtered leachate in the last pass in a one-gallon jug for a total of 3150.48 g of diluted leachate. The resulting leachate blend was reduced in volume by distillation to one-third its original amount. The resulting solution was placed in an ice-water bath to chill down. The solids formed in the ice bath were filtered off. 666.32 g of a lime-green leachate were collected. ICP analysis showed the leachate contained 16990 ppm Fe and 49775 ppm Ti for a molar Fe/Ti ratio of 0.293.

Example 88b

The leachate from Example 88a was then treated with 20.28 g Zinc dust (Aldrich Catalog #209988). After reduction (as indicated by the formation of a blue colored precipitate when mixed with ammonium hydroxide), the solution was filtered. From this process, 516.50 g dark red colored ammonium titanyl oxalate solution was collected. ICP analysis showed the solution to contain 535 ppm Fe and 48090 ppm Ti or a molar Fe/Ti ratio of 0.00954.

Example 88c

This solution from Example 88b was placed in a 1 L round bottom pot, heated to 70° C., then titrated with $NH_4OH$ to precipitate out a titanium precursor. 21.46 g $NH_4OH$ (Aldrich) was added to bring the solution to a final pH of 5.89. After stirring for 40 minutes, the pH had risen to 5.94. The solution was re-dissolved by adding 300 g of the distillate collected in the concentrating step above, then adding a total of 92.74 g of $H_2C_2O_4.2H_2O$ to the solution in steps until the solution turns red-black clear again. This solution was titrated with $NH_4OH$ to precipitate out a titanium precursor. 109.42 g $NH_4OH$ was added to bring the solution to a final pH of 6.97. The opaque, bluish slurry was filtered to collect the solids (418.08 g).

Example 88d

The solids from Example 88c were re-dissolved by combining them (418.08 g) in a 2 L round bottom flask with 1017.73 g DI pH 7 water, heating to 70° C., then adding a total of 99.91 g of $H_2C_2O_4.2H_2O$ to the solution in steps until the solution turns amber-brown clear again. This solution was titrated with $NH_4OH$ to precipitate out a titanium precursor. 117.60 g $NH_4OH$ was added to bring the solution to a final pH of 6.99. The opaque, bluish slurry was filtered to remove the solids (431.48 g).

Example 88e

The solids from Example 88d were re-dissolved by combining them (431.48 g) in a 2 L round bottom flask with 863.24 g DI water. Heating to 70° C., then adding a total of 95.52 g of $H_2C_2O_4.2H_2O$ to the solution in steps until the solution turns translucent again, then adding 2.47 g Zn dust. After reduction (as indicated by the formation of a blue-colored precipitate when mixed with Ammonium Hydroxide), the solution was put in a cold water bath. After the solution was cold it was filtered and 1271.37 g filtrate were collected The filtrate collected (1271.37 g) was put into a 2 L round bottom flask, heated to 70° C., and titrated with $NH_4OH$ to precipitate out a titanium precursor. 55.76 g $NH_4OH$ was added to bring the solution to a final pH of 7.00. The opaque slurry was filtered to collect the solids.

The resulting solids were re-dissolved by combining them (268.84 g) with 740.08 g DI water in a 2 L round bottom flask, heating to 70° C., then adding a total of 67.87 g of $H_2C_2O_4.2H_2O$ to the solution in steps until the solution turns translucent again. The solution was then treated with 2.15 g Zn dust. After reduction (as indicated by the formation of a blue-colored precipitate when mixed with Ammonium Hydroxide), the solution was filtered and 1038.48 g of solution were collected.

This solution (1038.48 g) was titrated with $NH_4OH$ to precipitate out a titanium precursor. 66.19 g $NH_4OH$ was added to bring the solution to a final pH of 7.00. The opaque slurry was filtered to collect the solids (309.84 g).

Example 88f

Once collected, the solids from Example 88e were washed five times by re-slurrying them in water, centrifuging, decanting the liquids, and repeating. A total of 1579.22 g of pH 7.0 DI water was used.

Example 88g

The solids from Example 88f were re-dissolved by combining them (308.34 g) in a 2 L round bottom flask with 863.39 g DI water, heating to 70° C., then adding a total of 114.69 g of $H_2C_2O_4.2H_2O$ to the solution in steps until the solution turns translucent again. The solution was then treated with 1.34 g Zn dust After reduction (as indicated by the formation of a blue colored precipitate when mixed with Ammonium Hydroxide), the solution was filtered. The filtrate was charged to a 2 L flask and heated to 70° C. The solution was charged to centrifuge tubes, centrifuged, and the liquids decanted off.

Example 88h 66.69 g washed $TiO(OH)_2$ from Example 88g and 53.14 g DI $H_2O$ were combined in a glass-liner for an autoclave. 2.30 g of Ti-seed (from Example 89) was added and the tube agitated to ensure a good blend. The liner was placed in the autoclave. The clave was purged with $N_2$ to replace the atmosphere, and then sealed.

Once the clave was charged the shaking and the heating were started. Once the clave reached 200° C. it was held for 8 h at 200° C. under autogenous pressure. At the end of the run the heat was turned off and the clave was allowed to cool over night.

The resulting material was filtered. The solids were washed two times with approximately 50 g boiling DI $H_2O$ each time by pouring the boiling water over the solids in the filter, then stirring the solids to re-suspend the solids, then turning the vacuum on, to remove any water soluble oxalates. The solids were dried in a 50° C. vacuum oven for two nights. 3.90 g solids were recovered. XRPD showed the product to be primarily rutile with an average crystallite size of 19 nm. Transmission electron microscopy (TEM) showed ~200 nm agglomerates of these nano-sized crystals.

Example 89

A 1000 mL 3-neck round-bottom flask was charged with 200.36 g of DI $H_2O$ and placed in an ice water bath with magnetic stirring and $N_2$ blanket on it. It was cooled over night to 0° C.

In the dry box 30 mL of $TiCl_4$ (Aldrich #208566, CAS 7550-45-0, Lot 21826PA) was charged to a 50 mL dropping funnel. The funnel was sealed and removed from the dry box. The funnel was placed on one of the three necks of the flask and the $N_2$ atmosphere was maintained. The $TiCl_4$ was added slowly drop-wise over 2.5 h. At the end the solution was crystal clear. It was left stirring over night in the flask A 1000 mL three neck round bottom flask was set up on a heating mantel with mechanical stirring and internal heat control. The flask was charged with 500.02 g DI $H_2O$, sealed with a $N_2$ atmosphere, stirrer started, and heat on to 80° C. The material from above was added slowly to the flask while maintaining a $N_2$ atmosphere. When completely added the solution continued to stir for 60 min. At the end of 60 min the solution was removed from the heat and placed in an ice water bath to chill and stop the reaction. The flask was left with stirring overnight in the ice water bath.

Next the solution was removed from the ice water bath and poured into three 250 mL centrifuge tubes. The tubes were spun at 4000 rpm for 30 minutes. Once the centrifuge had stopped the solution was decanted through a filter. The residue in the centrifuge tubes was combined into one bottle. Collected 70.84 g. XRPD showed the product to be rutile with crystallite size on the order of 10 nm.

Example 90

66.23 g of "$TiO(OH)_2$" from Example 88g and 53.31 g DI $H_2O$ were combined in a glass liner for the autoclave and the tube was agitated to ensure a good blend. The liner was placed in the clave and the clave was purged with $N_2$ to replace the atmosphere, and then sealed.

Once the clave was charged the shaking and the heat were started. Once the clave hit 200° C. it was held for 8 h at 200° C. autogenously pressure. At the end of the run the heat was turned off and the clave was allowed to cool overnight.

The resulting material was filtered and the solids were washed twice with approximately 50 g boiling DI $H_2O$ each time by pouring the boiling water over the solids in the filter, then stirring the solids to re-suspend the solids, then turning the vacuum on, to remove any water soluble oxalates. The solids were dried in 50° C. vacuum oven for two nights after which time 4.10 g solids were recovered. XRPD results showed the product to be a mixture of rutile, anatase, brookite and amorphous.

Example 91

52.58 g of "$TiO(OH)_2$" from Example 88g and 63.73 g DI $H_2O$ were combined in a glass liner for the autoclave. 2.25 g of Ti-seed (from Example 89) was added and the tube agitated to ensure a good blend. The liner was placed in clave and the clave was purged with $N_2$ to replace the atmosphere, and then sealed.

Once the clave was charged the shaking and the heat were started. Once the clave hit 200° C. it was held for 8 h at 200° C. and autogenous pressure. At the end of the run the heat was turned off and the clave was allowed to cool over night.

When the material was filtered and the solids were washed three times with approximately 50 g boiling DI $H_2O$ each time by pouring the boiling water over the solids in the filter, then stirring the solids to re-suspend the solids, then turning the vacuum on, to remove any water soluble oxalates. The solids were dried in 50° C. vacuum oven overnight. 3.45 g solids were recovered. XRPD showed the product to be rutile with crystallite size on the order of 20 nm.

Example 92

Seed suspension was prepared with 10.48 g DI water, 1.02 g dried nano-$TiO_2$ solids and 1.50 g 28% $NH_4OH$ (EMD, catalog number AX1303-13) then sonicated until warm. 200 g of leachate from Example 15b was diluted with 100 g DI water in a 1 liter round bottom flask equipped with Teflon®-tubing that can deliver gravity fed 28% $NH_4OH$ (EMD, catalog number AX1303-13) to close proximity of the stir-blade that is rapidly agitated from an overhead electric motor. After heating the reagents to 83° C., 24.45 g of ammonium oxalate monohydrate (Aldrich, catalog number 221716) was dissolved prior to titration. 15 min later, 2.6 g of the seed suspension was added then the aqueous ammonia feed was turned on. During the next 7 min pH rose from 3.85 to 6.17 and the temperature increased to 92° C. After turning ammonia feed off pH stabilized at 6.17. Added additional ammonia until pH stabilized at 6.31.

The resulting slurry was then placed in a preheated 2 L Büchner funnel. Filtration was slow to the point where slurry cooled and crystals formed. The slurry was reheated twice to minimize recrystallization. The cake was washed with an aqueous pH 8 solution of ammonium oxalate. The next morning the cake was dry. Repulped the cake in 28% $NH_4OH$ (EMD, catalog number AX1303-13) then heated to reflux to boil off some of the ammonia. Repeated filtration in a preheated 2 L Büchner funnel. Titanium precipitate cake was dried on the filter after spray washing with dilute aqueous ammonia. Mass of slightly wet cake was 33.07 g. Placed cake in an ambient nitrogen purge box where weight loss was 16.54 g over a 24 h period. Final weight of titanium precipitate was 16.53 g. Once virgin filtrate had cooled to room temperature oxalate solids precipitated out. Once the solids were filtered, 17.83 g of white ammonium oxalate and 215.5 g of almost colorless liquid were recovered.

Example 93a

Placed 7.1 g of recycled ammonium oxalate from Example 92 on a watch-glass, which was placed in a vacuum oven whose temperature changed from 192 to 175° C. during the first h then held at 175° C. for the next 1.5 h (2.5 h total). Steam was introduced to the oven by placing a beaker of DI water on a balance and using house vacuum (–30 in Hg) to bring it into the oven chamber where it was converted to steam. A chilled trap was placed between the oven exit and the house vacuum so that steam and ammonia could be condensed and recovered. A metering valve was placed between the DI water and the oven inlet so that flow could be regulated at 0.12 g/min. Once heating was completed, water flow was turned off, nitrogen turned on and oven door opened.

Once the solids cooled to room temperature, 3.84 g of oxalate solids were recovered. A 1 g sample was slurried with 1 g of DI water. The pH of the liquid was between 2.5 and 3.0. The water in the trap was found to have a pH between 9 and 10. The XRPD of the product indicated as did the pH measurement that there was significant conversion of DAO to AHO.

Example 93b 7.1 g of recycled ammonium oxalate from Example 92 mixed with 1.5 g of 400 mesh ilmenite ore (Iluka), was placed in a vacuum oven. The oven temperature went from 192° C. to 175° C. during the first h and was then held at 175° C. for the next 1.5 h (2.5 h total). Steam was introduced to the oven by placing a beaker of DI water on a balance and using house vacuum (–30 in Hg) to bring it into the oven chamber where it was converted to steam. A chilled trap was placed between the oven exit and the house vacuum so that steam and ammonia could be condensed and recovered. A metering valve was placed between the DI water and the oven inlet so that flow could be regulated at 0.12 g/min. Once heating was completed, water flow was turned off, nitrogen turned on and oven door opened.

Once the solids cooled to room temperature, 2.9 g were recovered. A 1 g sample was slurried with 1 g of DI water. The pH of the liquid was between 3.0 and 3.5. The water in the trap was found to have a pH between 9 and 10. The XRPD of the product indicated significant conversion to oxamide instead of the desired AHO. These results indicate that oxalate decomposes more quickly in the presence of ore.

Example 94a 568.53 g Ammonium oxalate monohydrate (Aldrich Catalog #22171 Lot 02309EI), 504.52 g $H_2C_2O_4.2H_2O$ (Aldrich Catalog #247537 Lot 08507LU) and 1112.39 g DI water were combined in a 3 L round bottom flask. The contents were brought to reflux and stirred until all solids were in solution. Under these conditions, oxalic acid and ammonium oxalate react to form ammonium hydrogen oxalate. Air was bubbled through a sparge tube into the flask. 151.73 g Ilmenite (Iluka, Australian) was added into the flask. After 72 h, the flask contained a green slurry, which was then filtered thru two 0.45 μm disposable nylon filters. All solids were removed and the bottles holding the solution were placed in an ice water bath. The solids formed in the ice bath were re-suspended in solution, then filtered off. 1775.20 g of green leachate were collected.

Example 94b

The leachate from Example 94a was refiltered to remove additional crystallized solids. 1579.03 g of the resulting leachate was charged to a 2 L round bottomed flask on a heating mantle with nitrogen blanket, mechanical stirring, and internal temperature control. The solution was heated to 80° C. The solution was then treated with 26.627 g Fe powder (Aldrich Catalog #267953). After reduction (as indicated by the formation of a blue colored precipitate when mixed with Ammonium Hydroxide), the solution was left stirring overnight in an ice water bath. The solution was filtered through a 45 uM cellulose acetate filter. Additional precipitate formed over night so the solution was refiltered. From this process, 1252.39 g root beer colored reduced leachate was collected.

Example 94c

The reduced leachate from Example 94b was titrated with $NH_4OH$ to precipitate out a titanium precursor. 73.71 g $NH_4OH$ was added to bring the solution to a final pH of 7.54. The opaque cream colored slurry was centrifuged to collect the solids. Once collected, the solids were washed repeatedly by re-slurrying them in the liquids listed below, centrifuging, decanting the liquids, and repeating. Details of the washes are as follows:
  2 washes with DI water (2899.07 g)
  8 washes with saturated ammonium oxalate solution (3292.43 g total used)

Example 94d

In a Teflon®-lined 1 L heat-traced Parr® reactor with magnetic stir bar, 246.0 g of "TiO(OH)$_2$" (high oxalate) precursor from Example 94c, 10.0 g of 4 wt % rutile TiO$_2$ seed slurry, 313.7 g DI water and 7.0 g 28% NH$_4$OH (EMD, catalog number AX1303-13) were added. The Parr® reactor was closed and placed on a hotplate stirrer. Vacuum (−30 in Hg) was applied and then the reactor was pressurized to 20 psig with Ar. The reactor was heated so that internal temperature went from 20° C. to 198° C. over a 2 h period. The temperature drifted from 198° C. to 181° C. over the next 3 h before heat was turned off. Maximum pressure was 441 psig. Once the reactor cooled to room temperature, the slurry was filtered through a 0.45 μm nylon filter and dried in a vacuum oven at 70° C., −15 in Hg. The yield was 22.57 g dry white powder. Material losses were 25% of its weight during a TGA (10° C./min to 850° C.). The material was washed by re-slurrying with 323.58 g DI water and titrating to pH 7.58 with 10.82 g 0.1 M HCl. The slurry was stirred for 1 h and filtered. The yield was 17.29 g of a white powder. XRPD analysis of the product showed rutile with crystallite size on the order of 18 nm.

Example 95a 711.01 g Ammonium Oxalate Monohydrate (Aldrich Catalog #22171), 630.45 g $H_2C_2O_4.2H_2O$ (Aldrich Catalog #247537 Lot 08507LU) and 1057.81 g DI water were combined in a 3 L round bottom flask. The contents were brought to reflux and stirred until all solids were in solution. Air was bubbled through a sparge tube into the pot. 151.75 g Ilmenite (Iluka-Australian) was added into the pot. After 75.7 h, the pot contained pale green slurry, which was then filtered thru two 0.45 μm disposable nylon filters. All solids were removed and the bottles holding the solution were placed in an ice water bath. The solids formed in the ice bath were filtered off. 2197.77 g of leachate was collected. After setting on the bench waiting further treatment, solids formed which were again filtered. The solution was then treated at 80° C. with 33.09 g Fe powder (Aldrich Catalog #267953). After reduction as indicated by the formation of a blue colored precipitate when mixed with ammonium hydroxide, the solution was chilled in an ice water bath, and filtered.

From this process, 826.10 g of reduced leachate were collected. This solution was titrated with NH$_4$OH to precipitate out a titanium precursor. 49.17 g Aldrich NH$_4$OH was added to bring the solution to a final pH of 7.51. The opaque slurry was filtered to collect the solids. Once collected, the solids were washed a total of eight times by re-slurring them in ammonium oxalate saturated solution, centrifuging, decanting the liquids, and repeating. A total of 3886.75 g of ammonium oxalate saturated solution was used.

Example 95b 80.00 mL of 1 M HNO$_3$ aqueous solution were added into 713.63 g of cold water to make an approximately 0.1 M HNO$_3$ aqueous solution. 6.37 mL of 1 M SnCl$_4$ solution was added into the above HNO$_3$ solution while stirring.

147.26 ml of Tyzor® TPT was added while vigorously stirring. Precipitation of TiO$_2$ was observed in this step.

Example 95c

In a Teflon®-lined 1 L heat traced Parr® reactor with magnetic stir bar, 10.0 g of 4 wt % rutile TiO$_2$ (d$_{90}$<100 nm) slurried in DI water, 87.0 g DI water, 3.0 g 28% NH$_4$OH (EMD, catalog number AX1303-13), 94.5 g of "TiO(OH)$_2$" from Example 95c and 22.1 g DI water which was used to wash the bottle were added. Parr® reactor was closed and placed it on a hot-plate stirrer. A vacuum (−29 in Hg) was pulled and then the reactor was pressurized to 30 psig with Ar. The reactor was heated so that the internal temperature went from 22° C. to 198° C. over a 3 h period then held at 198° C.

for 3.5 h. The maximum pressure was 306 psig. Once reactor cooled to 84° C. (~2 h), the slurry was transferred to a 0.2 μm ZapCap® filter funnel. The solids were washed with hot water containing dissolved $H_2C_2O_4.2H_2O$ (Aldrich, catalog number 247537) followed by displacement water washing. The solids were dried overnight in a 75° C. vacuum oven and ground to form 6.0 g of a fine white powder. The XRPD of the material showed the product to be rutile with an average crystallite size on the order of 15 nm.

Example 96a-d 14.2 g of ammonium oxalate monohydrate (Aldrich, catalog number 221716) was placed in a glass drying dish. The oxalate was heated while under vacuum (–30 in Hg) in an oven. Complete deammoniation occurred when final weight is 10.7 g and pH after slurrying with DI water is 2.5. Conditions and results are described below in Table 21.

TABLE 21

| Sample | Temperature | Gas | Time | Final Wt | pH |
|---|---|---|---|---|---|
| A | 150° C. | $N_2$ | 20 h | 10.7 g | 3.0 |
| B | 180° C. | $N_2$ | 4 h | 10.7 g | 2.5 |
| C | 180° C. | wet $N_2$ | 4 h | 10.8 g | 3.0 |
| D | 180° C. | none | 5 h | 11.1 g | * |

* not taken
Samples B and C deammoniated the fastest.

Example 97a

Approximately 4 kg of ilmenite ore (Iluka) were ball-milled sufficiently to obtain approximately 2 kg of material with a particle size less than 325 mesh (45 microns).

Example 97b 426.31 g Ammonium oxalate monohydrate (Aldrich, CAS 6009-70-7, Catalog #221716), 378.21 g $H_2C_2O_4.2H_2O$ (Aldrich, CAS 6153-56-6, Catalog #247537) and 838.69 g DI water were combined in a 2 L round bottom flask that had been purged with nitrogen. The contents were brought to reflux and stirred for 120 min under a nitrogen blanket. Under these conditions, oxalic acid and ammonium oxalate react to form ammonium hydrogen oxalate. 151.83 g Ilmenite (Iluka Resources LTD, Capel, Australia) ground to <325 mesh as described in Example 97a was added to the pot. After 8 h, 3.46 g was removed for sampling (elemental analysis shows that 77.24% of the titanium in the ore had been digested in this time). After 24 h, 3.94 g was removed for sampling (elemental analysis shows that 98.57% of the titanium in the ore had been digested in this time). After 72 h, 6.27 g was removed for sampling (elemental analysis shows that 100% of the titanium in the ore had been digested in this time).

Example 97c

The pot containing the olive-green slurry from Example 97b was then cooled to 85° C. and treated with 19.18 g Fe powder (Aldrich, CAS 7439-89-6, Catalog #267953-1 kg). After reduction as indicated by the formation of a blue colored precipitate when mixed with $NH_4OH$ (EMD Chemicals, CAS 1336-21-6, Catalog #AX1303-6), the solution was allowed to cool to room temperature and stirred for 3 days, after which time, it was filtered through a 0.45 μm nylon disposable filter. Elemental analysis shows the filtrate to have a Molar Ratio Fe:Ti=$8.60 \times 10^{-3}$.

Example 97d 426.29 g Ammonium Oxalate Monohydrate (Aldrich, CAS 6009-70-7, Catalog #221716, Lot 07020JD), 378.21 g $H_2C_2O_4.2H_2O$ (Aldrich, CAS 6153-56-6, Catalog #247537, Lot 07921 TU) and 838.69 g DI water were combined in a 2 L round bottom flask. The contents were brought to reflux and stirred for 120 min under a nitrogen blanket. Under these conditions, oxalic acid and ammonium oxalate react to form ammonium hydrogen oxalate. 151.83 g Ilmenite (Iluka Resources LTD, Capel, Australia) was added into the pot. After 8 h, 6.13 g was removed for sampling (elemental analysis shows that 64.08% of the titanium in the ore had been digested in this time). After 24 h, 5.40 g was removed for sampling (elemental analysis shows that 84.95% of the titanium in the ore had been digested in this time). After 72 h, 4.70 g was removed for sampling (elemental analysis shows that 100% of the titanium in the ore had been digested in this time). At this point, the pot contained an olive green slurry which was then cooled to 85° C. and treated with 12.89 g Fe powder (Aldrich, CAS 7439-89-6, Catalog #267953-1 kg). After reduction as indicated by the formation of a blue colored precipitate when mixed with $NH_4OH$ (EMD Chemicals, CAS 1336-21-6, Catalog #AX1303-6), the solution was allowed to cool to room temperature and stirred for 3 days, after which time, it was filtered through a 0.45 μm nylon disposable filter, Elemental analysis shows the filtrate to have a molar ratio Fe:Ti=$6.57 \times 10^{-3}$.

Example 98

In a Teflon®-lined 1 liter heat traced Parr® reactor with magnetic stir bar, 30.3 g Danish Ore (30.28 wt % Ti), 63 g $H_2C_2O_4.2H_2O$ (Aldrich, catalog number 247537), 71 g ammonium oxalate monohydrate (Aldrich, catalog number 221716) and 173 g DI water were charged. The Parr® reactor was closed and placed on a hot-plate stirrer. The reactor was pressurized to 200 psig with air. The reactor was heated so that the internal temperature went from 20° C. to 140° C. over a 35 min period then held at 140° C. for 4 h. Maximum pressure was 333 psig. The reactor was opened after it cooled to 86° C. Slurry was transferred to a 0.2 μm filter funnel for hot filtration. Silver/gray colored solids were spray-washed with 100 mL DI water and placed in a 75° C. vacuum oven overnight. After drying, the solids were sieved to separate 1.1 g of coarse particles from 8.1 g of fine particles. XRPD showed that the coarse particles were predominantly rutile while the fine particles were unreacted ore. Once the filtrate cooled to room temperature, a filtration was done to isolate oxalate crystals that had formed. The oxalate crystals were then washed with 186 g of an aqueous solution of saturated ammonium oxalate (Aldrich, catalog number 221716). The final mass of dried oxalate was 4.0 g. The virgin filtrate and wash liquid were combined and had a total mass of 643 g. Based upon non-oxalate containing solids recovered, ~70% of the Danish ore was digested.

Example 99a

The entire sample of iron oxalate from Example 23 and 500 g DI water was loaded into a 2 L clave. The clave was sealed and the headspace pressurized with 350 psig Ar. The contents were heated from ambient to 110° C. over a 2 h period while agitating at 350 rpm. Once the temperature reached 110° C., venting of pressure from 350 to 50 psig over 2 h was started.

When the pressure reached 50 psig, the addition of ammonia gas (MG Industries) was begun until shutting off the cylinder produces no drop in feed line pressure. This indicates that the titration was finished. The heat was shut off and the clave was cooled to below 100° C. The remaining head pressure was vented to 0 psig. The liquid contents of the clave were siphoned into a vacuum flask. The red solids (iron oxide) and long crystals (ammonium oxalate) that remain were removed using ~200 mL DI water. All phases were transferred to a 0.2 μm ZapCap® for filtration.

The solids remaining in the ZapCap® are a mixture of iron oxide and ammonium oxalate. They were transferred to a beaker containing 1 L of DI water. The pH of the slurry was 7.0-7.5. Approximately 20 mL of $NH_4OH$ (EMD, catalog number AX1303-13) was added to raise pH to 10.0-10.5. The slurry was then heated at 50° C. for 1 h so that ammonium oxalate crystals would dissolve. The slurry was transferred to a 0.2 μm ZapCap® for filtration. After drying overnight in a 50° C. vacuum oven, the iron oxide yield was 70.94 g. The XRPD showed that the product is mostly $Fe_2O_3$ (hematite).

All of the aqueous filtrates were filtered through a 0.2 μm Zapcap® to isolate ammonium oxalate crystals. After drying at room temperature, the ammonium oxalate yield was 86.19 g.

Using the standard permanganate test for oxalate, an analysis showed 0.64 mmoles of oxalate/g in filtrate A, 6.96 mmoles of oxalate/g in filtrate B and 0.35 mmoles of oxalate/g in filtrate C. The filtrates were combined for a total mass of 2193 g.

Example 99b 7.1 g of ammonium oxalate monohydrate (Aldrich, catalog number 221716) was placed on a watch glass labeled (A). 7.1 g of recycled ammonium oxalate from Example 99a was placed on a second watch glass labeled (B). Both watch glasses were placed in a 174° C. vacuum oven for 4 h. Steam was introduced to the oven by placing a beaker of DI water on a balance and using house vacuum (−31 in Hg) to bring it into the oven chamber where it was converted to steam. A chilled trap was placed between the oven exit and the house vacuum so that steam and ammonia could be condensed. A metering valve was placed between the DI water and the oven inlet so that flow could be regulated at 0.12 g/min. Once heating was completed, water flow was turned off, nitrogen turned on and oven door opened.

Once the solids cooled to room temperature, 4.4 g of oxalate solids were recovered from (A) and 4.4 g from (B). A 1 g sample of each was slurried with 1 g of DI water. The pH of the liquid was 2.5 for (A) and 2.5 for (B). There was 29.1 g of water sent through the system and 23.2 g of pH 9.5 liquid recovered in the trap (from both samples combined). ~1 g of solids had sublimed and coated the oven door. Both oxalate samples were analyzed for % carbon and nitrogen. The results show that the nitrogen to carbon ratio (N/C) was 0.49 for both (A) and (B) versus 0.50 for complete deammoniation. XRPD for both samples showed successful deammoniation.

Example 100a 703.53 g Ammonium oxalate monohydrate (Aldrich Catalog #22171), 630.50 g $H_2C_2O_4.2H_2O$ (Aldrich Catalog #247537 Lot 11303MA) and 1063.00 g DI water were combined in a 3 L round bottom flask. The contents were brought to reflux and stirred until all solids were in solution. Under these conditions, oxalic acid and ammonium oxalate react to form ammonium hydrogen oxalate. 150.14 g Ilmenite (Denmark) was added into the pot. After 72 h, the pot contained a gray/dark green slurry, which was then filtered through two 0.45 μm disposable nylon filters. All solids were removed and the bottles holding the solution were placed in an ice water bath. The solids formed in the ice bath were filtered off. 1304.03 g of green leachate was collected. ICP analyses of the leachate showed 21045 ppm Ti and 8590 ppm Fe for a molar Fe/Ti ratio of 0.315.

Example 100b 606.15 g of leachate from Example 100a was then treated with 6.78 g Zn dust (Aldrich Catalog #209988). After reduction as indicated by the formation of a blue colored precipitate when mixed with ammonium hydroxide, the solution was filtered. From this process, 570.96 g dark red colored reduced leachate was collected. ICP analyses showed the leachate contained 24530 ppm Ti and 795 ppm Fe for a molar Fe/Ti ratio of 0.0278.

Example 100c 126.84 g of reduced leachate from Example 100b were placed in a quartz liner for an autoclave. The liner, equipped with a magnetic stir bar was placed on a magnetic stirrer and 2.22 g of rutile seed from Example 89 was added. The stir bar was removed; the liner was sealed and placed in a nitrogen-purged autoclave. The autoclave was heated to 200° C. with shaking and held for 8 h at 200° C. under autogenous pressure. The resulting slurry was filtered and the solids washed with hot DI water and hot equimolar DAO/oxalic acid solution. The XRPD of the resulting solid showed the material to be rutile with an average crystallite size of 24 nm.

Example 100d 126.20 g of reduced leachate from Example 100b was put in a quartz liner, sealed and placed in an autoclave that was purged with $N_2$. The autoclave was heated to 200° C. with shaking and held for 8 h at 200° C. under autogenous pressure. The resulting slurry was filtered and the solids washed with hot DI water. The XRPD of the resulting solid showed the material to be a mixture of anatase and rutile.

Example 100e 124.53 g reduced leachate from Example 100b was put in a quartz liner. The liner, equipped with a magnetic stir bar was placed on a magnetic stirrer. The pH was adjusted to pH 7 using 18.84 g concentrated $NH_4OH$ (EM #AX1303-13); then 2.47 g of rutile seed from Example 89 were added. The stir bar was removed; the liner was sealed and placed in a nitrogen-purged autoclave. The autoclave was heated to 200° C. with shaking and held for 8 h at 200° C. under autogenous pressure. The resulting slurry was filtered. The XRPD of the dried solid showed the material to be a mixture of anatase and diammonium oxalate.

Example 100f 127.23 g of reduced leachate from Example 100b were poured into a quartz liner. The liner, equipped with a magnetic stir bar was placed on a magnetic stirrer. The pH was adjusted to pH 7 using concentrated $NH_4OH$ (EM #AX1303-13). The stir bar was removed; the liner was sealed and placed in a nitrogen-purged autoclave. The autoclave was heated to 200°

C. with shaking and held for 8 h at 200° C. under autogenous pressure. The product was filtered and the solids dried. XRPD showed the solid to be composed of anatase and diammonium oxalate.

Example 100g 123.73 g of reduced leachate were placed in a quartz liner. The tube was placed on a magnetic stirrer with a stir bar inserted. 2.41 g of rutile seed from Example 89 were added. The stir bar was removed, and the liner was sealed placed in a nitrogen-purged autoclave. The autoclave was heated to 200° C. with shaking and held for 8 h at 200° C. The product was filtered and the solids dried. XRPD showed the solid to be composed of rutile, anatase and diammonium oxalate.

Example 100h 118.85 g of reduced leachate from Example 100b was put in a quartz liner. The liner was sealed and placed in a nitrogen-purged autoclave. The autoclave was heated to 200° C. with shaking and held for 8 h at 200° C. The product was filtered and the solids dried. XRPD showed the solid to be composed of rutile.

Example 100i 125.11 g of reduced leachate from Example 100b was put in a quartz liner. The tube was placed on a magnetic stirrer with a stir bar inserted. The pH was adjusted to pH 7 using 6.74 g concentrated $NH_4OH$ (EM #AX1303-13), then 2.50 g of rutile seed from Example 89 was added. The stir bar was removed, and the liner was sealed and placed in a nitrogen-purged autoclave. The autoclave was heated to 200° C. with shaking and held for 8 h at 200° C. The product was filtered, washed with hot water and the solids dried. XRPD showed the solid to be composed primarily of rutile with a small amount of brookite.

Example 100j 126.45 g of reduced leachate from Example 100b was put in a quartz liner. The tube was placed on a magnetic stirrer with a stir bar inserted. The pH was adjusted to pH 7 using 7.59 g concentrated $NH_4OH$ (EM #AX1303-13). The stir bar was removed, and the liner was sealed and placed in a nitrogen-purged autoclave. The autoclave was heated to 200° C. with shaking and held for 8 h at 200° C. The product was filtered, washed with hot water and the solids dried. XRPD showed the solid to be composed primarily of rutile with small amount of brookite.

Example 101

45.0 g iron oxalate from Example 75, 199.4 g DI water and 50.1 g 28% $NH_4OH$ (EMD, catalog number AX1303-13) were charged to a 1 L clave with Teflon®-liner and magnetic stirring. The clave lid was attached with Simriz® o-ring as the seal. The clave was pressurized with 250 psig air. The heat was turned on and stirring was begun. The inside temperature of clave was brought to 142-153° C. and held for 4 h. The maximum pressure was 390 psig. The clave heat was turned off and allowed to cool to <100° C. The clave was opened and the hot solution was transferred to a preheated (30 min in 75° C. vacuum oven) 0.2 µm nylon ZapCap® filter funnel. A vacuum filtration was performed to isolate an iron product. 229.5 g of colorless virgin oxalate-rich filtrate was collected.

Once the filtrate cooled to room temperature, it was filtered through a 0.2 micron ZapcCap® filter funnel to isolate the oxalate crystals that precipitated out. The total ammonium oxalate yield was 15.0 g. The iron product solids were spray washed with ~80 mL DI water. The iron product solids were dried overnight in 75° C. vacuum oven. The reaction yielded 14.8 g of dark reddish brown colored iron oxide. The XRPD of the iron product showed it to be a mixture of $Fe_2O_3$ and $Fe_3O_4$.

Example 102a, b 7.5 g of anhydrous ammonium oxalate from Example 101 was placed in a jar. 200 g $Al_2O_3$ mixing media were added and the jar was placed on a roller mill for 21 h. 6.2 g of this "ground" recycled ammonium oxalate was placed on a watch glass labeled (A). 6.2 g of unground recycled ammonium oxalate from Example 101 was placed on a second watch glass labeled (B). Both watch glasses were placed in a 174° C. vacuum oven for 4 h. Steam was introduced to the oven by placing a beaker of DI water on a balance and using house vacuum (−26 in Hg) to bring it into the oven chamber where it was converted to steam. A chilled trap was placed between the oven exit and the house vacuum so that steam and ammonia could be condensed. A metering valve was placed between the DI water and the oven inlet so that flow could be regulated at 0.10 g/min. Once heating was completed, water flow was turned off, nitrogen turned on and oven door opened.

Once the solids cooled to room temperature, 3.9 g of oxalate solids were recovered from (A) and 5.9 g from (B). A 1 g sample of each was slurried with 1 g of DI water. The pH of both liquids was 3.5. (A pH of 2.5 indicates complete deammoniation.) There were 22.8 g of water sent through the system and 15.4 g of pH 10 liquid recovered in the trap (from both samples combined). Analytical results show that the nitrogen to carbon ratio (N/C) was 0.75 for (A) and 0.74 for (B) versus 0.50 for complete deammoniation. XRPD indicated partial deammoniation was achieved. Under these conditions there appears to be little effect of grinding on deammoniation.

Example 103

211.75 g of a 0.2 wt % aqueous dispersion of weakly crystalline rutile (prepared from titanyl chloride) that had passed through a 0.8 µm cellulose nitrate filter, 40.00 g of titanyl hydroxide from Example 19 and 2.00 g oxalic acid dihydrate (Aldrich, catalog number 247537) were placed into a Teflon® liner containing a Teflon®-coated stir bar. The pH of this mixture was 4. The liner was placed into a 1 L autoclave with a Simriz® o-ring and 10 psig air. The clave was then heated from room temperature to 200° C. over a period of 90 min and held at 200° C. for 4 h. The average pressure during the hold time was 268 psig. The heat was then turned off and the clave was allowed to cool to room temperature before opening.

The slurry was removed from the clave then filtered and washed. The wet cake mass was 18.12 g. After drying, the mass of dried solid was 8.49 g. XRPD of the dried solid showed the product to be 100% rutile. The particle size of the product was approximately 0.1 µm.

Example 104a

In a 3 L round bottom flask under nitrogen, combined 378.21 g oxalic acid (Aldrich lot 07921TU), 426.31 g ammonium oxalate (Aldrich lot 02309EI) and 838.02 g DI water.

Heated the mixture to an external temperature of 240° C. When all of the oxalates were in solution, added 151.85 g ilmenite (Iluka Capel). The mixture stirred while heating at temperature for 72 hours. After which time, a total of 11.12 g iron powder in small increments was added until the Fe(II) in the solution was reduced. The mixture was then allowed to stir for 2 days at room temperature. It was then filtered through a 0.22 μm nylon filter funnel while under a nitrogen blanket to give a "reduced" leachate. The solids were washed with 929.04 g de-oxygenated water by re-slurrying in the top of the filter. The wash water was transferred to a 2 L round bottom flask under nitrogen and heated to 90° C. 0.77 g of iron powder was added to reduce any Fe(III) present in the wash filtrate. Once reduced the slurry was filtered through a 0.22 μm nylon filter funnel to give a "reduced" filtrate.

The reduced filtrate and leachate were combined a 2 L round bottom flask under nitrogen. The solution was heated to 90° C. and titrated with 149.99 g ammonium hydroxide (29% ammonia in water) to get pH from 2.94 to 6.35. The solution became a tan/gray opaque slurry. The slurry was stirred for 3 days at room temperature.

Example 104b 535 g of the slurry prepared in Example 104a were placed in a beaker and brought to a boil. The hot slurry was transferred to a preheated Büchner funnel and filtered using vacuum (−15 in Hg). After 2.5 h, the cake was exposed after collecting 300 mL of virgin filtrate. The cake was spray washed with 200 mL hot DI water over the next 3 h until the filtrate became colorless. The final wet cake mass was 152 g. The titanyl hydroxide precipitate was then repulped with 250 g DI water and heated to near reflux. Approximately 10 ml of 28% ammonium hydroxide was then added. The slurry was then transferred to a preheated Büchner funnel and filtered. Once the cake became exposed it was spray washed with DI water, which had been adjusted to pH 2 using nitric acid, until filtrate collected was pH 8. The filter cake was dried on the filter using vacuum over the weekend and gave a final dry cake mass of 40 g.

In a glass beaker, a mixture of 400 mL DI water and 40 ml 28% ammonium hydroxide were heated to 80° C. 39.2 g of the dry cake were then added, turning the solution into an off-white colored slurry. The slurry was brought to a boil (103° C.) and then transferred to a Büchner funnel. Once the cake became exposed it was spray washed with 100 mL DI water then switched to water acidified with nitric acid to pH 2. When filtrate became acidic (pH 1) DI water was used once again. The resulting solids were dried in a 75° C. vacuum oven. The final dry cake mass was 15.7 g. The XRPD showed the product to be amorphous.

Example 104c

In a glass vessel equipped with magnetic stir bar, added 80 g DI water, 16 g 37% Hydrochloric Acid and 4 g of the dried solids obtained in Example 104b. While stirring, the temperature of slurry was raised to 90-93° C. and held for 2 hours. PSD showed the average size to be 0.1 μm. The slurry was centrifuged and the hazy greenish-yellow colored supernatant decanted. The supernatant was passed through a 0.2 μm nylon filter funnel to clarify. The solids were repulped in DI water and attempted filtration failed. 1.4 g of solids that did accumulate on the filter were accumulated and dried yielding 0.72 g. The filtrate and remaining slurry were recombined and then centrifuged at 5000 rpm for 1.67 h. No settling of the solids was observed. The slurry was then titrated with a few drops of sodium hydroxide then re-centrifuged. The pH rose quickly since there was only a small amount of hydrochloric acid present. Re-pulped settled solids in deionized water and filtered without much difficulty. Spray-washed solids with DI water and dried. The mass of the total solids recovered was 3.42 g. The weight loss on drying was 14.5%. The XRPD showed the product to be predominantly rutile.

Example 105

A small portion of titanyl chloride hydrolysis paste was dried. The solids content of the paste was 64%. XRPD showed the dried solid to be weakly crystalline rutile. 4.69 g of the titanyl chloride hydrolysis paste was dispersed in water. All but 2.57 g was passed through a 0.8 μm cellulose nitrate filter funnel to remove the coarse fraction. The filtrate collected was a slurry of 0.2 wt % titanium dioxide with a particle size of slightly less than 0.1 μm.

211.75 g of the 0.2 wt % titanium dioxide slurry, 40.00 g of titanyl hydroxide as prepared in Example 19 and 2.00 g oxalic acid dihydrate (Aldrich, catalog number 247537) were combined in a Teflon®-liner containing a Teflon®-coated stir bar. The pH of this mixture was 4. The liner was placed into a one liter autoclave with a Simriz® o-ring and 10 psig air. The clave was then heated from room temperature to 200° C. over a period of 90 min and held at 200° C. for 4 h. The average pressure during the hold time was 268 psig. The heat was then turned off and the clave was allowed to cool to room temperature before opening.

The slurry was removed from the clave and then filtered and washed. The wet cake mass was 18.12 g. The wet cake was transferred to a jar and placed in a drying oven. The mass of dried solid was 8.49 g. XRPD of the dried solid showed it to be 100% rutile titanium dioxide. The particle size of the product was approximately 0.1 μm.

The invention claimed is:

1. A process comprising:
   a) digesting ilmenite ore with aqueous ammonium hydrogen oxalate to form a leachate and a precipitate comprising $FeC_2O_4.2H_2O$;
   b) separating said leachate from said precipitate comprising $FeC_2O_4.2H_2O$;
   c) hydrolyzing said leachate with ammonia or ammonium hydroxide to form titanyl hydroxide and an oxalate-rich solution;
   d) separating said titanyl hydroxide from said oxalate-rich solution;
   e) washing said titanyl hydroxide with a material selected from the group consisting of water, aqueous ammonium oxalate and ammonium hydroxide to form low oxalate titanyl hydroxide, that is, titanyl hydroxide that is stripped of residual oxalate; and
   f) crystallizing titanium dioxide from said low oxalate titanyl hydroxide.

2. The process of claim 1 wherein the digesting is non-oxidative.

3. The process of claim 1 wherein the digesting is reductive.

4. The process of claim 2 further comprising adding a reducing agent to said leachate to form a reduced leachate and a second iron precipitate and separating said second iron precipitate from said reduced leachate.

5. The process of claim 1 wherein the crystallizing is carried out at a temperature of 150° C.-250° C.

6. The process of claim 1 wherein the crystallizing is carried out at a temperature of 250° C.-374° C.

7. The process of claim 1 wherein the crystallizing is carried out by flux calcination.

8. The process of claim 1 wherein the crystallizing is carried out at a temperature of 700° C.-1100° C.

9. A process comprising:
a) digesting ilmenite ore with aqueous ammonium hydrogen oxalate to form a first leachate and a precipitate comprising $FeC_2O_4.2H_2O$;
b) separating said first leachate from said precipitate comprising $FeC_2O_4.2H_2O$;
c) optionally, adding a reducing agent to said first leachate to form a second iron-rich precipitate and a second leachate and separating said second iron-rich precipitate from said second leachate;
d) hydrothermally crystallizing said first or second leachate for between 1 h and 24 h to form titanium dioxide and a hydrothermally treated solution; and
e) separating said titanium dioxide from said hydrothermally treated solution.

10. The process of claim 9 wherein the digesting is non-oxidative.

11. The process of claim 9 wherein the digesting is reductive.

12. The process of claim 9 wherein the crystallizing is carried out at a temperature of 150° C.-250° C.

13. The process of claim 9 wherein the crystallizing is carried out at a temperature of 250° C.-374° C.

14. A process comprising:
a) digesting ilmenite ore with aqueous ammonium hydrogen oxalate to form a leachate and a precipitate comprising $FeC_2O_4.2H_2O$;
b) separating said leachate from said precipitate comprising $FeC_2O_4.2H_2O$; adding a reducing agent to said leachate to form a second iron-rich precipitate and a reduced leachate;
c) separating said second iron-rich precipitate from said reduced leachate;
d) hydrolyzing said reduced leachate with ammonium hydroxide to form titanyl hydroxide; and
e) hydrothermally crystallizing said titanyl hydroxide to form titanium dioxide and a diammonium oxalate solution.

15. The process of claim 14 wherein the digesting is non-oxidative.

16. The process of claim 14 wherein the digesting is reductive.

17. The process of claim 14 wherein the crystallizing is carried out at a temperature of 150° C.-250° C.

18. The process of claim 14 wherein the crystallizing is carried out at a temperature of 250° C.-374° C.

19. The process of claim 1 further comprising:
oxidizing said precipitate comprising $FeC_2O_4.2H_2O$ in an acidic ammonium oxalate solution to form an ammonium iron(III) oxalate solution;
optionally, separating unreacted ore from said ammonium iron(III) solution and adding a base to said ammonium iron(III) oxalate solution to form an iron-rich hydroxide precipitate and a diammonium oxalate solution;
separating said iron-rich hydroxide precipitate from said ammonium oxalate-rich solution; and
optionally, calcining said iron-rich hydroxide precipitate.

20. The process of claim 9 further comprising:
oxidizing said precipitate comprising $FeC_2O_4.2H_2O$ in an acidic ammonium oxalate solution to form an ammonium iron(III) oxalate solution;
optionally, separating unreacted ore from said ammonium iron(III) solution and adding a base to said ammonium iron(III) oxalate solution to form an iron-rich hydroxide precipitate and a diammonium oxalate solution;
separating said iron-rich hydroxide precipitate from said ammonium oxalate-rich solution; and
optionally, calcining said iron-rich hydroxide precipitate.

21. The process of claim 14 further comprising:
oxidizing precipitate comprising $FeC_2O_4.2H_2O$ in an acidic ammonium oxalate solution to form an ammonium iron(III) oxalate solution;
optionally, separating unreacted ore from said ammonium iron(III) solution and adding a base to said ammonium iron(III) oxalate solution to form an iron-rich hydroxide precipitate and an diammonium oxalate solution;
separating said iron-rich hydroxide precipitate from said ammonium oxalate-rich solution; and
optionally, calcining said iron-rich hydroxide precipitate.

22. The process of claim 1, further comprising:
adding a base to said precipitate comprising $FeC_2O_4.2H_2O$ to form an iron-rich hydroxide precipitate and a basic solution;
separating said iron-rich hydroxide precipitate from said basic solution; and
optionally, calcining said iron-rich hydroxide precipitate.

23. The process of claim 9, further comprising:
adding a base to said precipitate comprising $FeC_2O_4.2H_2O$ to form an iron-rich hydroxide precipitate and a basic solution;
separating said iron-rich hydroxide precipitate from said basic solution; and
optionally, calcining said iron-rich hydroxide precipitate.

24. The process of claim 14, further comprising:
adding a base to said precipitate comprising $FeC_2O_4.2H_2O$ to form an iron-rich hydroxide precipitate and a basic solution;
separating said iron-rich hydroxide precipitate from said basic solution; and
optionally, calcining said iron-rich hydroxide precipitate.

25. The process of claim 14, further comprising crystallizing said diammonium oxalate solution forming diammonium oxalate hydrate and a depleted solution; and
separating diammonium oxalate hydrate from said depleted solution; and
thermally treating said diammonium oxalate hydrate to form ammonium hydrogen oxalate and ammonia.

26. The process of claim 1, further comprising calcining said precipitate comprising $FeC_2O_4.2H_2O$.

27. The process of claim 9, further comprising calcining said precipitate comprising $FeC_2O_4.2H_2O$.

28. The process of claim 14, further comprising calcining said precipitate comprising $FeC_2O_4.2H_2O$.

29. The process of claim 1, further comprising crystallizing diammonium oxalate from said oxalate-rich solution.

30. The process of claim 14, further comprising passing said diammonium oxalate solution through an ion exchange resin to form ammonium hydrogen oxalate.

31. The process of claim 1, further comprising passing said oxalate-rich solution through an ion exchange resin to form ammonium hydrogen oxalate.

* * * * *